US008586495B2

(12) United States Patent
Krishna et al.

(10) Patent No.: US 8,586,495 B2
(45) Date of Patent: *Nov. 19, 2013

(54) DIELECTRIC MATERIALS

(75) Inventors: Kalaga Murali Krishna, Bangalore (IN); Lohit Matani, Varanasi (IN)

(73) Assignee: General Electric Company, Niskayuna, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/075,997

(22) Filed: Mar. 30, 2011

(65) Prior Publication Data

US 2011/0281718 A1    Nov. 17, 2011

Related U.S. Application Data

(63) Continuation-in-part of application No. 12/778,189, filed on May 12, 2010.

(51) Int. Cl.
C04B 35/465 (2006.01)

(52) U.S. Cl.
USPC ............ 501/136; 501/137; 501/138; 501/139

(58) Field of Classification Search
USPC .................................. 501/136, 137, 138, 139
See application file for complete search history.

(56) References Cited

U.S. PATENT DOCUMENTS

| | | | |
|---|---|---|---|
| 4,670,409 A | 6/1987 | Okawa et al. | |
| 5,136,270 A | 8/1992 | Hatanaka et al. | |
| 6,300,267 B1 | 10/2001 | Chen et al. | |
| 6,936,559 B2 | 8/2005 | Li et al. | |
| 6,970,055 B2 | 11/2005 | Toncich | |
| 7,029,971 B2 | 4/2006 | Borland et al. | |
| 7,465,497 B2 | 12/2008 | Tan et al. | |
| 7,741,396 B2 | 6/2010 | Tan et al. | |
| 2004/0127345 A1* | 7/2004 | Li et al. | 501/136 |
| 2005/0207094 A1 | 9/2005 | Borland et al. | |
| 2009/0058189 A1 | 3/2009 | Cook et al. | |
| 2011/0278940 A1* | 11/2011 | Krishna et al. | 307/104 |

FOREIGN PATENT DOCUMENTS

EP           0571948 B1      2/2000

OTHER PUBLICATIONS

Bing Qin, Dengren Jin, Jinrong Cheng and Zhongyan Meng; "Dielectric Properties of (Ba, Sr, Ca)TiO3 Ceramics for Tunable Microwave Devices"; Downloaded on Jun. 24, 2009 at 04:18 from IEEE Xplore ; 4 Pages.
Bing Qin, Dengren Jin, Jinrong Chen, and Zhongyan Meng; "Dielectric Properties of Cr2O3 Doped (Ba, Sr,Ca)TiO3 Ceramics for Tunable Microwave Devices"; Materials Research Society; Mater. Res. Soc. Symp. Proc. vol. 966, 2007; 7 Pages.
Juanjuan Xing, Hui Gu, Alexandre Gloter, Hui Shen, Xiaoming Pan, Pingchu Wang; "Bismuth nanoprecipitation at grain boundaries during microstructural evolution in (Sr,Ba)TiO3 ceramics"; Science Direct; Acta Materialia 55 (2007); pp. 5323-5332.
S. F. Shao, J. L. Zhang, P. Zheng, C. L. Wang, J. C. Li, and M. L. Zhao; "High permittivity and low dielectric loss in ceramics with the nominal compositions of CaCu3-xLa2x/3Ti4O12"; Applied Physics Letters 91, 042905 2007; 3 Pages.
R. K. Grubbs, E. L. Venturini, P. G. Clem, J. J. Richardson, B. A. Tuttle, and G. A. Samara; "Dielectric and magnetic properties of Fe- and Nb-doped CaCu3Ti4O12"; Physical Review B 72, 104111, 2005; 11 Pages.
Hongtao Yu, Hanxing Liu, Hua Hao, Dabing Luo, Minghe Cao; "Dielectric properties of CaCu3Ti4O12 ceramics modified by SrTiO3; Science Direct"; Materials Letters 62 (2008); pp. 1353-1355.
Ruxing Li, Jinrong Cheng, Zhongyan Meng, Wenbiao Wu; "Low dielectric loss and enhanced tunable properties of Cr-doped barium strontium titanate solid solution"; J Mater Sci: Mater Electron (2006); 17; pp. 587-591.
Seunghwa Kwon, Chien-Chih Huang, Eric A. Patterson, David P. Cann, Edward F. Alberta, Seongtae Kwon, Wesley S. Hackenberger, David P. Cann; "The effect of Cr2O3, Nb2O5 and ZrO2 doping on the dielectric properties of CaCu3Ti4O12"; Science Direct; Materials Letters 62 (2008); pp. 633-636.
Guozhong Zang, Jialiang Zhang, Peng Zheng, Jinfengwang and Chunlei Wang; "Grain boundary effect on the dielectric properties of CaCu3Ti4O12 ceramics"; Journal of Physics D: Applied Physics; 38 (2005); pp. 1824-1827.
Jinshu Wang, Shu Yin, Masakazu Komatsu, Qiwu Zhang, Fumio Saito, Tsugio Sato; "Preparation and characterization of nitrogen doped SrTiO3 photocatalyst"; Science Direct; Journal of Photochemistry and Photobiology A: Chemistry 165 (2004); pp. 149-156.
Rainer Schmidt and Derek C. Sinclair; "Anomalous Increase of Dielectric Permittivity in Sr-Doped CCTO Ceramics Ca1-xSrxCu3Ti4O12 (0 ex e 0.2)" ; Chemistry of Materials Communication; Received Oct. 19, 2009; vol. XXX, No. XX, XXXX; 3 Pages.
Adnan Kutubuddin Bohori, James William Bray, Somakumar Ramachandrapanicker, Suma Memana Narayana Bhat; "Contactless Power Transfer System and Method"; U.S. Appl. No. 12/731,497, filed Mar. 25, 2010; 29 Pages.
S.B. Hemer, F.A. Selmi, V.V. Varadan and V.K. Varadan; "The effect of various dopants on the dielectric properties of barium strontium titanate"; Materials Letters I5 ( 1993); pp. 317-324.
Manoj Raama Varma ,N. D. Kataria; "Effect of dopants on the low temperature microwave dielectric properties of Ba(Zn1/3Ta2/3)O3 ceramics"; J Mater Sci: Mater Electron (2007); vol. 18; pp. 441-446.

(Continued)

Primary Examiner — Karl Group
(74) Attorney, Agent, or Firm — Paul J. DiConza

(57) ABSTRACT

A dielectric material is provided. The material includes $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof; x can vary between the value of zero and 0.1 such that $0 \le x \le 0$; y, z, and r can vary between the value of zero and 1 such that $0 \le y \le 1$, $0 \le z \le 1$, and $0 \le r \le 1$; p and q can vary between the value of zero and 0.1 such that $0 \le p \le 0.1$ and $0 \le q \le 0.1$; $\delta$ can vary between the value of zero and 0.05 such that $0 \le \delta \le 0.05$; and $\alpha$ can vary between the value of 0.5 and 1 such that $0.5 \le \alpha \le 1$, with a proviso that when $x=y=0$ and $z=\alpha=1$, p and q are greater than zero; and when $x=y=z=0$, p and q are not simultaneously zero. A dielectric component including the dielectric material and a system including the dielectric component are provided.

14 Claims, 61 Drawing Sheets

(56) References Cited

OTHER PUBLICATIONS

L.B. Kong A, S. Li B,T.S. Zhang B, J.W. Zhai C, F.Y.C. Boey D, J. Mad; "Electrically tunable dielectric materials and strategies to improve their performances"; Progress in Materials Science (2010); vol. 55 ; pp. 840-893.

Kalaga Murali Krishna; Lohit Matani; Adnan Kutubuddin; Bohori Suma Memana Narayana Bhat; Somakumar Ramachandrapanicker; "Dielectric Materials for Power Transfer System"; U.S. Appl. No. 12/778,166, filed May 12, 2010; 40 Pages.

Kalaga Murali Krishna; Jay Chakraborty; Lohit Matani; Adnan Kutubuddin Bohori; Suma Memana Narayana Bhat; Somakumar Ramachandrapanicker; "Dielectric Materials for Power Transfer System"; U.S. Appl. No. 12/778,189, filed May 12, 2010; 40 Pages.

* cited by examiner

DIELECTRIC MATERIALS

CROSS REFERENCE TO RELATED APPLICATIONS

This application is a continuation in part of co-pending U.S. patent application Ser. No. 12/778,189, entitled "DIELECTRIC MATERIALS FOR POWER TRANSFER SYSTEM" filed 12 May 2010, which is hereby incorporated by reference herein in its entirety.

This application is related to co-pending U.S. patent application Ser. No. 13/075,911, entitled "DIELECTRIC MATERIALS" filed contemporaneously herewith, which application is hereby incorporated by reference.

BACKGROUND

The invention relates generally to dielectric materials, and, in particular, to rare-earth-element-based titanate systems.

A dielectric material is an insulating material that does not conduct electrons easily and thus has the ability to store electrical energy when a potential difference exists across it. Common dielectric materials include glass, mica, mineral oil, paper, paraffin, polystyrene, plastics, phenolics, epoxies, aramids, and porcelain. In electronic circuits, dielectric materials may be employed as capacitors. High dielectric constant materials may be used in radar or microwave applications and for circuit miniaturization as the speed of propagation of signal is related to the dielectric constant of the medium through which it passes. If the loss tangent for a material of a given frequency signal is very low, the electrical loss related to the hysteresis decreases resulting in an efficient signal transmission.

There is a need for a dielectric material that has one or more desirable characteristics, such as, a high dielectric constant, a low loss tangent, the ability to withstand a wide range of temperatures, the ability to operate in wide range of frequencies, voltages, atmospheric conditions, and pressures, and the capability for use in the manufacture of composite structures that can be used alone or in combination with other materials.

BRIEF DESCRIPTION

Briefly, in one embodiment, a material is provided. The material comprises $Ca_{1-x-y}Ba_xSr_yTi_{1-z}Cr_zO_{3-\delta}A_p$, wherein A is nitrogen, fluorine, or combinations thereof; x and y can vary between the value of zero and one such that $0<x<1$ and $0<y<1$; z can vary between the value of zero and 0.01 such that $0\leq z\leq 0.01$; and $\delta$ and p can vary between the value of zero and one such that $0\leq\delta\leq 1$ and $0\leq p\leq 1$, with a proviso that z and p are not simultaneously zero.

In one embodiment, a dielectric component is provided. The dielectric component comprises a material comprising $Ca_{1-x-y}Ba_xSr_yTi_{1-z}Cr_zO_{3-\delta}A_p$, wherein A is nitrogen, fluorine, or combinations thereof; x and y can vary between the value of zero and one such that $0<x<1$ and $0<y<1$; z can vary between the value of zero and 0.01 such that $0\leq z\leq 0.01$; and $\delta$ and p can vary between the value of zero and 1 such that $0\leq\delta\leq 1$ and $0\leq p\leq 1$, with a proviso that z and p are not simultaneously zero.

In another embodiment, a system is provided. The system comprises a dielectric component. The dielectric component comprises a material comprising $Ca_{1-x-y}Ba_xSr_yTi_{1-z}Cr_zO_{3-\delta}A_p$, wherein A is nitrogen, fluorine, or combinations thereof; x and y can vary between the value of zero and one such that $0<x<1$ and $0<y<1$; z can vary between the value of zero and 0.01 such that $0\leq z\leq 0.01$; and $\delta$ and p can vary between the value of zero and 1 such that $0\leq\delta\leq 1$ and $0\leq p\leq 1$, with a proviso that z and p are not simultaneously zero.

In one embodiment, a material is provided. The material comprises $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof; x can vary between the value of zero and 0.1 such that $0\leq x\leq 0$; y, z, and r can vary between the value of zero and 1 such that $0\leq y\leq 1$, $0\leq z\leq 1$, and $0\leq r\leq 1$; p and q can vary between the value of zero and 0.1 such that $0\leq p\leq 0.1$ and $0\leq q\leq 0.1$; $\delta$ can vary between the value of zero and 0.05 such that $0\leq\delta\leq 0.05$; and $\alpha$ can vary between the value of 0.5 and 1 such that $0.5\leq\alpha\leq 1$, with a proviso that when x=y=0 and z=α=1, p and q are greater than zero; and when x=y=z=0, p and q are not simultaneously zero.

In one embodiment, a dielectric component is provided. The dielectric component comprises a material comprising $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof; x can vary between the value of zero and 0.1 such that $0\leq x\leq 0$; y, z, and r can vary between the value of zero and 1 such that $0\leq y=1$, $0\leq z\leq 1$, and $0\leq r\leq 1$; p and q can vary between the value of zero and 0.1 such that $0\leq p\leq 0.1$ and $0\leq q\leq 0.1$; $\delta$ can vary between the value of zero and 0.05 such that $0\leq\delta\leq 0.05$; and $\alpha$ can vary between the value of 0.5 and 1 such that $0.5\leq\alpha\leq 1$, with a proviso that when x=y=0 and z=α=1, p and q are greater than zero; and when x=y=z=0, p and q are not simultaneously zero.

In another embodiment, a system is provided. The system comprises a dielectric component. The dielectric component comprises a material comprising $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof; x can vary between the value of zero and 0.1 such that $0\leq x\leq 0$; y, z, and r can vary between the value of zero and 1 such that $0\leq y\leq 1$, $0\leq z\leq 1$, and $0\leq r\leq 1$; p and q can vary between the value of zero and 0.1 such that $0\leq p\leq 0.1$ and $0\leq q\leq 0.1$; $\delta$ can vary between the value of zero and 0.05 such that $0\leq\delta\leq 0.05$; and $\alpha$ can vary between the value of 0.5 and 1 such that $0.5\leq\alpha\leq 1$, with a proviso that when x=y=0 and z=α=1, p and q are greater than zero; and when x=y=z=0, p and q are not simultaneously zero.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include materials that have different compositions and may be used as dielectric materials.

In the following specification and the claims that follow, the singular forms "a", "an" and "the" include plural referents unless the context clearly dictates otherwise.

Materials having low dielectric loss tangent along with high dielectric constant are desired for various electrical applications. Therefore, materials that have both high dielectric constant and low dielectric loss tangent at the frequency of operation of intended applications are desirable.

In one embodiment, it is desirable to use dielectric materials whose dielectric properties such as dielectric constant and loss tangent are substantially stable over a certain frequency range of the desired applications. The term "substantially stable" herein means that the change in values does not lead to more than about 10% of the performance variation of the power transfer system. Thus, the required value and width of the frequency ranges may vary depending on the applications for which the material is used. In one embodiment, the desired frequency range is from about 100 Hz to about 100 MHz. In some embodiments, the desired frequency range is from about 1 kHz to about 100 kHz. In another embodiment, the desired frequency range is from about 100 kHz to about 1 MHz. In one more embodiment, the desired frequency range is from about 1 MHz to about 5 MHz.

The dielectric materials that have the desired dielectric properties can be employed in multiple applications. Non limiting examples include varactor diode replacement, tunable capacitors with low losses, tunable filters, phase shifters, multiplexers, voltage control oscillators, tunable matching network for power amplifiers, low noise amplifiers, general impedance matching network.

Figure 1:
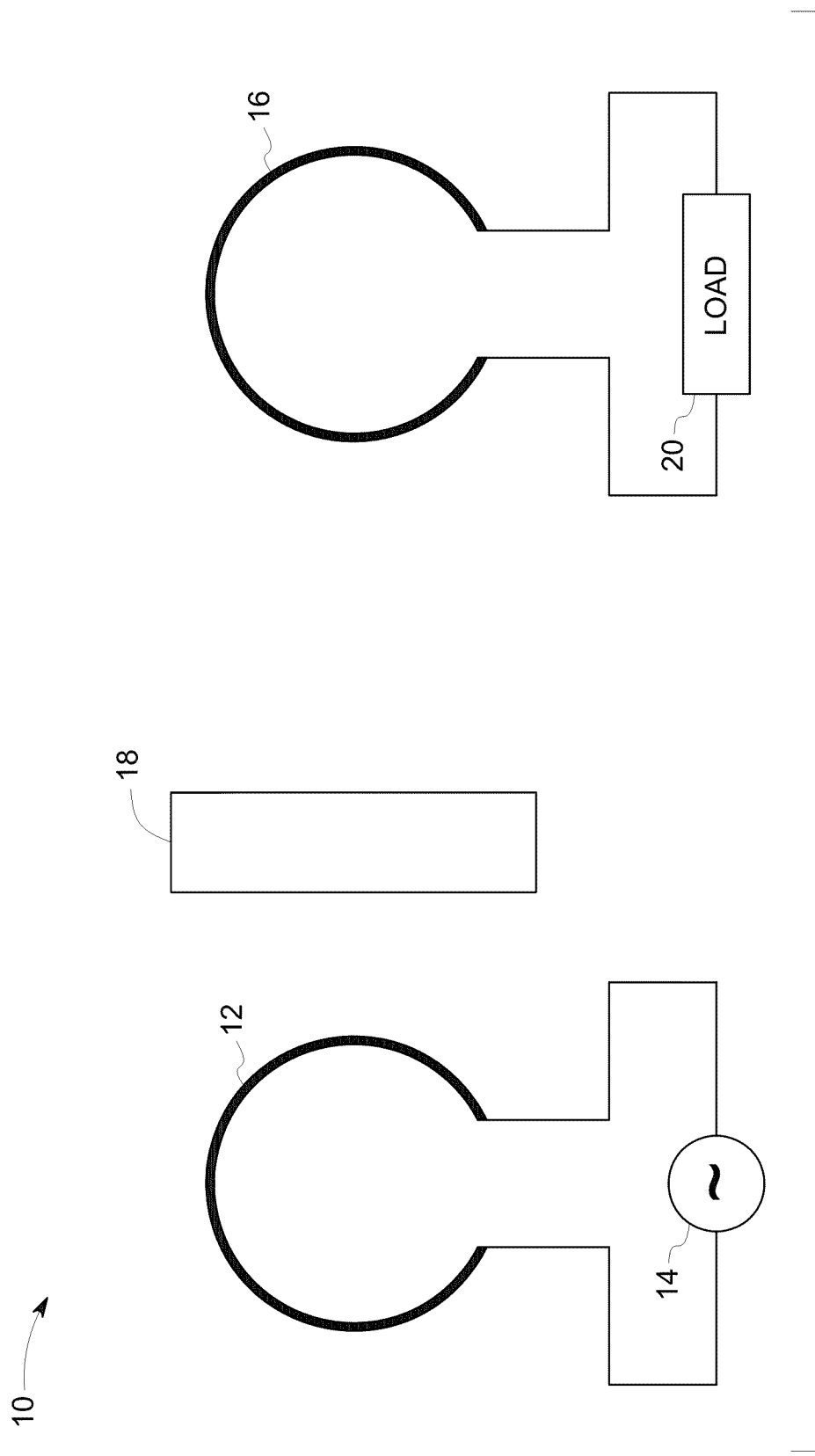
FIG. 1 illustrates an example system including a dielectric component employing dielectric materials according to an embodiment of the invention.

FIG. 1 illustrates an exemplary system 10 employing dielectric materials according to an embodiment of the invention. In this example, a contactless power transfer system includes a first coil 12 coupled to a power source 14 and configured to produce a magnetic field (not shown). A second coil 16 is configured to receive power from the first coil 12 and distribute to a load 20. A dielectric component in the form of a field focusing element 18, including a dielectric material according to an embodiment of the present invention is disposed between the first coil 12 and the second coil 16 for focusing the magnetic field from power source 14. In another embodiment, the field focusing element may be used to focus electric fields and/or electro-magnetic fields.

Materials such as, but not limited to, barium strontium titanate and calcium copper titanate are examples of materials exhibiting high dielectric constants. Barium strontium titanate—(Ba, Sr)TiO$_3$—and calcium copper titanate—CaCu$_3$Ti$_4$O$_{12}$—have different crystal structures and exhibit different temperature dependent characteristics. For example, (Ba, Sr)TiO$_3$ belongs to a perovskite family and is a ferroelectric material. CaCu$_3$Ti$_4$O$_{12}$ is not a ferroelectric material and has a body centered cubic (b.c.c) structure. The factors influencing the dielectric properties such as dielectric constant and dielectric loss tangent in the (Ba, Sr)TiO$_3$ and CaCu$_3$Ti$_4$O$_{12}$ systems may also be different. For example, it is believed that the generation and ordering of dipoles is a reason for the Ferro electricity and the high dielectric constant in the (Ba, Sr)TiO$_3$ system, while the CaCu$_3$Ti$_4$O$_{12}$ system is thought to have the effects arising from barrier layer capacitance by having insulating grain boundaries and semi conducting grains.

In one embodiment, the dielectric material is used as a bulk material. The term "bulk material" as used herein indicates any material that has a three dimensional structure with all of the sides greater than about 1 mm In one embodiment, the dielectric materials are used as coatings. The coating can be in a thin film form or in a thick film form. As used herein a "thin film" has a thickness less than about 100 microns, while a thick film can have thickness from about a hundred microns to about a millimeter.

In one embodiment, a combination of materials can be used for getting different desirable dielectric properties such as, for example, high dielectric constant low loss tangent values, constant dielectric constant over a varied frequency range, and constant dielectric constant over a varied voltages. For example, a mixture of two or more materials having high dielectric constant or two or more materials having high permeability can be used as a dielectric material for a particular application. In another example, a mixture of two or more materials, each having different desirable properties at a particular frequency or voltage range may be used as a dielectric material.

The inventors studied different ways of improving the desirable dielectric properties of the dielectric materials belonging to the (Ba, Sr)TiO$_3$ and CaCu$_3$Ti$_4$O$_{12}$ systems. The different methods investigated for the property enhancements include, but are not limited to, cation doping, anion doping, grain boundary doping, density increment, composite formations, and changing the sintering conditions, sintering atmospheres, and structural and microstructural aspects.

Accordingly, in one embodiment, a material system represented by $Ca_{1-x-y}Ba_xSr_yTi_{1-z}Cr_zO_{3-\delta}A_p$ is provided, wherein A is nitrogen, fluorine, or combinations thereof; $0<x<1$; $0<y<1$; $0\leq z\leq 0.01$; $0\leq \delta \leq 1$; and $0\leq p \leq 1$, with a proviso that z and p are not simultaneously zero. This material system will be henceforward referred to as "BST material system" for simplicity. As used herein in the BST material system, the representation $Ca_{1-x-y}Ba_xSr_yTi_{1-z}Cr_zO_{3-\delta}A_p$ is a theoretical formula including the mixtures and compounds that are in the specified ratio to be denoted by this formula, and does not necessarily mean that a single compound exists in a form that can be identified by standard characterization techniques. In short, a material specified by the above formula may actually exist as multiple phases which, taken collectively, has an overall composition as specified by the formula.

As used herein and elsewhere in this application, the term 'greater than zero' denotes that the intended component is intentionally added, rather than an incidental amount that may be present as an impurity. Further, end points of the ranges include incidental variations above and below the stated number, as appropriate for normal measurement and process variations.

In one embodiment, a material system with the formula $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$ is provided, wherein M is aluminum, chromium, zirconium, or combinations thereof, and $0\leq x\leq 0.1$, $0\leq y\leq 1$, $0\leq z\leq 1$, $0\leq p\leq 0.1$, $0\leq \delta \leq 0.05$, $0\leq r\leq 1$, and $0.5\leq \alpha \leq 1$, with a proviso that when $x=y=0$ and $z=\alpha=1$, p and q are greater than zero; and when $x=y=z=0$, p and q are not simultaneously zero. The first part of this material system is is denoted herein as "CCT material system". The second part is a variation of BST material system. Therefore the material system with the representation $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$ will be henceforward referred to as "CCTBST material system" for simplicity.

As used herein in the CCTBST material system, the representation $Ca_{1-x-y}Ba_xSr_y(Ca_{1-z}Cu_z)Cu_{2-p}La_{2p/3}Ti_{4-q}M_qO_{12-\delta}$ and $\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$ are theoretical formulae including the mixtures and compounds that are in the specified ratio to be denoted by these formulae, and do not necessarily mean that a single compound exists in a form that can be identified by standard characterization techniques. In short, a material specified by the above formulae may actually exist as multiple phases which, taken collectively, have an overall composition as specified by the formulae.

In general, the cation dopants were found to increase resistance of the grain boundary by absorbing the oxygen vacancies and thereby decrease both the dielectric constant and loss tangent. By doping at cation site, the doped cation gets reduced by absorbing electron density at the grain boundary, thereby decreasing conduction of the grain boundary, thus leading to the decrease in dielectric constant and loss.

In general, by doping at the anion site, the cation of the lattice gets reduced by absorbing the electron density thereby creating insulating planar defects in the grains. The insulating planar defects can reduce the electrical resistivity of internal barrier of the grains and thereby decrease the dielectric loss.

In the BST material system, the barium and strontium levels were varied and studied for their effects on favorable dielectric properties. Thus, in one embodiment, a BST material system is provided such that $0.9 \leq (x+y) \leq 1$. Therefore, in this embodiment, the calcium doping is comparatively less as seen in the example $Ba_{0.55}Sr_{0.4}Ca_{0.05}Ti_{1-z}Cr_zO_{3-\delta}A_p$. In a further embodiment, $0.3 \leq x$ and $(x+y)=1$. Therefore, in this embodiment the BST material system does not contain calcium or any other dopants in the barium or strontium sites. Example of the above BST material system includes, but is not limited to, $Ba_{0.3}Sr_{0.7}Ti_{1-z}Cr_zO_{3-\delta}A_p$.

In one embodiment of the BST material system, the titanium is partially replaced by chromium, which may help to decrease the loss tangent. In one embodiment, the chromium is substituted for less than about 2 atomic % of titanium in the BST material system. In a subsequent embodiment, the chromium substitution is in the range of about 0.01 atomic % to about 1 atomic %. Thus, in this embodiment, the quantity z in the formula above varies between about 0.0001 and about 0.01. In a further embodiment, the chromium substitution is in the range of about 0.2 atomic % to about 1 atomic % of titanium with the z value varying between about 0.002 and about 0.01.

In one embodiment, $0<z\leq0.01$ and $(x+y)=1$ in a BST material system. Therefore, in this embodiment, there is a certain level of chromium substitution at the titanium sites. An example for this system includes $Ba_{0.3}Sr_{0.7}Ti_{0.99}Cr_{0.01}O_{3-\delta}A_p$. In one embodiment, in a BST material system, $z>0$, and $\delta$ and $p$ are both equal to 0. In this embodiment, the BST material system comprises cation substitutions, but not anion substitutions. Examples of the above BST material systems include, but are not limited to, $Ba_{0.3}Sr_{0.7}Cr_{0.002}Ti_{0.998}O_3$, $Ba_{0.3}Sr_{0.7}Ti_{0.995}Cr_{0.005}O_3$, and $Ba_{0.4}Sr_{0.6}Ti_{0.998}Cr_{0.002}O_3$.

In a BST material system, when titanium is substituted with a trivalent cation, such as chromium in the above example, the oxygen level can also stoichiometrically change. For instance in the system $Ba_{0.3}Sr_{0.7}Cr_{0.002}Ti_{0.998}O_3$, the number of oxygen atoms can be 2.999, instead of 3, to accommodate substitution of 0.002 atoms of chromium. In one embodiment, in the BST material system, the barium or strontium is partially replaced by calcium and titanium is partially replaced by chromium. Examples of the above BST material systems include, but are not limited to, $Ba_{0.55}Sr_{0.4}Ca_{0.5}Cr_{0.002}Ti_{0.908}O_3$.

Table 1 below represents some examples of the BST material systems and their dielectric properties with the varying levels of barium and strontium and with some cation dopants.

TABLE 1

| BST material system | Frequency | Dielectric constant | Loss tangent |
|---|---|---|---|
| $Ba_{0.4}Sr_{0.6}Cr_{0.002}Ti_{0.998}O_3$ | 1 kHz-1 MHz | >740 | <0.09 |
| | ~339 kHz | >740 | ~0.0004 |
| $Ba_{0.4}Sr_{0.6}Cr_{0.005}Ti_{0.995}O_3$ | 1 kHz-1 MHz | >910 | <0.009 |
| | ~660 kHz | >910 | <0.0002 |

In one embodiment of the power transfer system with a BST material system, the oxygen is partially replaced through anion doping. Nitrogen and fluorine are two examples of anion dopants used to substitute for oxygen. Oxygen in the BST material system may be substituted by nitrogen and fluorine individually or in a combination. In one embodiment, oxygen is substituted by nitrogen or fluorine such that $0 \leq \delta \leq 1$; and $0 \leq p \leq 1$ in the BST material system. Therefore, in one embodiment, the anion substitution is such that about 25% or less of oxygen in the BST material system is substituted by anion. In one embodiment, depending on the process conditions, the nitrogen is in an oxidation state of −3 while substituting for oxygen in the BST material system. In one embodiment, the oxygen is substituted by an anion such that $0 \leq \delta \leq 1$ and $0 \leq p \leq 0.8$. In one embodiment, the substitution replaces less than about 10 atomic % of oxygen in the BST material system. In one embodiment, the oxygen is substituted by anion such that $0<\delta\leq0.5$ and $0<p\leq0.4$ and in a further embodiment, the substitution is such that $0.1 \leq \delta \leq 0.5$ and $0.1 \leq p \leq 0.4$.

In one embodiment of the BST material system, oxygen is substituted by another anion such that $z=0$, and $0.1 \leq \delta \leq 0.5$ and $0.1 \leq p \leq 0.4$. Thus in this embodiment, the anion substitutions are conducted in the absence of titanium substitution. A non-limiting example for this system can be represented by $Ba_{0.3}Sr_{0.7}TiO_{2.8}N_{0.13}$. This material shows an extremely low dielectric loss of about 0.0001 with a suitable dielectric constant of about 506 at the frequency of about 2.5 MHz.

In one embodiment, the oxygen is substituted by fluorine such that $0<\delta\leq1$; and $0<p\leq0.4$. In a further embodiment, the oxygen is substituted by fluorine such that $0.1 \leq \delta \leq 1$; and $0.1 \leq p \leq 0.4$. In one embodiment, depending on the process conditions, the fluorine is in an oxidation state of −1 while substituting for oxygen in the BST material system. In another embodiment, the oxygen is substituted by both nitrogen and fluorine such that $0.1 \leq \delta \leq 0.5$ and $0.05 \leq p \leq 0.3$.

In one example, the inventors incorporated fluorine into the BST material system by varying the starting materials for preparation of BST material system and noted a decrease in the loss tangent as a result. A $Ba_{0.4}Sr_{0.6}TiO_3$ material was prepared by using $BaF_2$ and $SrF_2$ as the source of barium and strontium respectively. By starting with the fluoride sources for barium and strontium, it is expected that some of the fluorine will be substituted for oxygen, thus changing the dielectric values of the BST materials system. The $Ba_{0.4}Sr_{0.6}TiO_3$ prepared by using $BaF_2$ and $SrF_2$ showed a dielectric loss factor less than about 0.01 over the entire frequency range from 100 Hz to 10 MHz with a minimum of 0.0001 at 1.4 MHz. The material also showed a uniform dielectric constant of about 415 over the entire frequency range mentioned above. The material may be advantageously used for applications that require frequency independent operation.

In one embodiment, the BST material system is doped with both cations and anions. Thus, in one embodiment, titanium is partially replaced by chromium and oxygen is partially replaced by anions such that $z$, $\delta$ and $p$ are all greater than zero. In a further embodiment, $0<z\leq0.01$, $0<\delta\leq0.5$, and $0<p\leq0.4$. Examples of these systems include $Ba_{0.3}Sr_{0.7}Ti_{0.995}Cr_{0.005}O_{2.8}N_{0.13}$ and $Ba_{0.4}Sr_{0.6}Ti_{0.995}Cr_{0.005}O_{2.8}N_{0.13}$. The material represented by $Ba_{0.4}Sr_{0.6}Ti_{0.995}Cr_{0.005}O_{2.8}N_{0.13}$ demonstrates a loss tangent of about 0.003 with a dielectric constant of about 819 at the frequency of about 3.13 MHz. In a further embodiment, $0<(x+y)<1$ and $z$, $\delta$, and $p$ are all greater than zero such that calcium dopant is present in the barium or strontium site, chromium partially substitutes titanium, and nitrogen and/or fluorine partially substitutes oxygen. Table 2 provides dielectric values of some of the anion-doped materials in the BST material system with and without cation dopants.

TABLE 2

| BST material system | Frequency | Dielectric constant | Loss tangent |
|---|---|---|---|
| $Ba_{0.3}Sr_{0.7}TiO_{2.8}N_{0.13}$ | ~1 MHz | >500 | ~0.005 |
| | ~2.5 MHz | >500 | ~0.00015 |
| $Ba_{0.3}Sr_{0.7}Cr_{0.005}Ti_{0.995}O_{2.8}N_{0.13}$ | ~1 MHz | >480 | ~0.005 |
| | ~2.7 MHz | ~470 | ~0.0004 |
| F doped $Ba_{0.4}Sr_{0.6}TiO_3$ prepared by using $BaF_2$ and $SrF_2$ as Ba and Sr source respectively | 100 Hz-10 MHz | >400 | <0.01 |
| | 1.49 MHz | ~400 | ~0.0001 |

As presented earlier, in one embodiment, a CCTBST material system is provided with a combination of CCT material system and BST material system such that $\alpha[Ca_{1-x-y}Ba_xSr_y (Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof, and $0 \leq x \leq 0.1$, $0 \leq y \leq 1$, $0 \leq z \leq 1$, $0 \leq p \leq 0.1$, $0 \leq q \leq 0.1$, $0 \leq \delta \leq 0.05$, $0 \leq r \leq 1$, and $0.5 \leq \alpha \leq 1$, with a proviso that when $x=y=0$ and $z=\alpha=1$, p and q are greater than zero; and when $x=y=z=0$, p and q are not simultaneously zero. Thus, in one embodiment comprising CCTBST material system to be used in the field-focusing element 18, x and y are both equal to zero and z=1, and the copper is partially replaced by other suitable cations such as, for example, lanthanum. Further, the titanium is partially replaced by aluminum, chromium, zirconium, or any of their combinations. In one embodiment, any or all of the above mentioned replacements coexist. When $x=y=0$, the CCTBST material system will not have barium and strontium substitution in the calcium place. When $\alpha=1$, the CCTBST material system becomes CCT material system. When z=1, the number of copper atom present, including lanthanum substitution, in the CCTBST material system is about 3. Thus the proviso that of when $x=y=0$ and $z=\alpha=1$, p and q are greater than zero denotes a $CaCu_3Ti_4O_{12}$ system with substitution in copper and titanium sites. The lanthanum substitution at the copper site of $CaCu_3Ti_4O_{12}$ may vary such that $0<p \leq 0.1$. Similarly titanium can be substituted by aluminum, chromium, zirconium, or any combination such that $0<q \leq 0.1$. Depending on the valence states of titanium site substitutions, the oxygen may be stoichiometric or non-stoichiometric. Therefore, in the above system δ varies such that $0 \leq \delta \leq 0.05$. Examples include $CaCu_{2.9}La_{0.067}Ti_{3.99}Zr_{0.01}O_{12-\delta}$ and $CaCu_3Ti_{3.92}Cr_{0.02}Al_{0.06}O_{12-\delta}$. Table 3 lists some of the properties of the substituted $CaCu_3Ti_4O_{12}$ material.

TABLE 3

| CCT material system | Frequency | Dielectric constant | Loss tangent |
|---|---|---|---|
| $CaCu_{2.9}La_{0.067}Ti_{3.94}Al_{0.06}O_{11.97}$ | 10 kHz-60 kHz | >6000 | <0.1 |
| $CaCu_{2.9}La_{0.067}Ti_{3.98}Cr_{0.02}O_{11.99}$ | ~10 kHz | >12000 | <0.2 |

In one embodiment, when $x=y=z=0$ and $\alpha=1$, the CCTBST material system approaches substituted $Ca_2Cu_2Ti_4O_{12}$. The substitution can be at the copper site, at the titanium site or the combination of copper and titanium substitutions. In one embodiment, $Ca_2Cu_2Ti_4O_{12}$ is a material in the CCT material system of the field-focusing element 18 with about 33.3 mole % of $CaCu_3Ti_4O_{12}$ and about 66.7 mole % of $CaTiO_3$. This material, in the doped form exhibits some good dielectric properties. Examples for the substituted $Ca_2Cu_2Ti_4O_{12}$ with good dielectric properties include $Ca_2Cu_2Ti_{3.94}Al_{0.06}O_{12-\delta}$ and $Ca_2Cu_2Ti_{3.98}Cr_{0.02}O_{12-\delta}$. Further examples along with their dielectric properties can be seen from the Table 4.

TABLE 4

| CCT material system | Frequency | Dielectric constant | Loss tangent |
|---|---|---|---|
| $Ca_2Cu_2Ti_{3.99}Zr_{0.01}O_{11.995}$ | 100 kHz-130 kHz | >2000 | <0.08 |
| $Ca_2Cu_2Ti_{3.94}Al_{0.06}O_{11.97}$ | 3.5 kHz-10 kHz | >2000 | <0.04 |
| | 10 kHz-100 kHz | >2000 | <0.06 |
| $Ca_2Cu_{1.9}La_{0.067}Ti_4O_{12}$ | 100 kHz-130 kHz | >1500 | <0.09 |

In one embodiment, in the power transfer system comprising a CCTBST material system, x>0. In a related embodiment, y>0. In one further embodiment, x>0 and y>0. In an exemplary embodiment, x>0 and y>0 along with $z=\alpha=1$ and $p=q=0$. Thus, in the above embodiments, calcium is partially replaced by barium and/or strontium and the CCTBST material system approaches CCT material system. One example of a CCT material system prepared with barium and strontium dopants and demonstrating very good dielectric properties is $Ba_{0.01}Sr_{0.2}Ca_{0.79}Cu_3Ti_4O_{12}$. This material has a substantially uniform dielectric constant and loss tangent values over a wide range of frequency ranges, which makes this material useful for an application that will work over a variable range of frequencies. The dielectric constant for the material $Ba_{0.01}Sr_{0.2}Ca_{0.79}Cu_3Ti_4O_{12}$ lies in the range of about 4500-5000 and the loss tangent is in the range of about 0.06 to 0.08 for the entire frequency range from about 1 kHz to about 100 kHz. The material is suitable for contactless power transmission at any frequency lying in the range of about 1 kHz to 100 kHz. Another example for the CCT materials with x>0 and y>0 along with $z=\alpha=1$ and $p=q=0$, exhibiting good dielectric properties include $Ba_{0.01}Sr_{0.1}Ca_{0.89}Cu_3Ti_4O_{12}$.

The examples presented herein depict the different CCT material systems with their approximate measured dielectric constant and loss tangent values. While some particular examples are presented herein, the variations in the dopant combinations and levels will be appreciated by one skilled in the art.

In one embodiment of the CCTBST material system, when $0.5 \leq \alpha < 1$, the dielectric material comprises $(1-\alpha)[Ba_rSr_{1-r}TiO_3]$, along with the CCT material system. The CCTBST material of this form can be mixtures or coexistence of the CCT and BST material systems with the above mentioned formula limitations, but some of the materials of this system were found to be increasing favorable dielectric properties that are not predicted by rule of mixtures. One example of this dielectric material is $(0.6CaCu_3Ti_4O_{12}+0.4SrTiO_3)$. Individually while $CaCu_3Ti_4O_{12}$ has a dielectric value >6000 at the frequency range of about 10 kHz to about 35 kHz, the loss tangent value is around 0.1. The dielectric constant and loss tangent values of $SrTiO_3$ at this frequency range are about 70 and 0.26 respectively. However, the combination $(0.6CaCu_3Ti_4O_{12}+0.4SrTiO_3)$ has a dielectric constant value greater than about 7000 and the loss tangent value less than about 0.09 at the frequency range from about 10 kHz to about 35 kHz. Another example of this dielectric material is $(0.6CaCu_3Ti_{3.94}Al_{0.06}O_{11.97}+0.4SrTiO_3)$. This combination has a dielectric constant value greater than about 9000 and the loss tangent value less than about 0.09 at the frequency range from about 1 kHz to about 10 kHz. One more example of this material system includes $(0.6CaCu_3Ti_{3.98}Cr_{0.02}O_{12-\delta}+0.4SrTiO_3)$.

The inventors further conducted experiments on the dielectric materials by treating the materials in different atmospheres such as an oxygen-rich atmosphere, a nitrogen atmosphere, a chromium atmosphere, or a reducing atmosphere such as a hydrogen atmosphere, for example. An oxygen-rich atmosphere, for example, is able to effect changes in the dielectric properties of CCT, BST, and therefore CCTBST family materials. It is observed that in the CCT family materials, sintering in the oxygen atmosphere compensates the oxygen vacancies in the materials, thus leading to lower dielectric constant and lower loss tangent. In the BST material system, sintering in the oxygen atmosphere increases the density of materials and thus increases the dielectric constant. Sintering in nitrogen atmosphere is expected to take out some of the oxygen from the materials, thus turning the material oxygen deficient, increasing the oxygen vacancies and electron densities, and leading to high dielectric constant and increased loss tangent. Sintering in chromium atmosphere is expected to accommodate a small level of chromium in the material as a substitution or in the interstitials, thus changing the material dielectric properties. For example, a sintered sample of $CaCu_3Ti_4O_{12}$ in Cr atmosphere has yielded higher dielectric constant and lower loss tangent of 0.033 as compared to the $CaCu_3Ti_4O_{12}$ sintered in air. This decrease in loss tangent is believed to be the result of chromium doping. In one embodiment, the amount of chromium incorporated is less than about 0.01 mol % of the material. In a particular embodiment, the amount of chromium incorporated in the material by sintering in chromium atmosphere is in ppm levels.

In one experiment, BST materials were subjected to cold isostatic pressing (CIP) and also were sintered in oxygen atmosphere for obtaining better dielectric values. Examples include, but not limited to, $Ba_{0.55}Sr_{0.4}Ca_{0.05}Cr_{0.01}Ti_{0.99}O_3$ sintered in oxygen atmosphere at about 1440° C. for 2 hours that has a dielectric constant value greater than about 1300 and the loss tangent value less than about 0.001 in the frequency of about 4.95 kHz.

In one embodiment, a dielectric component comprising BST or CCTBST material systems described in above paragraphs is presented. In one embodiment, a system comprising a dielectric component that comprises the BST or CCTBST materials system is presented.

In one embodiment, the dielectric materials exist in the bulk material form and are polycrystalline, with grains and grain boundaries. Increased grain boundary conduction in BST or CCTBST material system may increase both dielectric constant and loss tangent. For example, a metallic precipitate at the grain boundary creates electrostatic potential due to the metal and electron interface, thereby increasing grain boundary conduction and, consequently, the dielectric constant and loss tangent.

In one embodiment, any of the materials described above is doped with a bismuth-containing material, such as bismuth oxide. In a further embodiment, bismuth exists in a metallic phase in the grain boundaries of the polycrystalline materials used for field-focusing element. In a related embodiment, bismuth oxide is doped and reduced to become metallic bismuth in the grain boundaries of the dielectric material. In one embodiment, the bismuth oxide is introduced to the grain boundaries by mixing $Bi_2O_3$ and $TiO_2$ with the calcined BST powders before forming the BST materials into the bulk form that is incorporable into a component, and sintering.

In one embodiment, less than about 3 mole % of $Bi_2O_3.3TiO_2$ is present the CCT material system. The CCT material system doped with $Bi_2O_3.3TiO_2$ show very good temperature stability up to about 700° C. along with reasonable voltage tunability as will be further demonstrated in the examples and figures below. Temperature stable dielectric materials are advantageous in preparing devices that work efficiently regardless of temperature variations. Applications of temperature-stable dielectric materials include, but are not limited to, high temperature stable devices including sensors, multilayer ceramic capacitors, and dielectric absorbers. For example, the dielectric materials described above may be used as the robust absorption materials of electromagnetic waves in industries such as aviation so that the airplane is not easily detected by the radar system.

In one embodiment, less than about 3 mole % of $Bi_2O_3.3TiO_2$ is present the BST material system. In one embodiment, the BST material system has a metallic bismuth phase in the grain boundaries. It is found that the dielectric constant of the BST material system increases significantly by having a metallic bismuth phase in the grain boundaries. In some instances, the increment in dielectric constant value of the BST material system by disposing metallic bismuth in the grain boundary was more than about two orders of magnitude. The BST material system with grain boundary bismuth precipitation, the material is temperature stable up to about 200° C. while exhibiting an enhanced voltage tunability showing variations in the dielectric constant at low levels of voltage such as up to about 5 volts.

The voltage tunable characteristic of a dielectric material system is useful in many applications such as, but not limited to, varactor diode replacement, tunable capacitors with low losses, tunable filters, phase shifters, multiplexers, voltage control oscillators, tunable matching network for power amplifiers, low noise amplifiers, thermoelectric effect including power systems, general impedance matching network, wireless communication antennas and inverted F-antenna that is tuned using a ferroelectric capacitor, phased array antennas made using dielectric thick films, ferroelectric varactors for capacitive shunt switching, liquid crystal displays, limiters of electromagnetic waves and more particularly to RF waves, spatial light modulator, thermodynamically stable substrate type materials for electronic semiconductor devices, optical switches using ferroelectric liquid crystal displays, radio frequency phase shift devices or the devices capable of producing a continuous, reciprocal, differential RF phase shift with a single control voltage, tunable radio frequency (RF) microelecromechanical system (MEMS) capacitive switches and electrically tunable delay line.

Examples for the BST materials that had grain boundary doping, and that show desirable dielectric properties, include $Ba_{0.3}Sr_{0.7}Cr_{0.002}Ti_{0.998}O_3$ doped with about 1 mole % $Bi_2O_3.3TiO_2$. This material showed a dielectric constant of about 7668 with a dielectric loss of about 0.007 at about 1.4 MHz. Another example of a dielectric material with both cation and grain boundary doping is $Ba_{0.3}Sr_{0.7}Cr_{0.005}Ti_{0.995}O_3$ doped with about 1 mole % $Bi_2O_3.3TiO_2$. This material demonstrates a very high dielectric constant of greater than about 3,470,000 at the frequency of about 100 Hz. However, this material has a high loss tangent value of about 1 that may limit the application of the material in high power transfer application.

In one embodiment, a BST material system having an anion doping is further doped with grain boundary dopants. In one embodiment, oxygen is partially replaced by nitrogen and bismuth was disposed in the grain boundaries. An example of a BST material that had both anion doping and grain boundary doping, and that showed desirable dielectric properties, includes $Ba_{0.3}Sr_{0.7}TiO_{2.8}N_{0.13}$ doped with about 1 mole % $Bi_2O_3.3TiO_2$. The above-mentioned material showed an extremely high dielectric constant of about 1,793,610 at the frequency of about 100 Hz. However, this material had a loss tangent of about 1. This material can be used for low power transfer systems. Further, experimenting on different substitution or methods for bringing down the loss tangent value may result in a more suitable material to be used in other multiple applications including high power transfer applications.

In one embodiment, a BST material system doped with cations, anions, and grain boundary dopants is presented. In one embodiment, titanium is partially replaced by chromium, oxygen is partially replaced by nitrogen, and metallic bismuth is disposed in the grain boundaries. One example of a material having cation, anion, and grain boundary dopants in the BST material system is $Ba_{0.3}Sr_{0.7}Cr_{0.005}Ti_{0.995}O_{2.8}N_{0.13}$ with about 1 mole % of $Bi_2O_3.3TiO_2$. This material showed an extremely high dielectric constant greater than about 63,000 and dielectric loss tangent of about 0.006 at a frequency of about 150 kHz. Therefore, this material is very suitable in multiple dielectric applications.

In one experiment, BST material system was densified by cold isostatic pressing before sintering. In a further embodiment, the material was also doped with the bismuth oxide in the grain boundary and the bismuth oxide was reduced to metallic bismuth by reducing atmosphere treatment such as 5% hydrogen in nitrogen at about 1200° C. for about 12 hours. In one embodiment, a bismuth doped BST material system is presented. The examples include the materials such as $Ba_{0.4}Sr_{0.6}Cr_{0.01}Ti_{0.99}O_3$+1 mole % $Bi_2O_3.3TiO_2$ and $Ba_{0.4}Sr_{0.6}Cr_{0.01}Ti_{0.99}O_3$+1 mole % $Bi_2O_3.3TiO_2$. The above-mentioned materials demonstrate extremely high dielectric constant of greater than about 11,030,000 at a frequency of about 100 Hz. However, the dielectric loss tangent of the materials has a somewhat high value of about 0.9 at a frequency of about 100 Hz. These materials may be useful in applications where a high dielectric constant is of high importance while the high loss tangent values can be accommodated such as in low power transfer applications, for example.

In some applications, it is desirable to employ dielectric materials whose dielectric properties such as dielectric constant and/or loss tangent are stable over a certain temperature range around room temperature to accommodate the changes in temperature due to, for example, environmental or operational changes. In one embodiment, the dielectric materials are beneficial if their dielectric properties are substantially stable from about −50° C. to about 150° C. "Substantially stable" as used herein indicates that the dielectric properties of the materials do not change more than about 10% of their room temperature values over a given temperature range. In one embodiment, the dielectric materials presented herein are having their dielectric properties substantially stable from about −15° C. to about 120° C. In a further embodiment, the dielectric materials have dielectric properties that are substantially stable from about −20° C. to about 60° C. In one embodiment, the BST and CCTBST materials presented here are ceramic materials stable over a wide temperature range and having dielectric properties that are stable around room temperatures.

In some applications, it is desirable to employ dielectric materials whose dielectric properties such as dielectric constant and/or loss tangent are stable over a certain voltage range to accommodate the applications that may have certain variations in voltages. In one embodiment, the dielectric materials are beneficial if their dielectric properties are substantially stable up to about 200V. "Substantially stable" as used herein indicates that the dielectric properties of the materials do not change more than about 10% over a given voltage range. In one embodiment, the dielectric materials presented herein are having their dielectric properties substantially stable up to about 150V. In a further embodiment, the dielectric materials have dielectric properties that are substantially stable up to about 100V.

In some applications, it is desirable to employ dielectric materials whose dielectric properties such as dielectric constant and/or loss tangent vary with voltage variations to accommodate the applications that may need variable dielectric properties at varied voltages. The variation of dielectric properties may be any function of voltage variations including directly proportional, inversely proportional to voltage variation.

EXAMPLES

The following examples illustrate methods, materials and results, in accordance with specific embodiments, and as such should not be construed as imposing limitations upon the claims. All components are commercially available from common chemical suppliers.
Preparation of Materials:
A general method of preparation followed for the BST, CCT, and CCTBST material systems identified in different examples are outlined below. However, one skilled in the art would appreciate that small variations in the starting materials; temperatures, times, and atmospheres of preparation, calcination, and sintering; size and shape variations of the prepared powders and bulk materials could be accommodated to the examples presented below.
Preparation of Doped CCT and BST Material Systems
Stoichiometric concentrations of $CaCO_3$, $CuO$ and $TiO_2$ were mixed and ball-milled in dry conditions and calcined at 1000° C. for 24 hours in air. The calcination temperatures and atmospheres were varied for some materials to investigate the effect of temperatures and atmospheres. $BaCO_3$, $SrCO_3$, $Cr_2O_3$, $Al_2O_3$, $La_2O_3$, $ZrO_2$ were added in the required mole percents by solid state mixing for doping barium, strontium, chromium, aluminum, lanthanum, and zirconium dopants respectively, whenever required. About 1 mole % of $Bi_2O_3.3TiO_2$ was added for grain boundary doping. Urea was used for nitrogen doping in oxygen sites by solid state mixing and calcining Stoichiometric amounts of $BaF_2$, $SrF_2$, and/or $CaF_2$ were used as starting materials for including a fluorine dopant in the oxygen site.

The calcined mixture was added with about 2 wt % polyvinyl acetate (PVA) and mixed thoroughly using an agate mortar. The mixture was further milled using ball milling in isopropanol medium. The powders were pressed into green pellets using hydraulic pressing with a pressure of 4 MPa followed by 6 MPa. For obtaining cold isostatic pressed (CIP) pellets, a CIP machine was used to further densify the hydrostatically pressed pellets. The pellets were then sintered at 1050° C., 1100° C., 1350° C., or 1440° C. for 2, 12, or 24 hours in air, oxygen, chromium, or nitrogen atmosphere, as required. 5% hydrogen in nitrogen atmosphere was used for reducing bismuth oxide to metallic bismuth during sintering. The sintered pellets were coated with silver paste for the purpose of dielectric measurement. The dielectric measurements were carried out using an Agilent 4294A impedance analyzer and verified using a Novocontrol Alpha-K impedance analyzer. XRDs of the calcined and sintered samples were verified. While the general method for the preparation, processing and dielectric value measurements of materials are outlined above, the examples provided below contain the specific details of preparation, processing, measurements, and results of some of the selected materials.

Example 1

$Ba_{0.55}Sr_{0.4}Ca_{0.05}TiO_3$ Processed By CIP

About 13.071 gm of $BaCO_3$, 9.579 gm of $TiO_2$, 10.152 gm of $Sr(NO_3)_2$ and 0.6 gm of $CaCO_3$ were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1100° C. for 2 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 4 MPa. The pellets were vacuum sealed in polyethylene film and cold isostatically pressed with about 30MPa pressure. The pellets were sintered at 1440° C. for 2 hours in air. A silver paste coating of a few microns thickness was applied to the sintered pellets and was dried at 200° C. for 2 hours. The dielectric constant and loss tangent of the pellet were then measured using Agilent 4294A impedance analyzer. Table 5 presents the dielectric measurement results of this material.

TABLE 5

| Frequency | Dielectric constant | Loss tangent |
|---|---|---|
| 100 Hz | 3156.7 | 0.2515 |
| 1 kHz | 2491.1 | 0.1169 |
| 10 kHz | 2295.2 | 0.0367 |
| 100 kHz | 2238.2 | 0.0144 |
| 1 MHz | 2208.9 | 0.0069 |
| 2.01 MHz | 2218.8 | 0.001 |
| 10 MHz | 3101.5 | 0.1617 |

Example 2

$Ba_{0.01}Sr_{0.2}Ca_{0.79}Cu_3Ti_4O_{12}$

About 0.079 gm of $BaCO_3$, 12.790 gm of $TiO_2$, 1.175 gm of $SrCO_3$, 3.165 gm of $CaCO_3$ and 9.554 gm of CuO were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1000° C. for 24 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 6 MPa. The pellets were sintered at 1100° C. for 2 hours in air. A silver paste coating of a few microns thickness was applied to the sintered pellets and was dried at 200° C. for 2 hours. The dielectric constant and loss tangent of the pellet were then measured using Agilent 4294A impedance analyzer. Table 6 presents the dielectric measurement results of this material.

TABLE 6

| Frequency | Dielectric constant | Loss tangent |
|---|---|---|
| 1 Hz | 5345.2 | 0.069 |
| 10 kHz | 4864.5 | 0.0634 |
| 34 kHz | 4672.2 | 0.0604 |
| 100 kHz | 4528 | 0.0794 |
| 1 MHz | 3638.8 | 0.3972 |
| 10 MHz | 3638.8 | 2.904 |

Example 3

$Ca_2Cu_2Ti_{3.94}Al_{0.06}O_{11.97}$

About 8.497 $CaCO_3$, 6.753 gm of CuO, 13.357 gm of $TiO_2$ and 0.955 gm of $Al(NO_3)_3.9H_2O$ were added together and hand mixed using mortar and pestle for 15 minutes. The mixture was added with approximately equal volume of isopropanol and about 3 times by volume of zirconia grinding media and rack-milled for around 6 hours. The homogeneous mixture was transferred to an alumina crucible and calcined at 1000° C. for 24 hrs. About 2 wt % of PVA was added and mixed to the calcined powder using an agate mortar. Equal volume of isopropanol was added to the resultant material and rack-milled again.

The powder was then pressed into pellets of about 3 gram weight using hydraulic pressing with a pressure of about 6 MPa. The pellets were sintered at 1100° C. for 2 hours in air. A silver paste coating of a few microns thickness was applied to the sintered pellets and was dried at 200° C. for 2 hours. The dielectric constant and loss tangent of the pellet were then measured using Agilent 4294A impedance analyzer. Table 7 presents the dielectric measurement results of this material.

TABLE 7

| Frequency | Dielectric constant | Loss tangent |
|---|---|---|
| 3.41 kHz | 2354.4 | 0.021 |
| 3.83 kHz | 2344.4 | 0.0173 |
| 10 kHz | 2303.1 | 0.0353 |
| 100 kHz | 2203.7 | 0.0612 |
| 1 MHz | 1948.4 | 0.349 |
| 10 MHz | 706.7 | 1.16 |

Temperature and Voltage Dependency of Different Dielectric Materials

Figure 2:
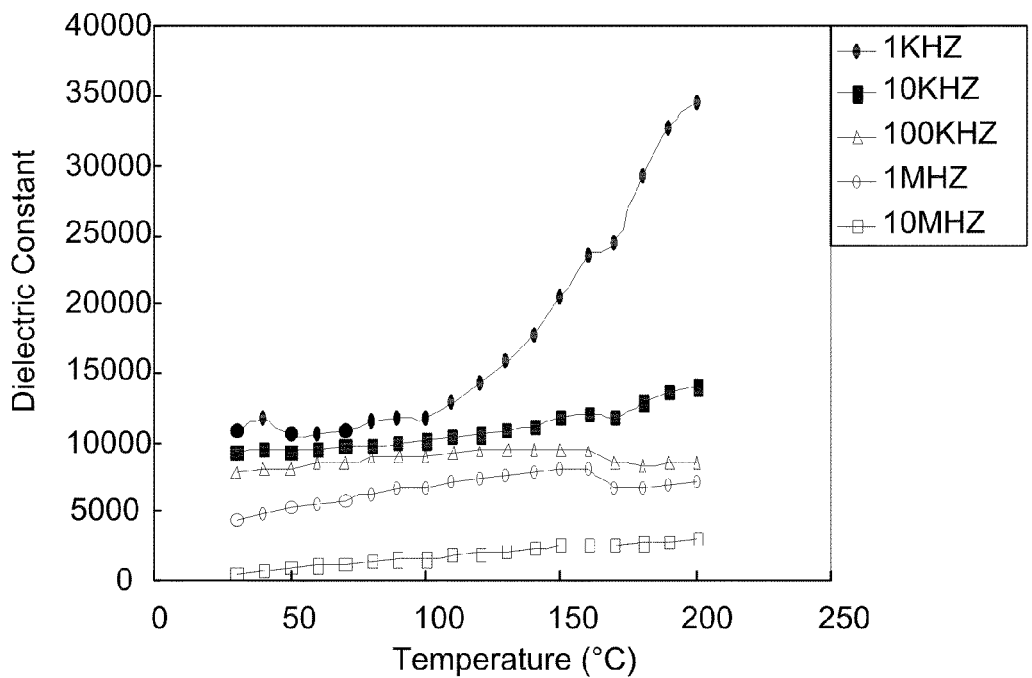
FIG. 2-121 illustrate dielectric properties of some of exemplary materials according to an embodiment of the invention.
Figure 121:
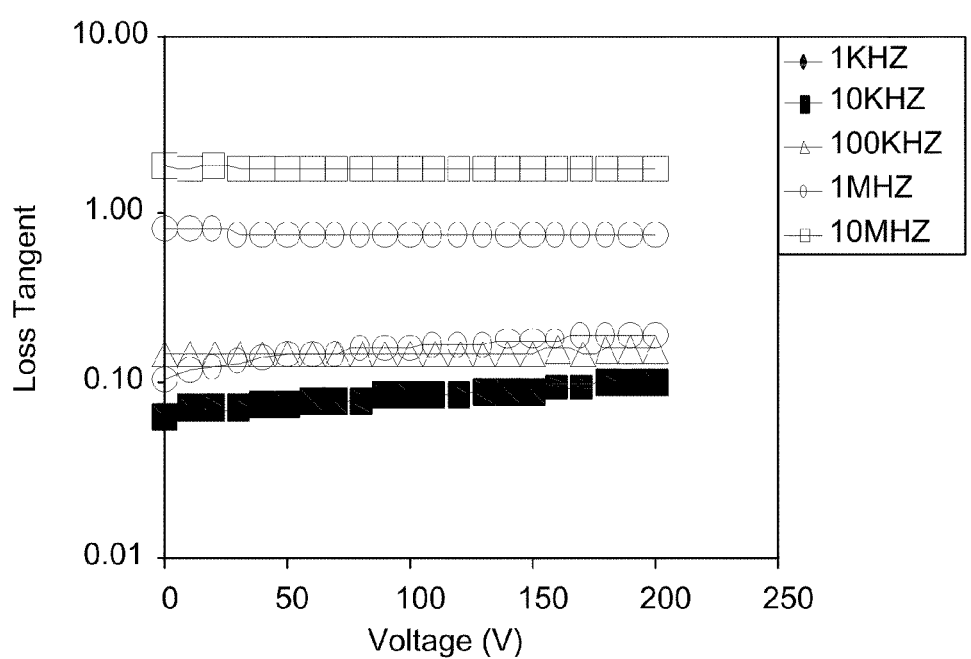

FIGS. 2-121 depict the variation of dielectric properties with respect to temperature and voltage of some of the claimed materials as detailed below.

FIG. 2 depicts the variation of dielectric constant of $0.6CaCu_3Ti_{3.94}Al_{0.06}O_{11.97}+0.4SrTiO_3$ with respect to temperature.

Figure 3:
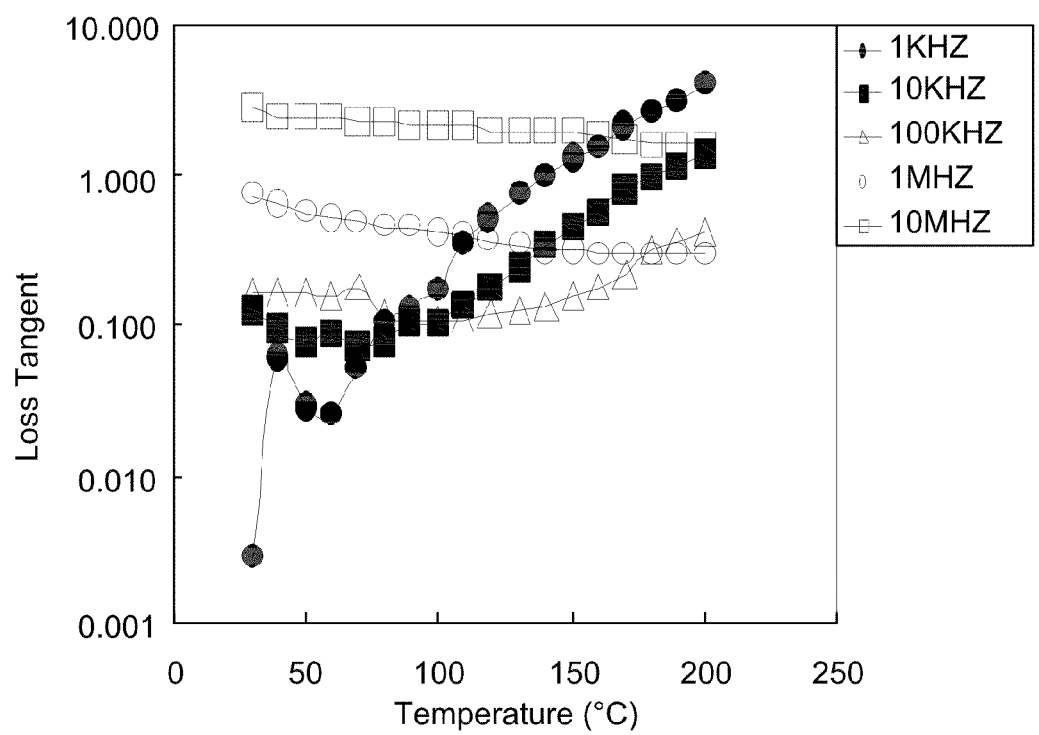

FIG. 3 depicts the variation of loss tangent of $0.6CaCu_3Ti_{3.94}Al_{0.06}O_{11.97}+0.4SrTiO_3$ with respect to temperature.

Figure 4:
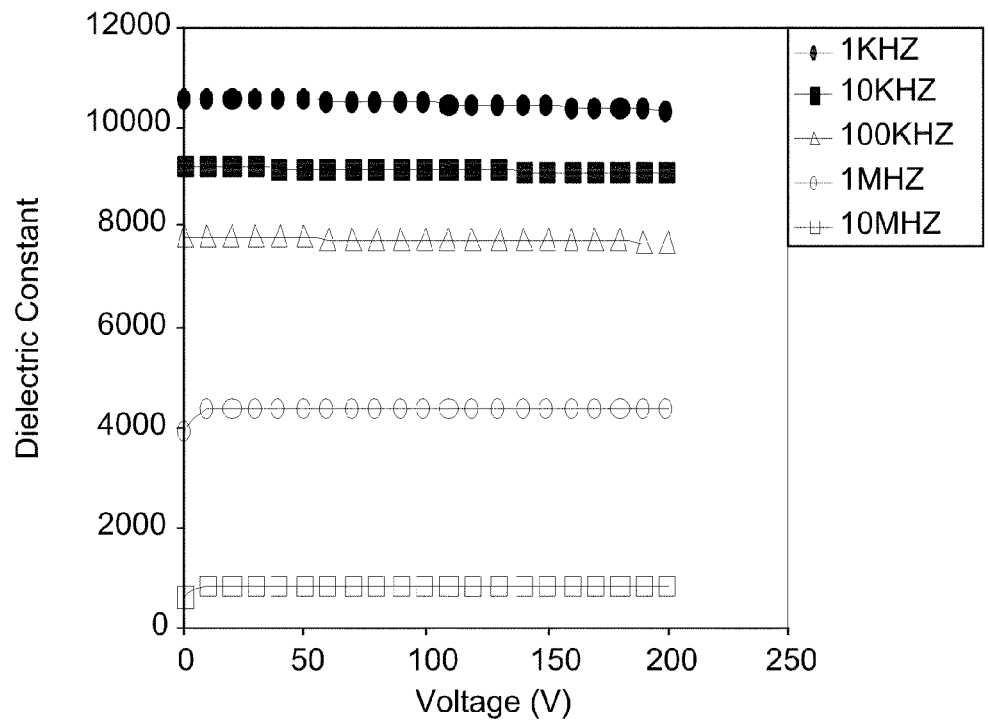

FIG. 4 depicts the variation of dielectric constant of $0.6CaCu_3Ti_{3.94}Al_{0.06}O_{11.97}+0.4SrTiO_3$ with respect to voltage.

Figure 5:
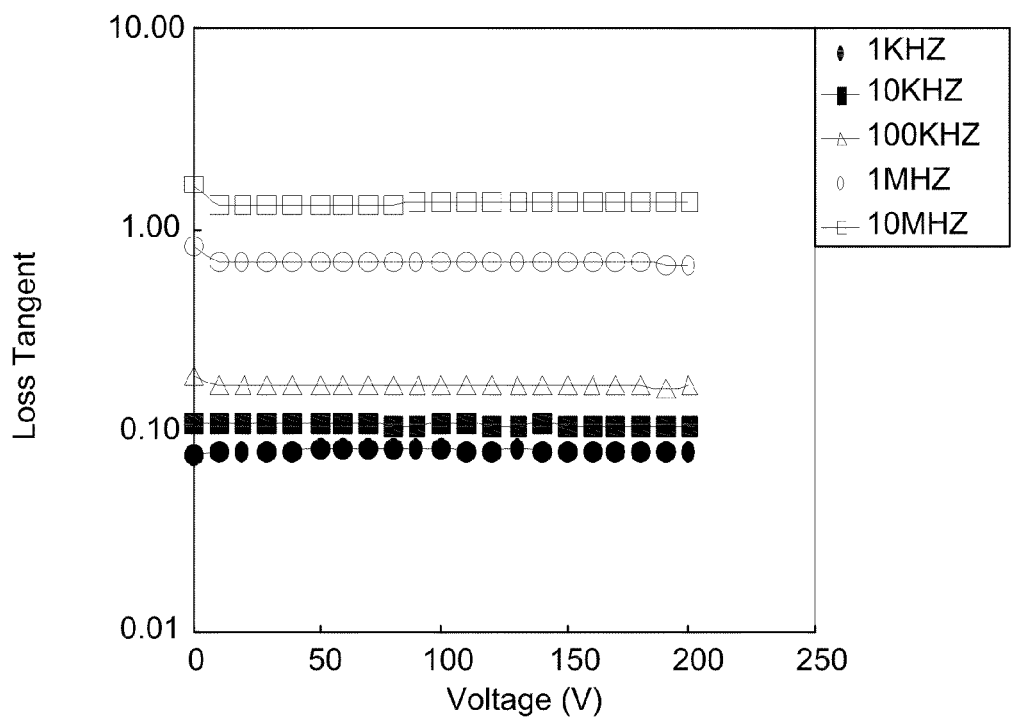

FIG. 5 depicts the variation of loss tangent of $0.6CaCu_3Ti_{3.94}Al_{0.06}O_{11.97}+0.4SrTiO_3$ with respect to voltage.

Figure 6:
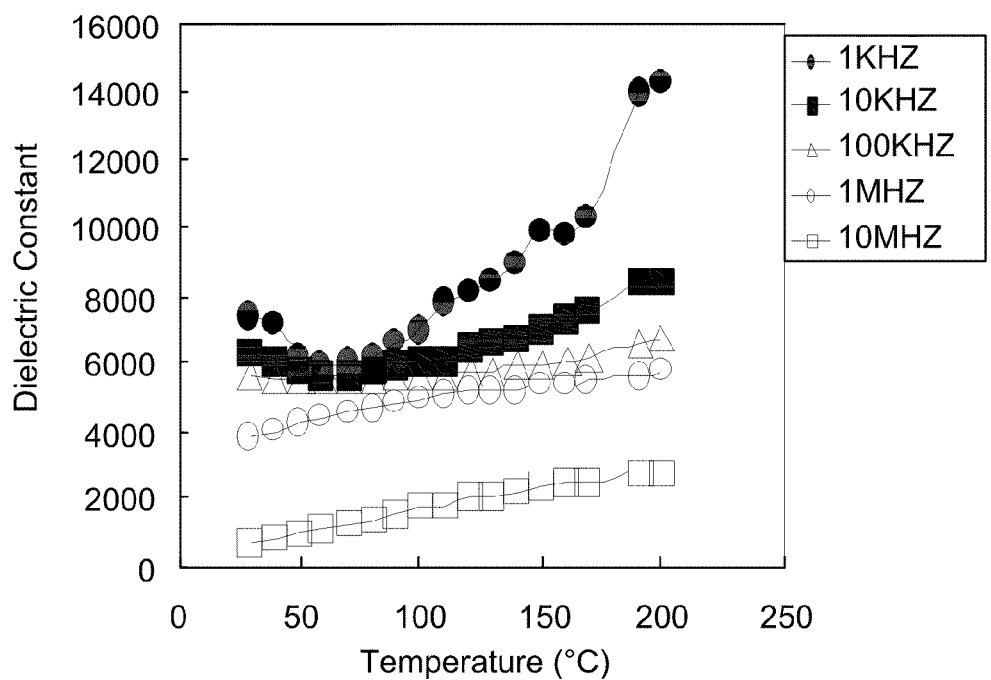

FIG. 6 depicts the variation of dielectric constant of $CaCu_{2.9}La_{0.067}Ti_{3.94}Al_{0.06}O_{11.97}$ with respect to temperature.

Figure 7:
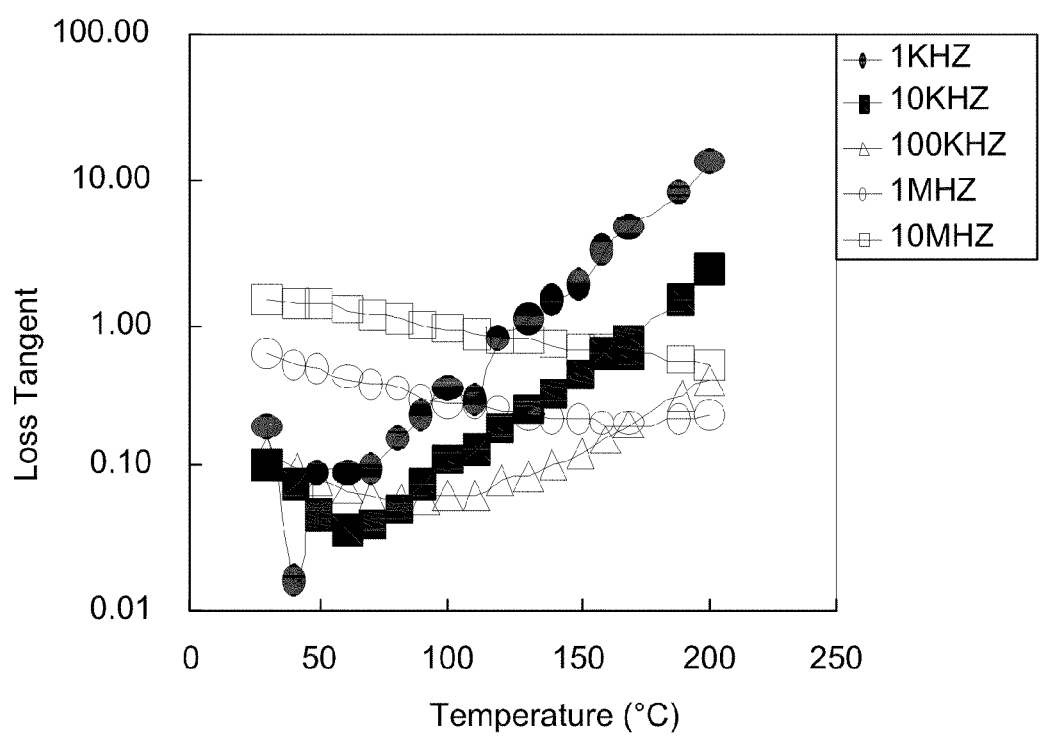

FIG. 7 depicts the variation of loss tangent of $CaCu_{2.9}La_{0.067}Ti_{3.94}Al_{0.06}O_{11.97}$ with respect to temperature.

Figure 8:
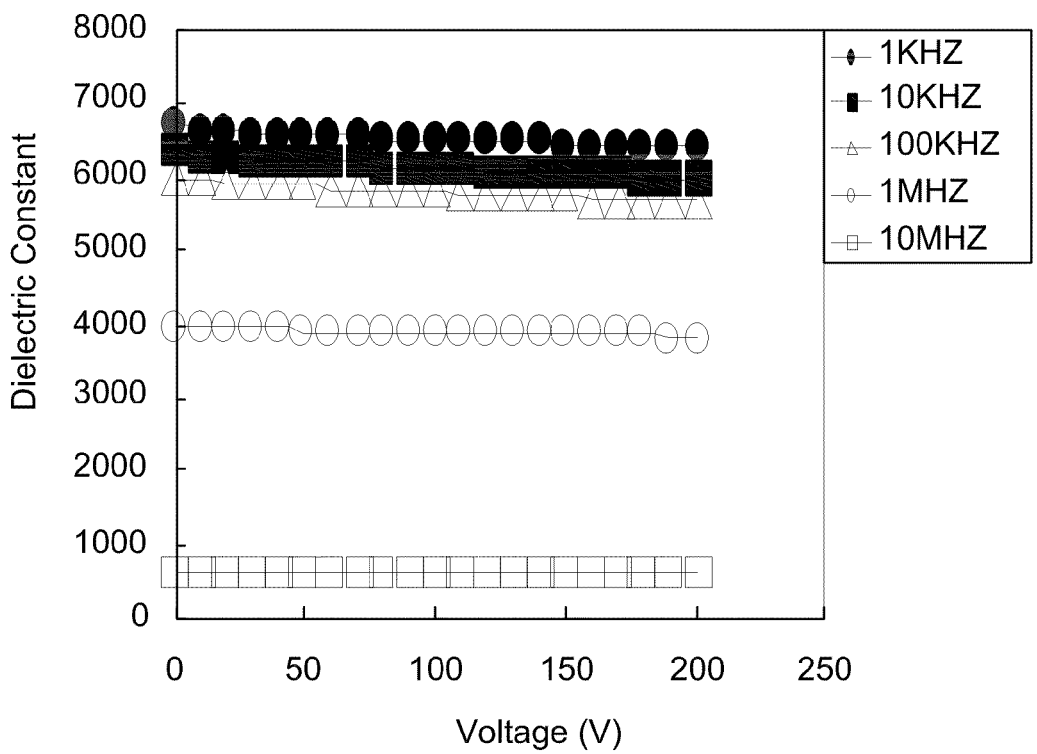

FIG. 8 depicts the variation of dielectric constant of $CaCu_{2.9}La_{0.067}Ti_{3.94}Al_{0.06}O_{11.97}$ with respect to voltage.

Figure 9:
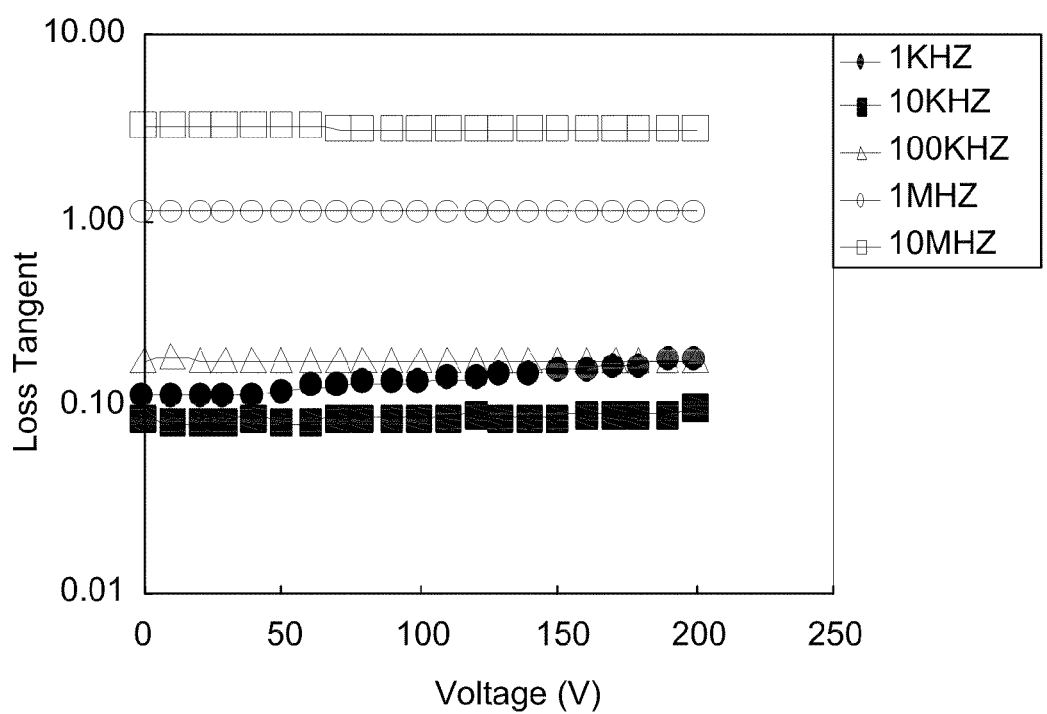

FIG. 9 depicts the variation of loss tangent of $CaCu_{2.9}La_{0.067}Ti_{3.94}Al_{0.06}O_{11.97}$ with respect to voltage.

Figure 10:
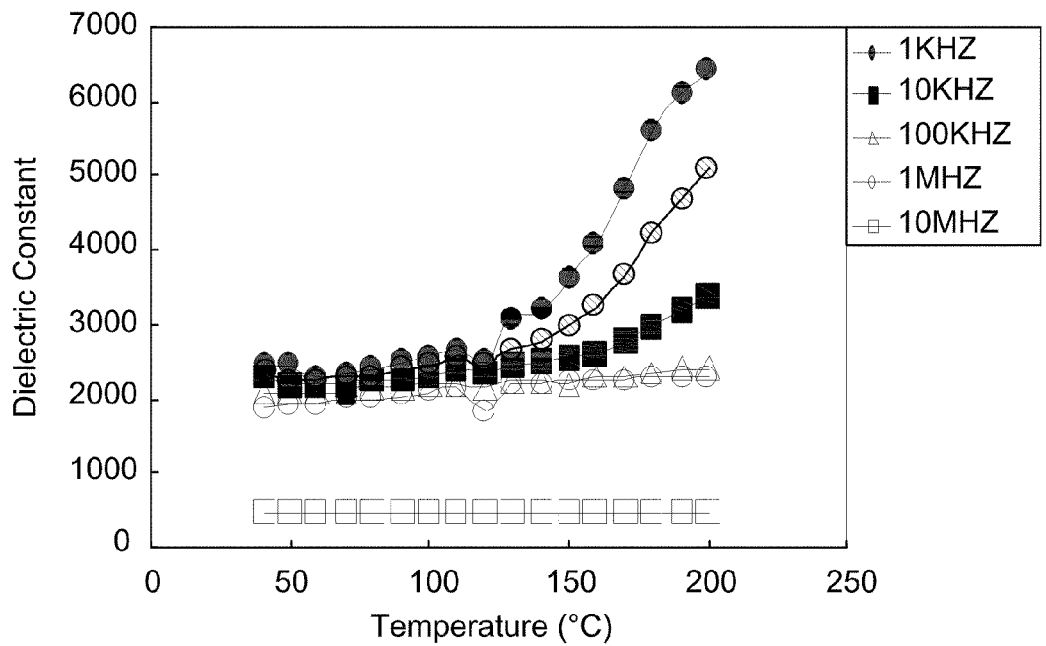

FIG. 10 depicts the variation of dielectric constant of $Ca_2Cu_2Ti_{3.94}Al_{0.06}O_{11.97}$ with respect to temperature.

Figure 11:
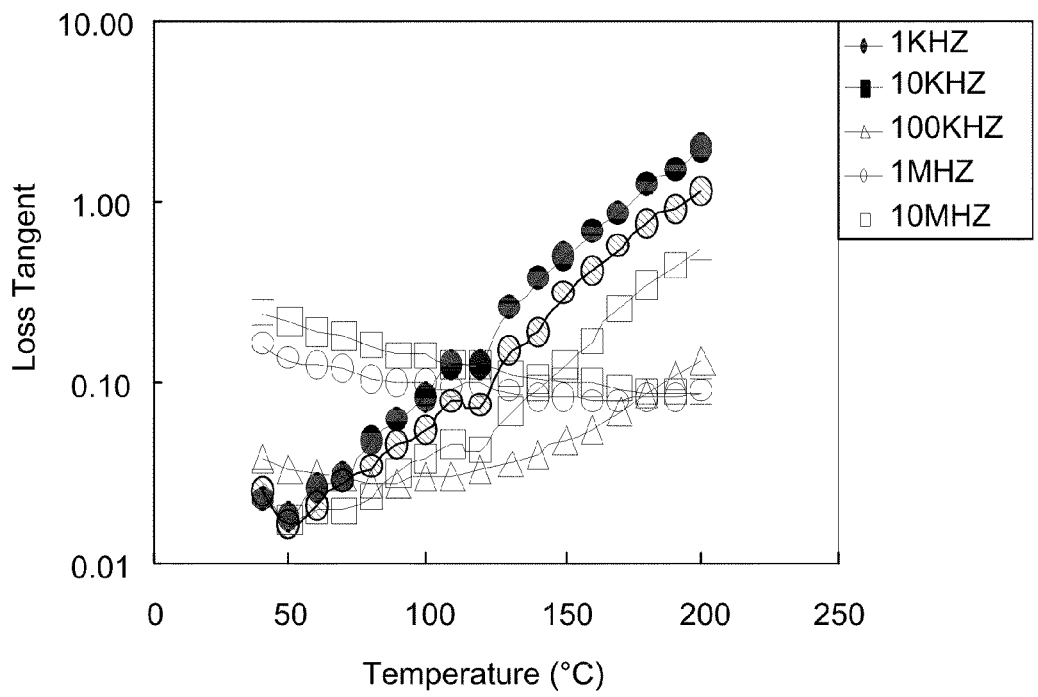

FIG. 11 depicts the variation of loss tangent of $Ca_2Cu_2Ti_{3.94}Al_{0.06}O_{11.97}$ with respect to temperature.

Figure 12:
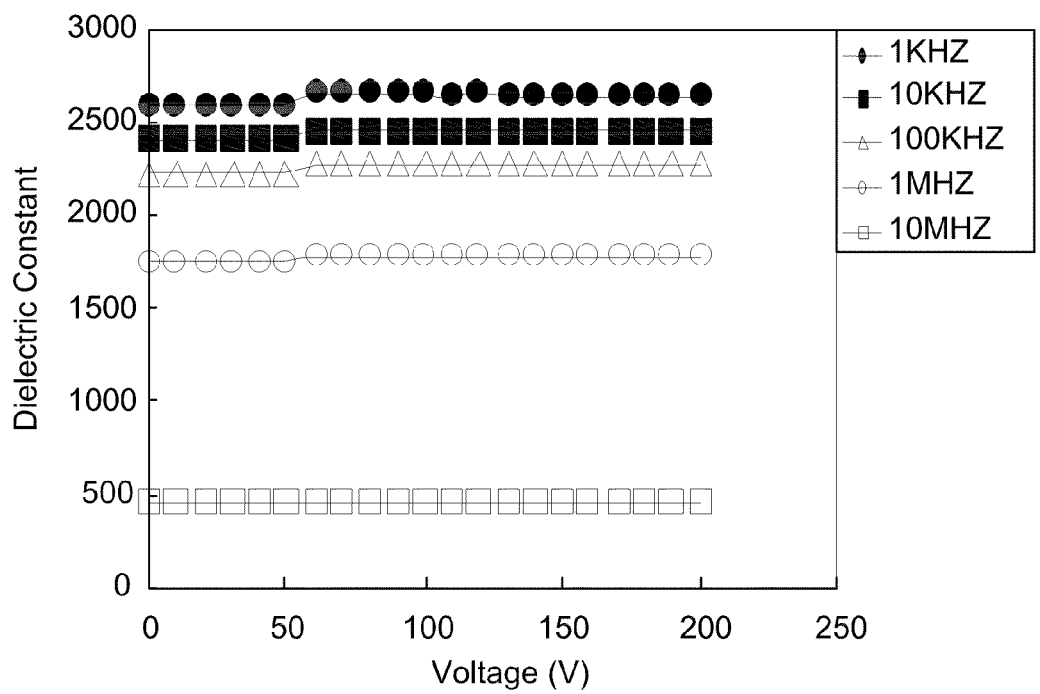

FIG. 12 depicts the variation of dielectric constant of $Ca_2Cu_2Ti_{3.94}Al_{0.06}O_{11.97}$ with respect to voltage.

Figure 13:
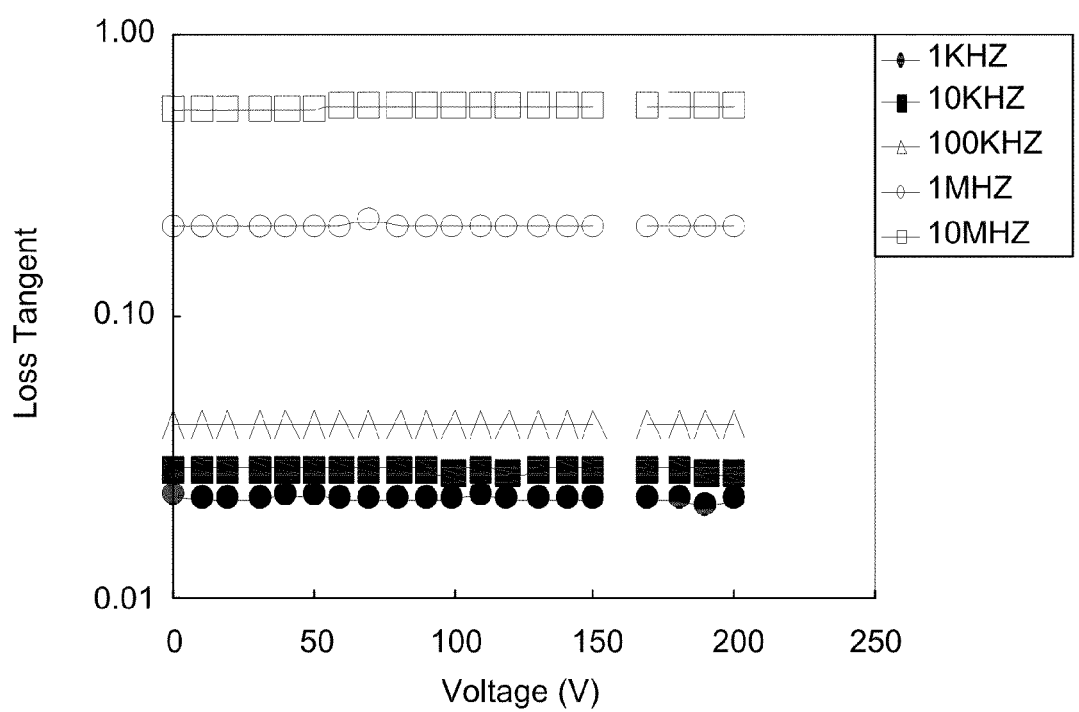

FIG. 13 depicts the variation of loss tangent of $Ca_2Cu_2Ti_{3.94}Al_{0.06}O_{11.97}$ with respect to voltage.

Figure 14:
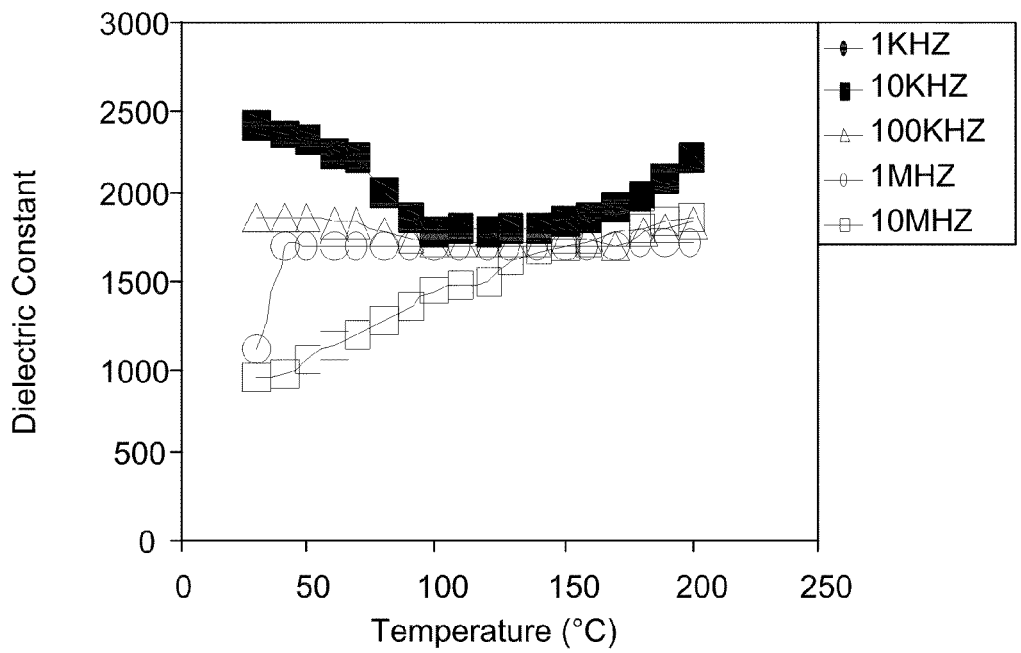

FIG. 14 depicts the variation of dielectric constant of $Ca_2Cu_2Ti_{3.99}Zr_{0.01}O_{11.995}$ with respect to temperature.

Figure 15:
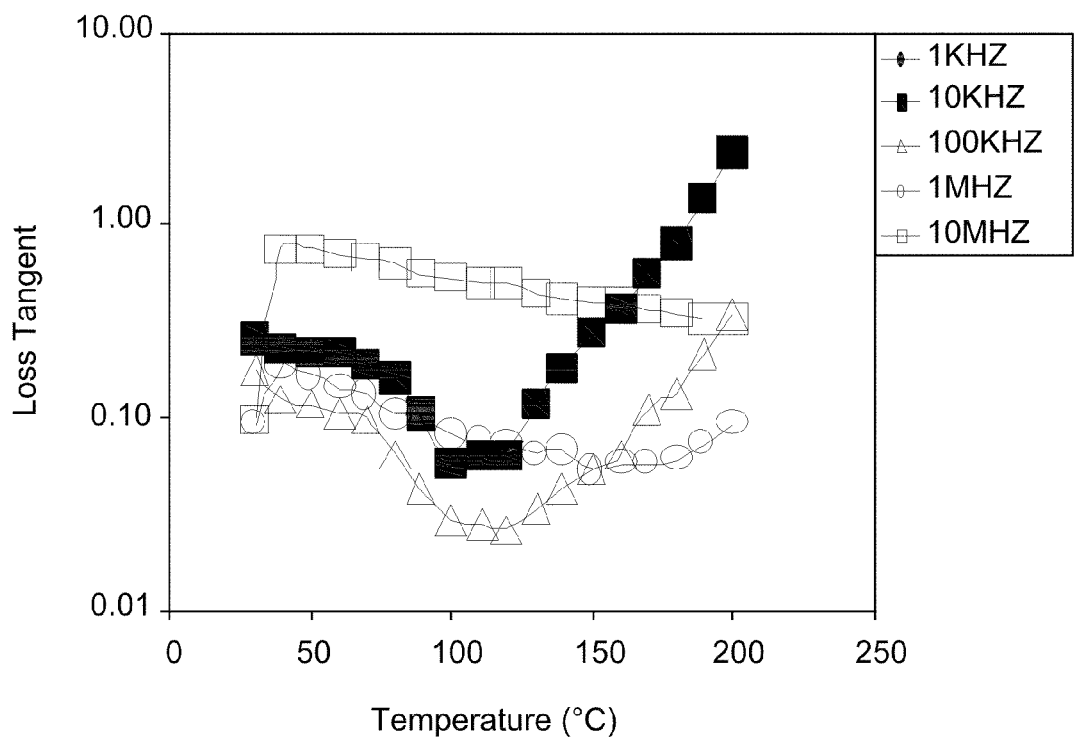

FIG. 15 depicts the variation of loss tangent of $Ca_2Cu_2Ti_{3.99}Zr_{0.01}O_{11.995}$ with respect to temperature.

Figure 16:
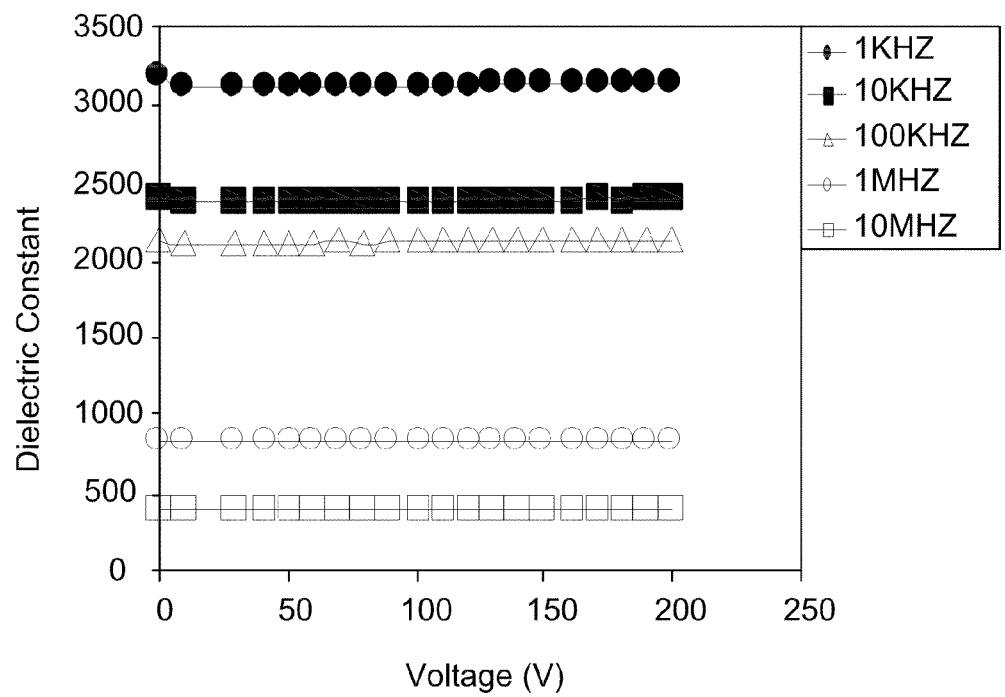

FIG. 16 depicts the variation of dielectric constant of $Ca_2Cu_2Ti_{3.99}Zr_{0.01}O_{11.995}$ with respect to voltage.

Figure 17:
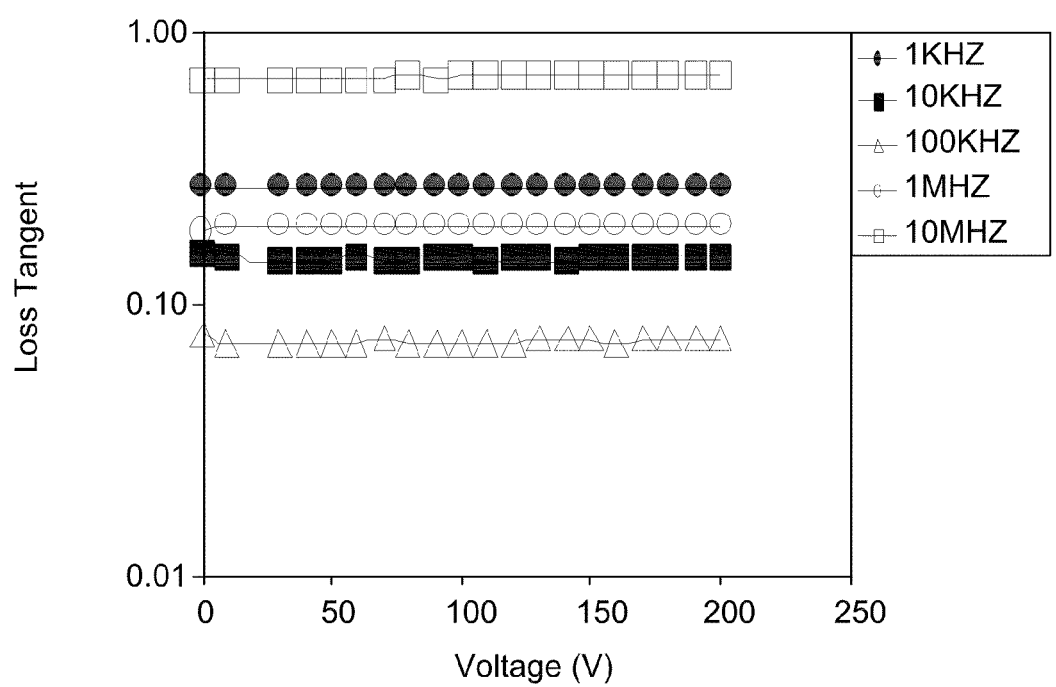

FIG. 17 depicts the variation of loss tangent of $Ca_2Cu_2Ti_{3.99}Zr_{0.01}O_{11.995}$ with respect to voltage.

Figure 18:
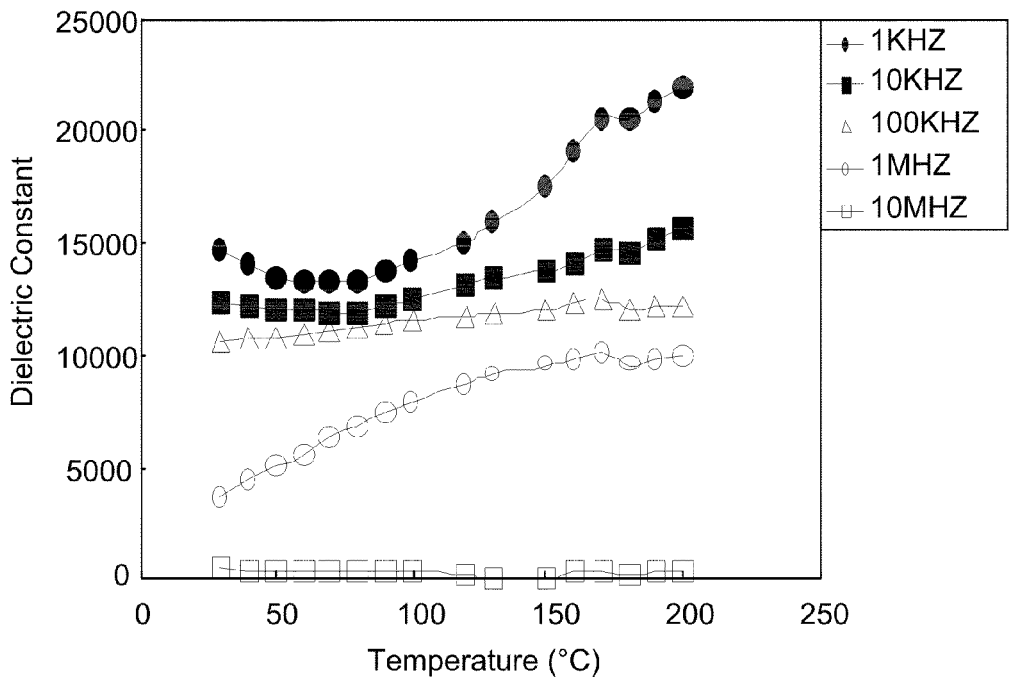

FIG. 18 depicts the variation of dielectric constant of $CaCu_3Ti_{3.94}Al_{0.06}O_{11.97}$ with respect to temperature.

Figure 19:
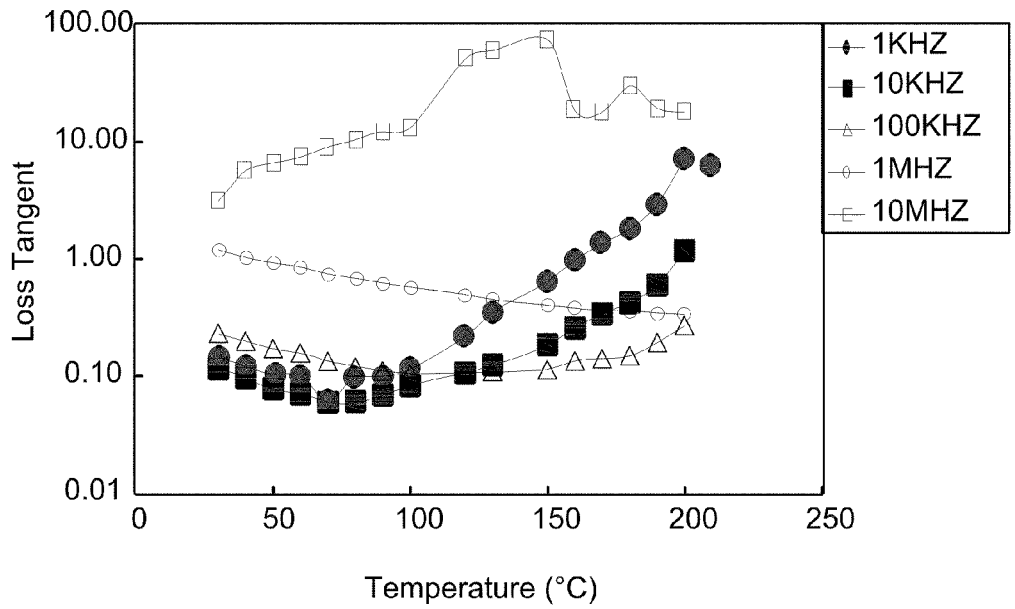

FIG. 19 depicts the variation of loss tangent of $CaCu_3Ti_{3.94}Al_{0.06}O_{11.97}$ with respect to temperature.

Figure 20:
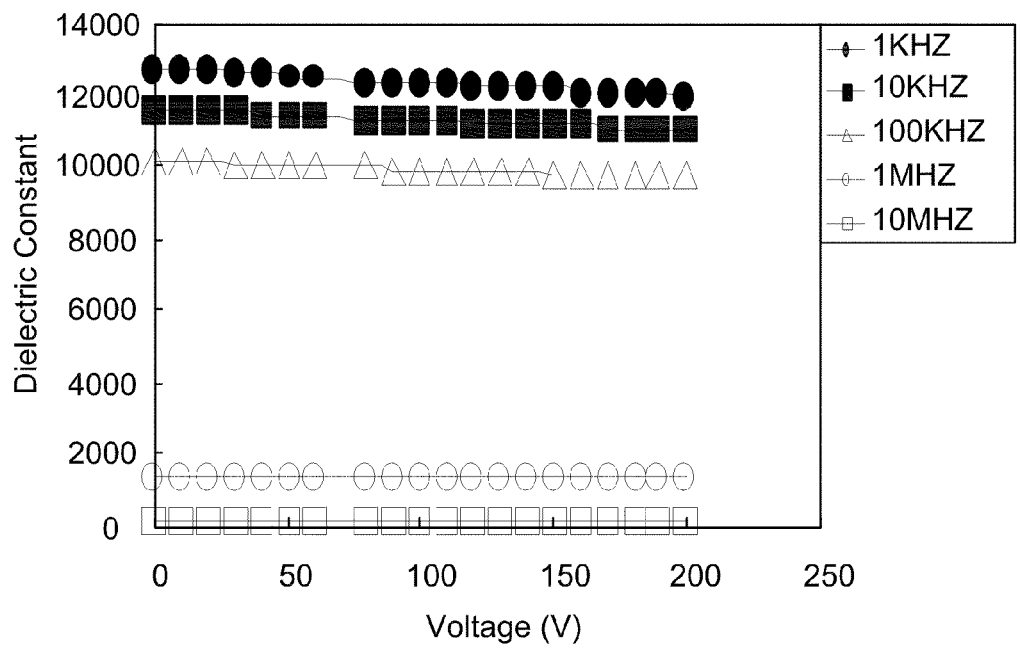

FIG. 20 depicts the variation of dielectric constant of $CaCu_3Ti_{3.94}Al_{0.06}O_{11.97}$ with respect to voltage.

Figure 21:
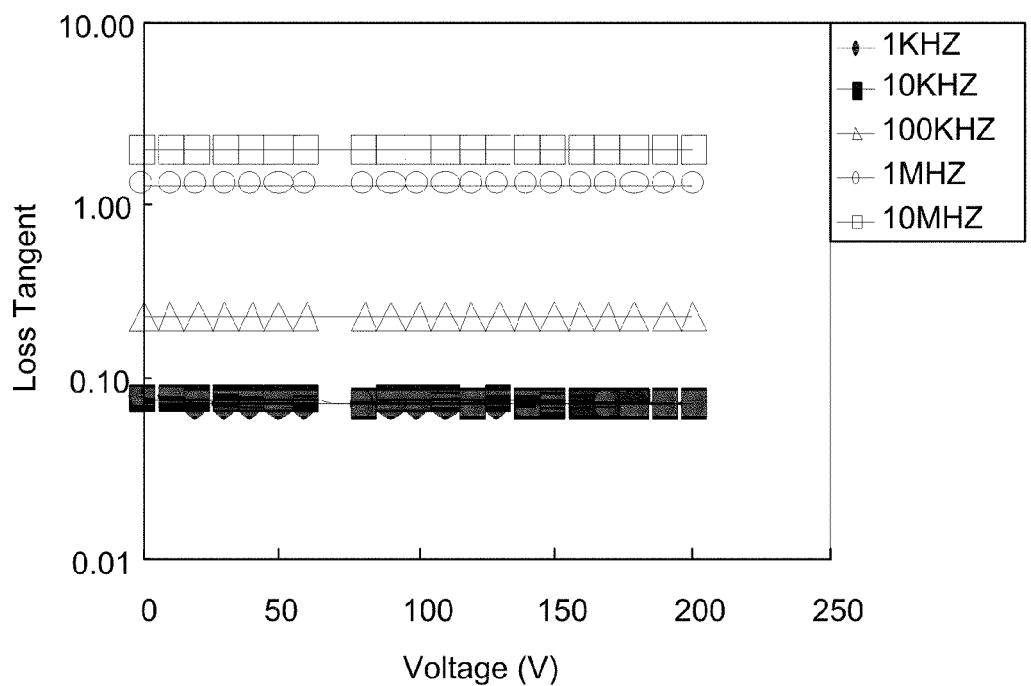

FIG. 21 depicts the variation of loss tangent of $CaCu_3Ti_{3.94}Al_{0.06}O_{11.97}$ with respect to voltage.

Figure 22:
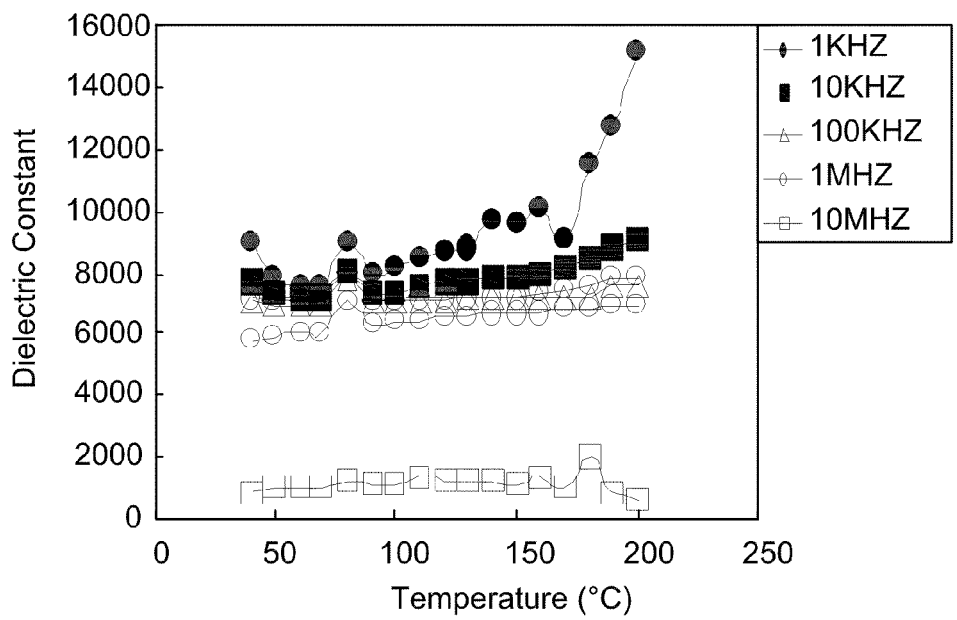

FIG. 22 depicts the variation of dielectric constant of $0.6CaCu_3Ti_4O_{12}+0.4SrTiO_3$ with respect to temperature.

Figure 23:
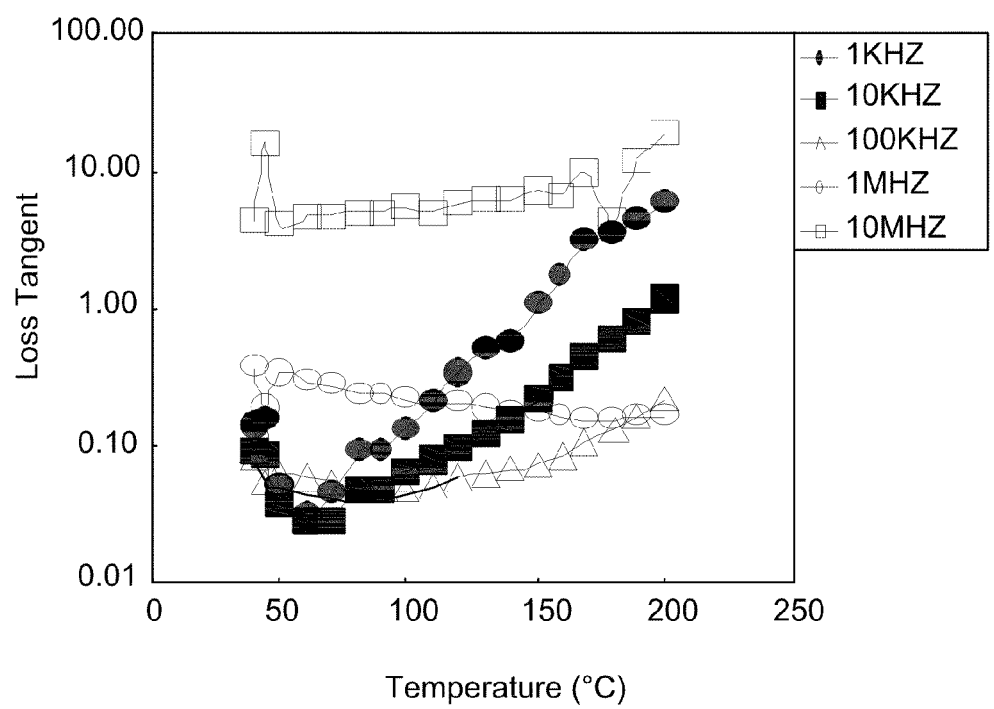

FIG. 23 depicts the variation of loss tangent of $0.6CaCu_3Ti_4O_{12}+0.4SrTiO_3$ with respect to temperature.

Figure 24:
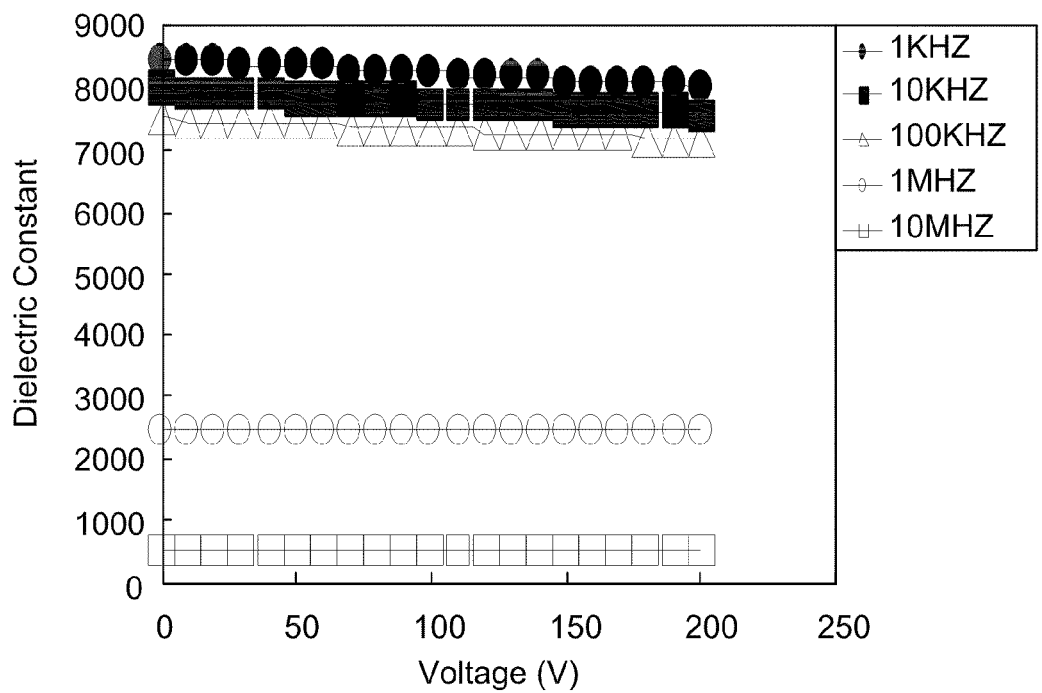

FIG. 24 depicts the variation of dielectric constant of $0.6CaCu_3Ti_4O_{12}+0.4SrTiO_3$ with respect to voltage.

Figure 25:
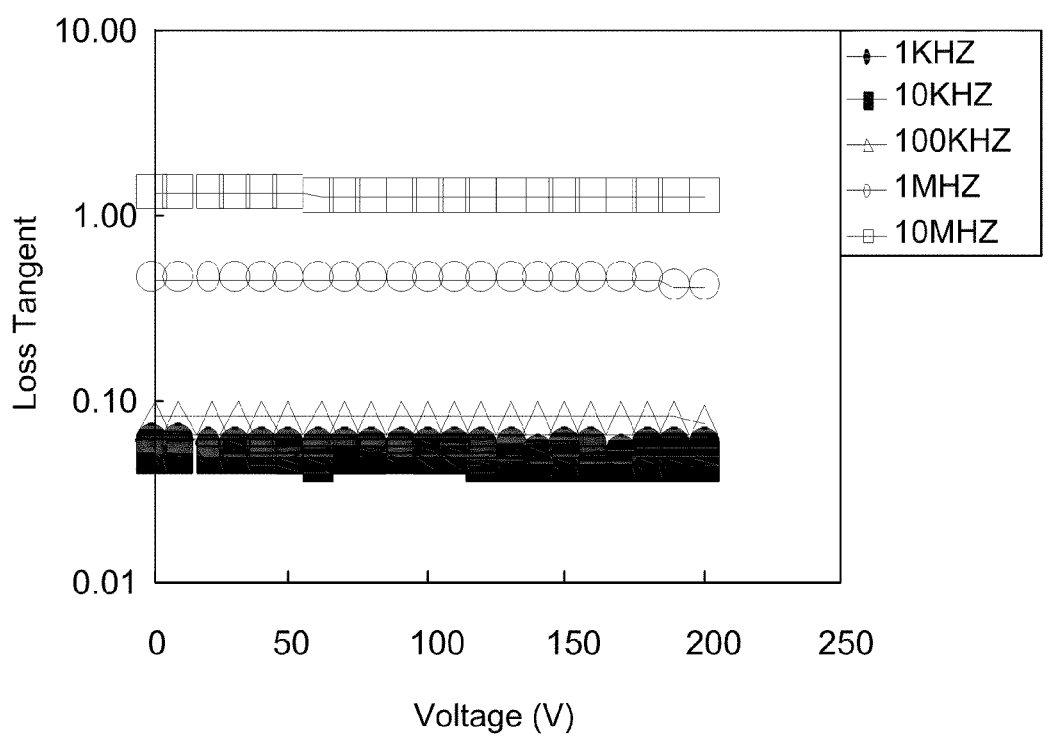

FIG. 25 depicts the variation of loss tangent of $0.6CaCu_3Ti_4O_{12}+0.4SrTiO_3$ with respect to voltage.

Figure 26:
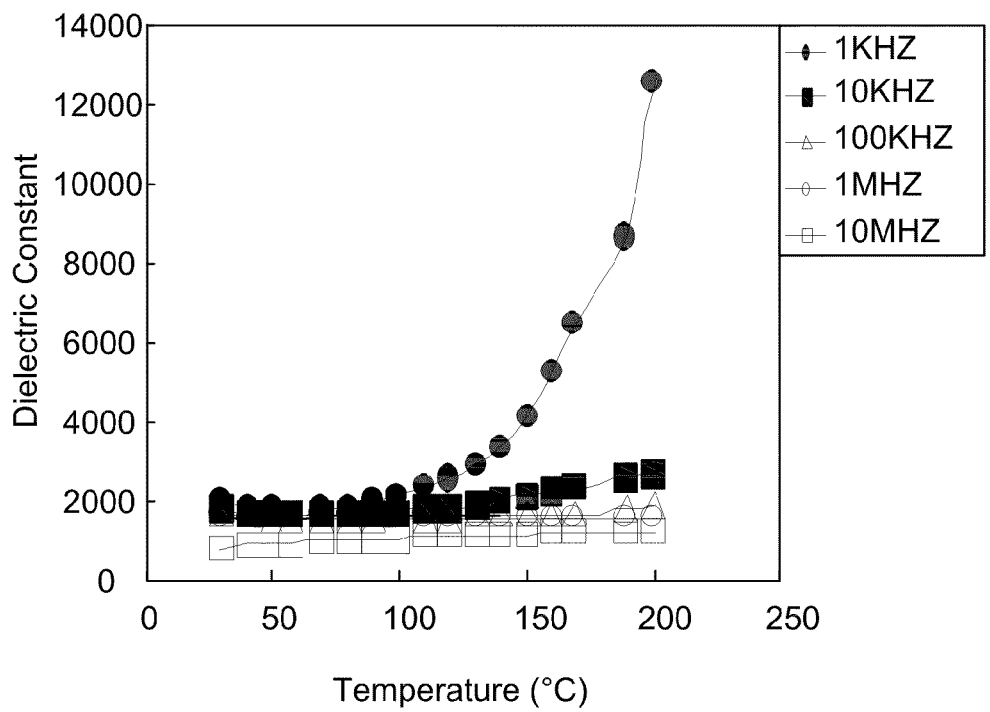

FIG. 26 depicts the variation of dielectric constant of $Ca_2Cu_{1.9}La_{0.067}Ti_4O_{12}$ with respect to temperature.

Figure 27:
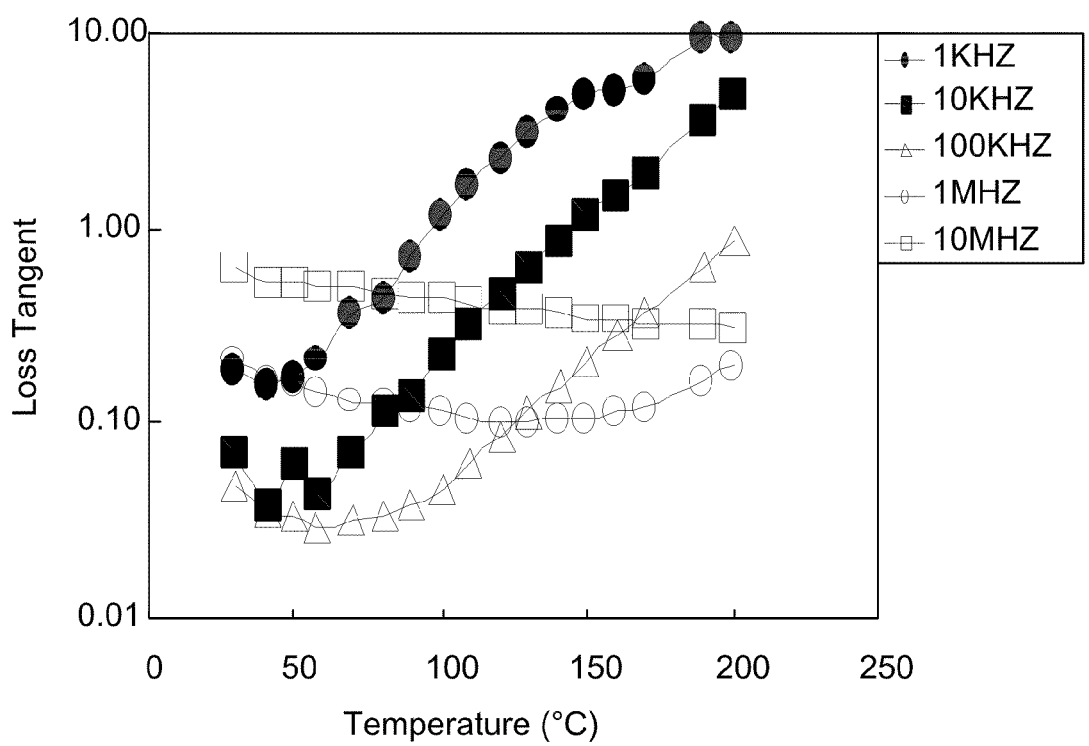

FIG. 27 depicts the variation of loss tangent of $Ca_2Cu_{1.9}La_{0.067}Ti_4O_{12}$ with respect to temperature.

Figure 28:
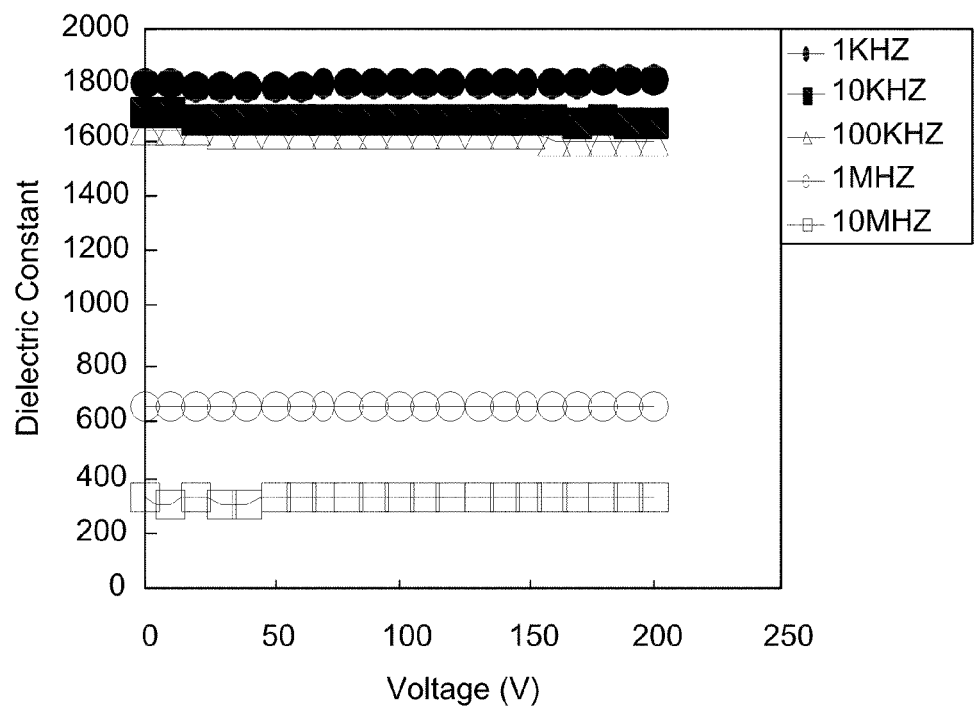

FIG. 28 depicts the variation of dielectric constant of $Ca_2Cu_{1.9}La_{0.067}Ti_4O_{12}$ with respect to voltage.

Figure 29:
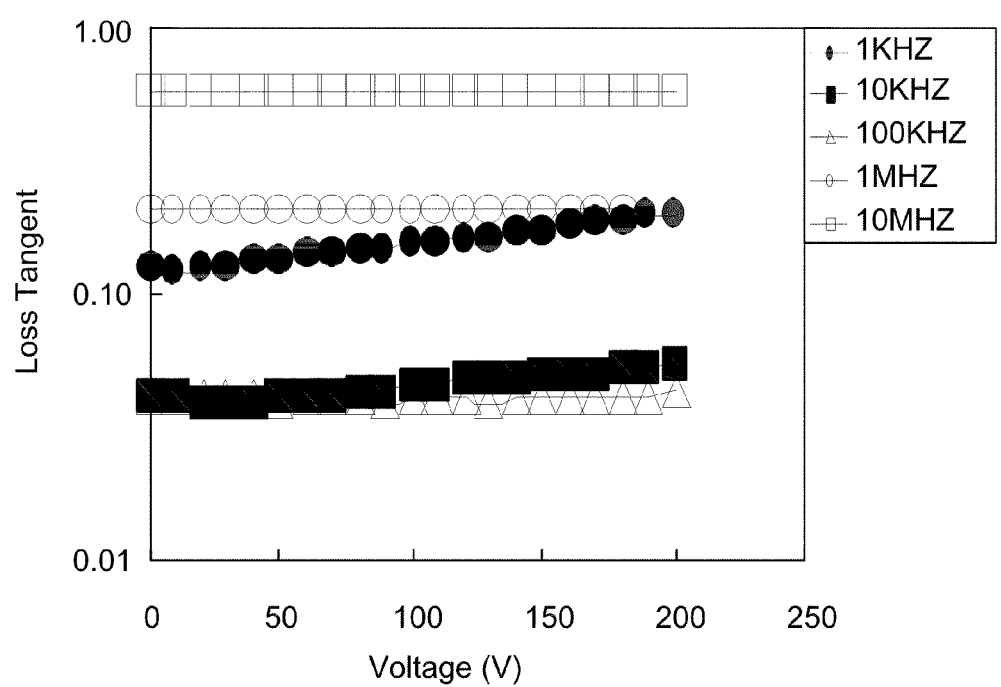

FIG. 29 depicts the variation of loss tangent of $Ca_2Cu_{1.9}La_{0.067}Ti_4O_{12}$ with respect to voltage.

Figure 30:
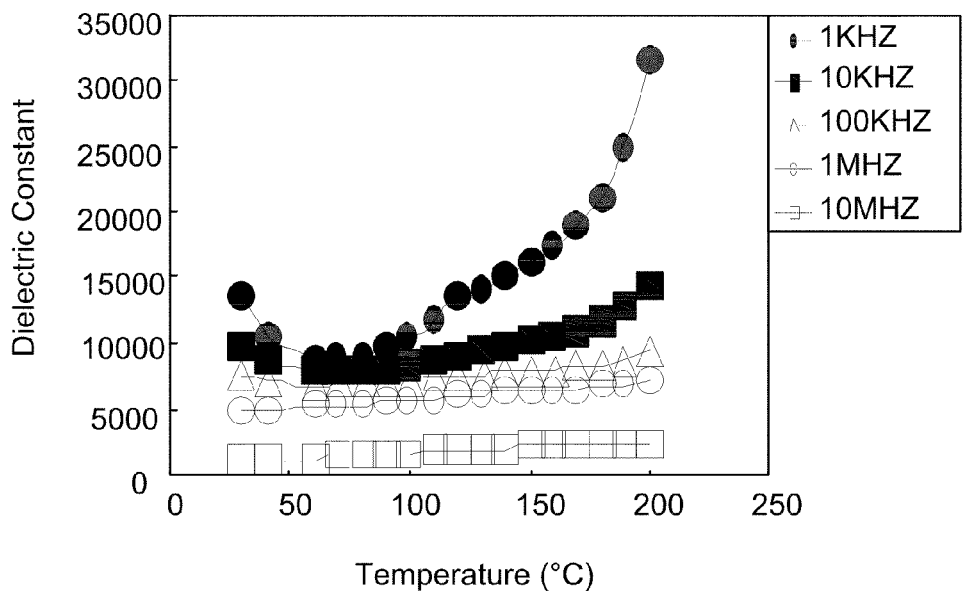

FIG. 30 depicts the variation of dielectric constant of $Ca_2Cu_2Ti_{3.98}Cr_{0.02}O_{11.99}$ with respect to temperature.

Figure 31:
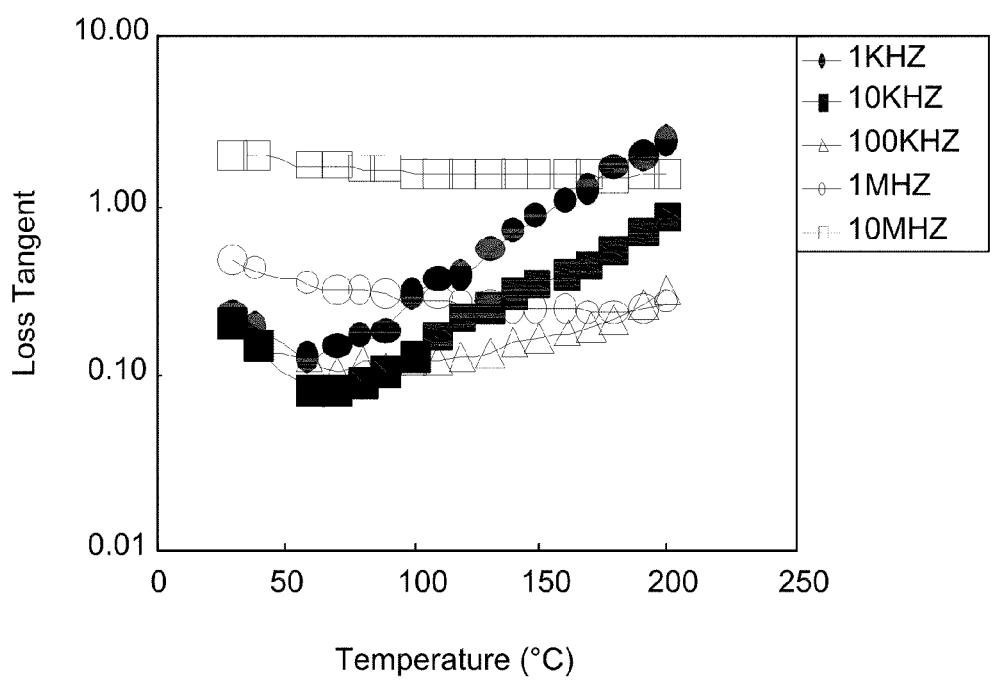

FIG. 31 depicts the variation of loss tangent of $Ca_2Cu_2Ti_{3.98}Cr_{0.02}O_{11.99}$ with respect to temperature.

Figure 32:
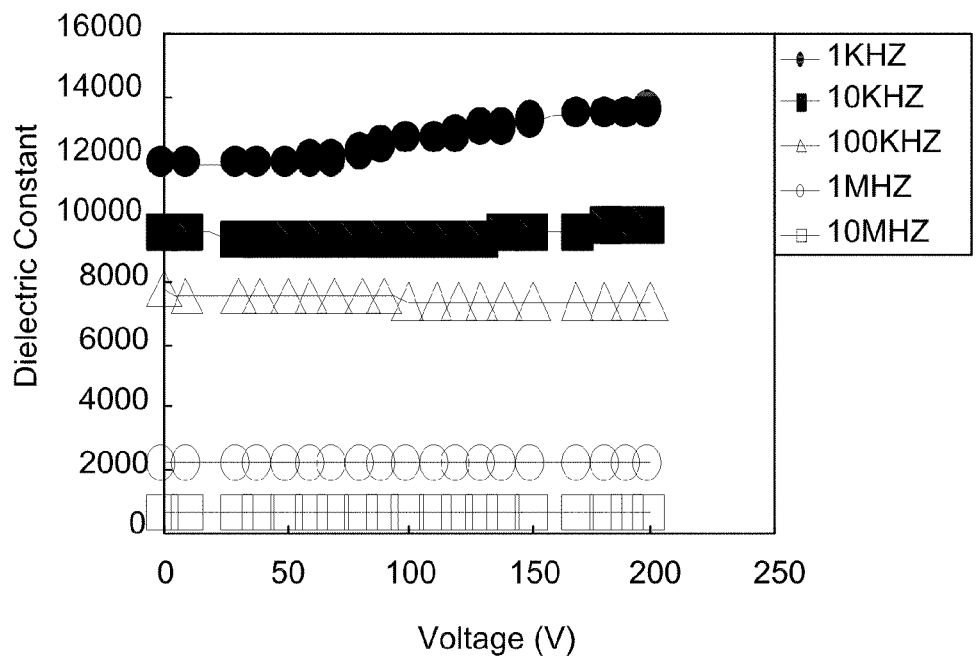

FIG. 32 depicts the variation of dielectric constant of $Ca_2Cu_2Ti_{3.98}Cr_{0.02}O_{11.99}$ with respect to voltage.

Figure 33:
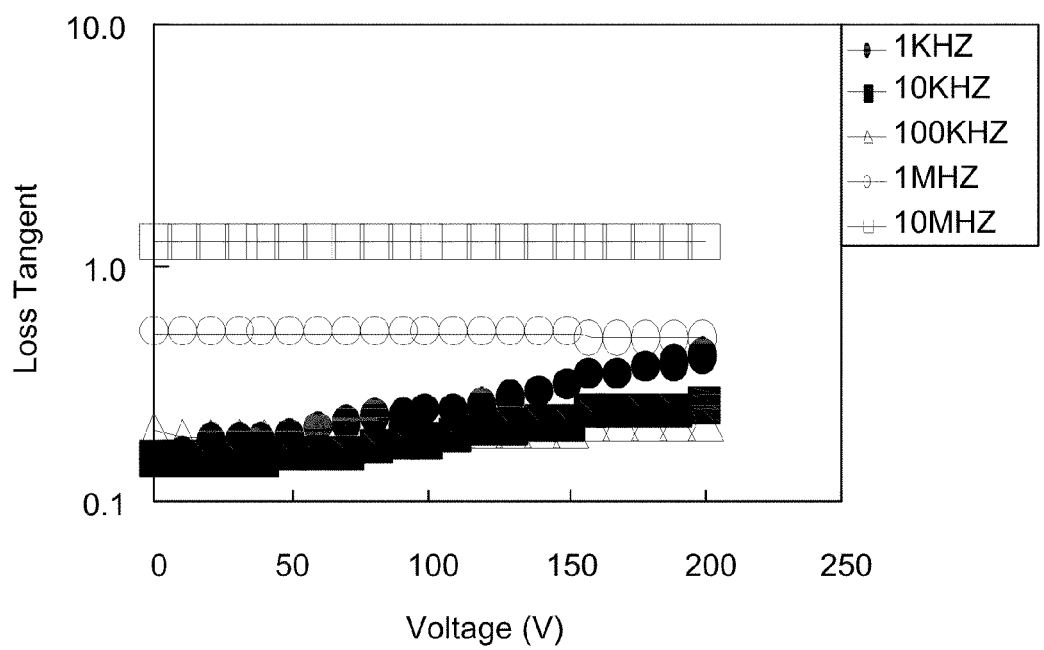

FIG. 33 depicts the variation of loss tangent of $Ca_2Cu_2Ti_{3.98}Cr_{0.02}O_{11.99}$ with respect to voltage.

Figure 34:
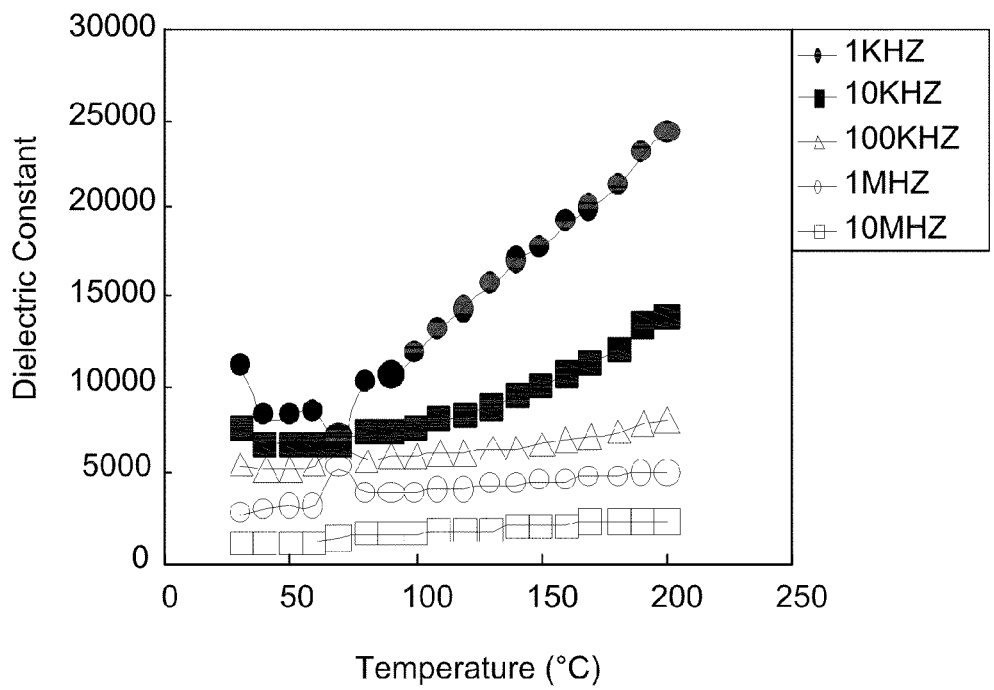

FIG. 34 depicts the variation of dielectric constant of $CaCu_3Ti_{3.92}Cr_{0.02}Al_{0.06}O_{11.96}$ with respect to temperature.

Figure 35:
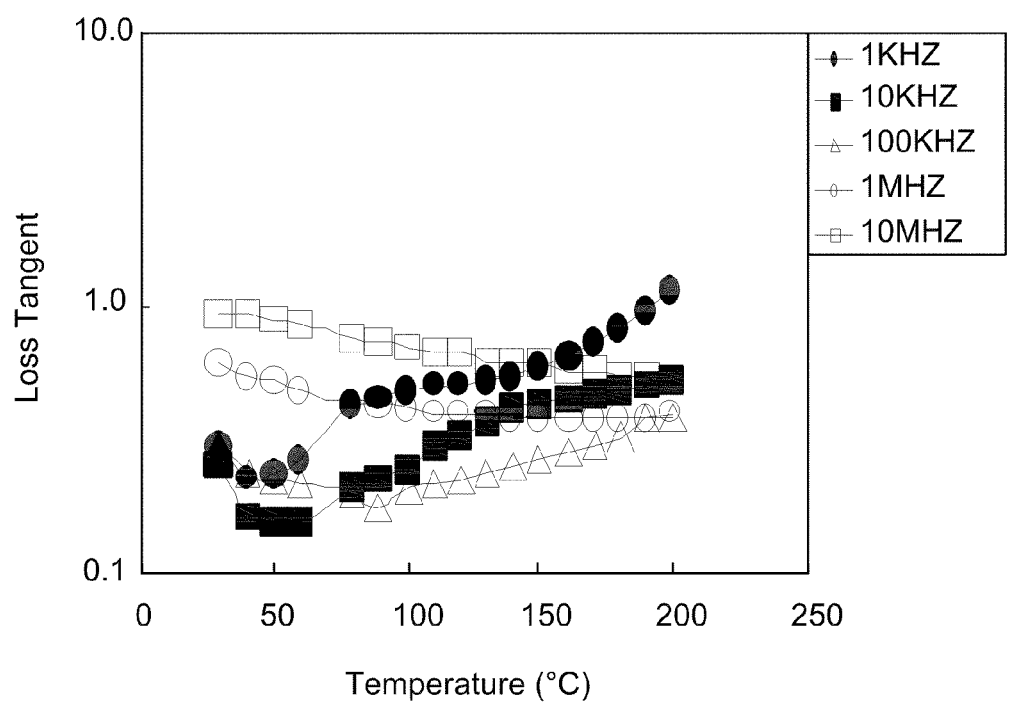

FIG. 35 depicts the variation of loss tangent of $CaCu_3Ti_{3.92}Cr_{0.02}Al_{0.06}O_{11.96}$ with respect to temperature.

Figure 36:
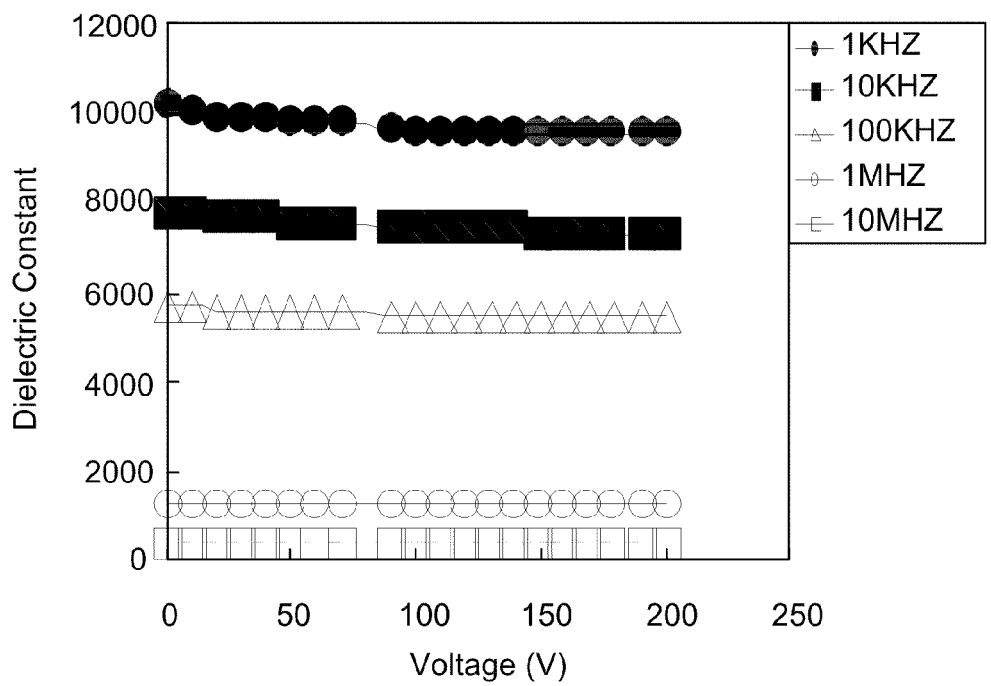

FIG. 36 depicts the variation of dielectric constant of $CaCu_3Ti_{3.92}Cr_{0.02}Al_{0.06}O_{11.96}$ with respect to voltage.

Figure 37:
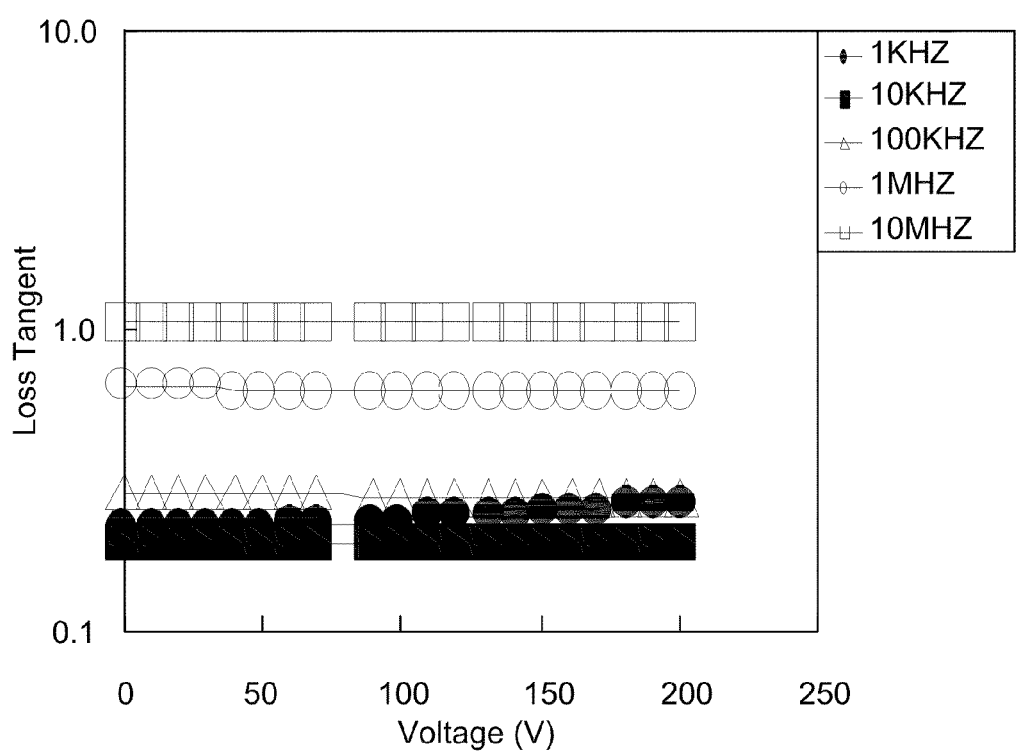

FIG. 37 depicts the variation of loss tangent of $CaCu_3Ti_{3.92}Cr_{0.02}Al_{0.06}O_{11.96}$ with respect to voltage.

Figure 38:
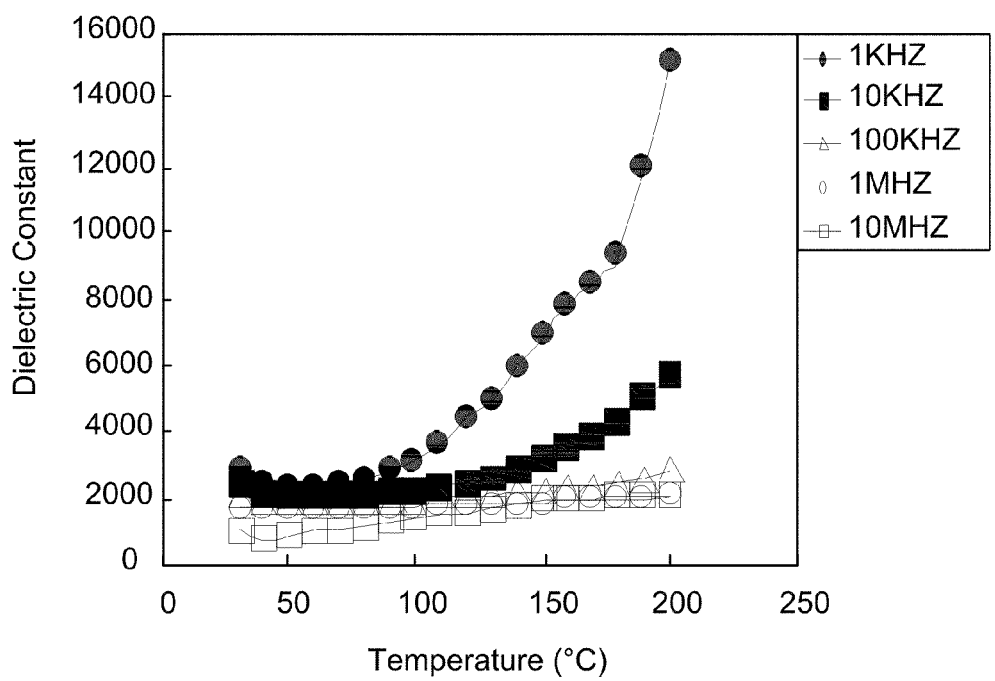

FIG. 38 depicts the variation of dielectric constant of $CaCu_3Ti_{3.98}Cr_{0.02}O_{11.99}$ with respect to temperature.

Figure 39:
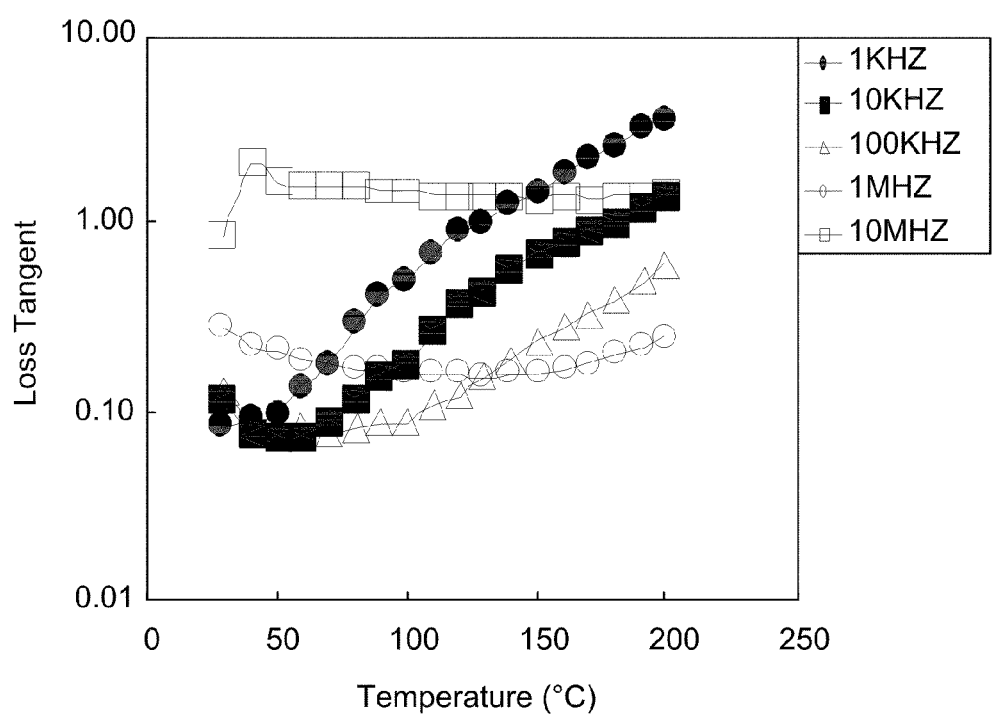

FIG. 39 depicts the variation of loss tangent of $CaCu_3Ti_{3.98}Cr_{0.02}O_{11.99}$ with respect to temperature.

Figure 40:
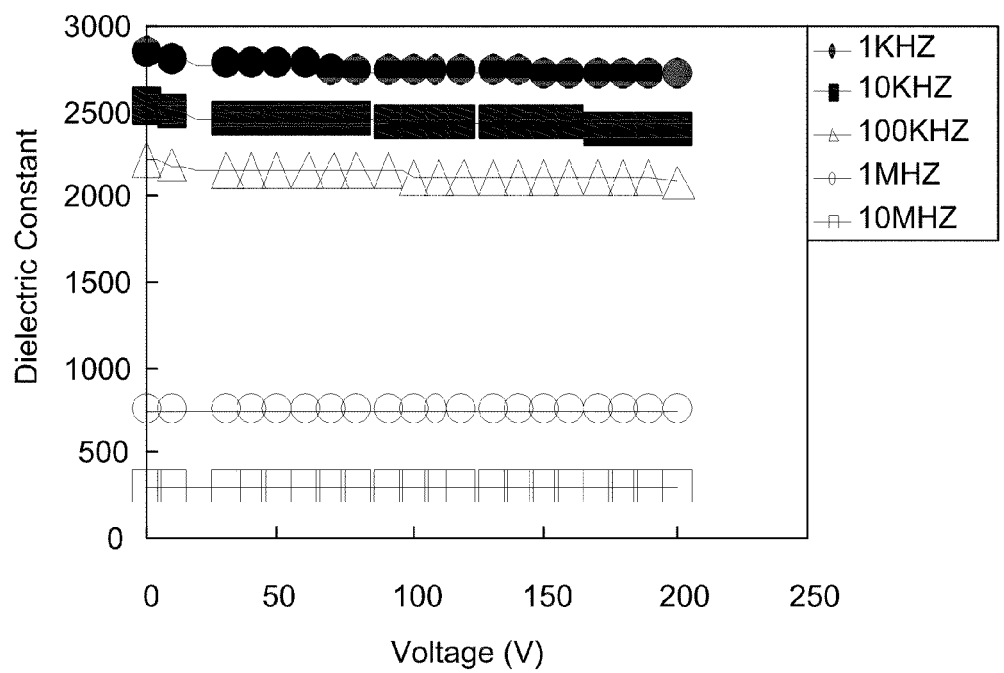

FIG. 40 depicts the variation of dielectric constant of $CaCu_3Ti_{3.98}Cr_{0.02}O_{11.99}$ with respect to voltage.

Figure 41:
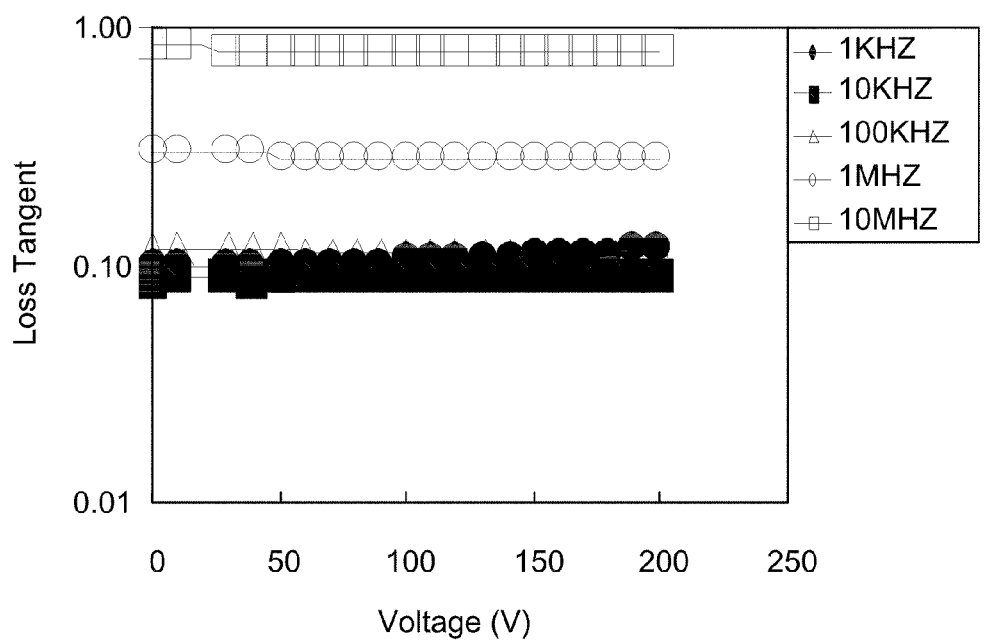

FIG. 41 depicts the variation of loss tangent of $CaCu_3Ti_{3.98}Cr_{0.02}O_{11.99}$ with respect to voltage.

Figure 42:
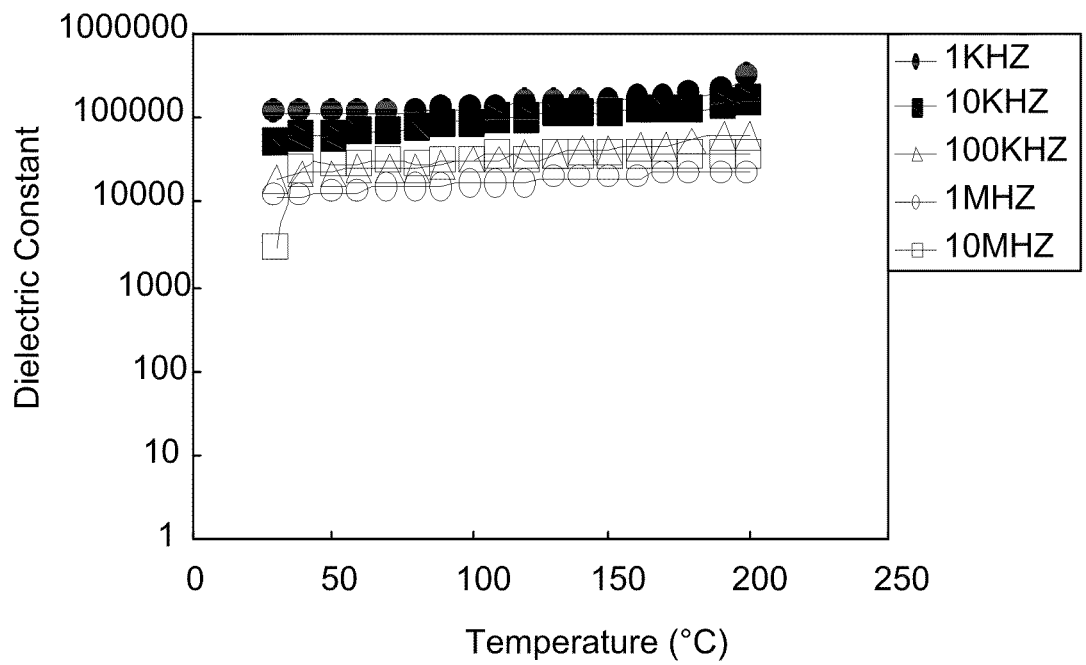

FIG. 42 depicts the variation of dielectric constant of $Ba_{0.3}Sr_{0.7}Cr_{0.01}Ti_{0.99}O_3$ doped with 1 mole % $Bi_2O_3.3TiO_2$, with respect to temperature.

Figure 43:
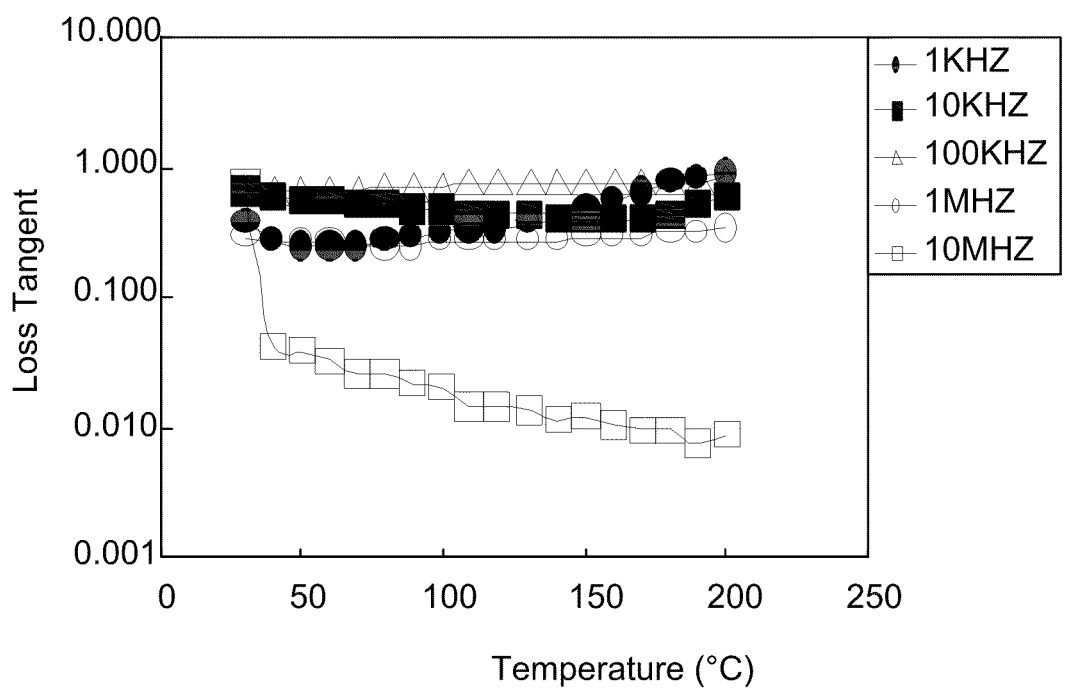

FIG. 43 depicts the variation of loss tangent of $Ba_{0.3}Sr_{0.7}Cr_{0.01}Ti_{0.99}O_3$ doped with 1 mole % $Bi_2O_3.3TiO_2$, with respect to temperature.

Figure 44:
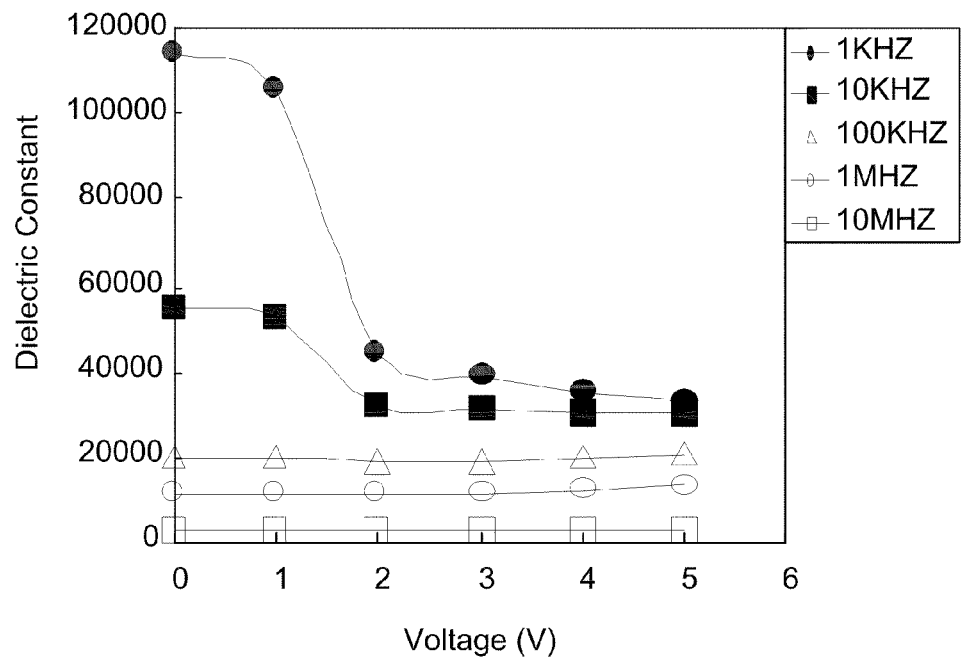

FIG. 44 depicts the variation of dielectric constant of $Ba_{0.3}Sr_{0.7}Cr_{0.01}Ti_{0.99}O_3$ doped with 1 mole % $Bi_2O_3.3TiO_2$, with respect to voltage.

Figure 45:
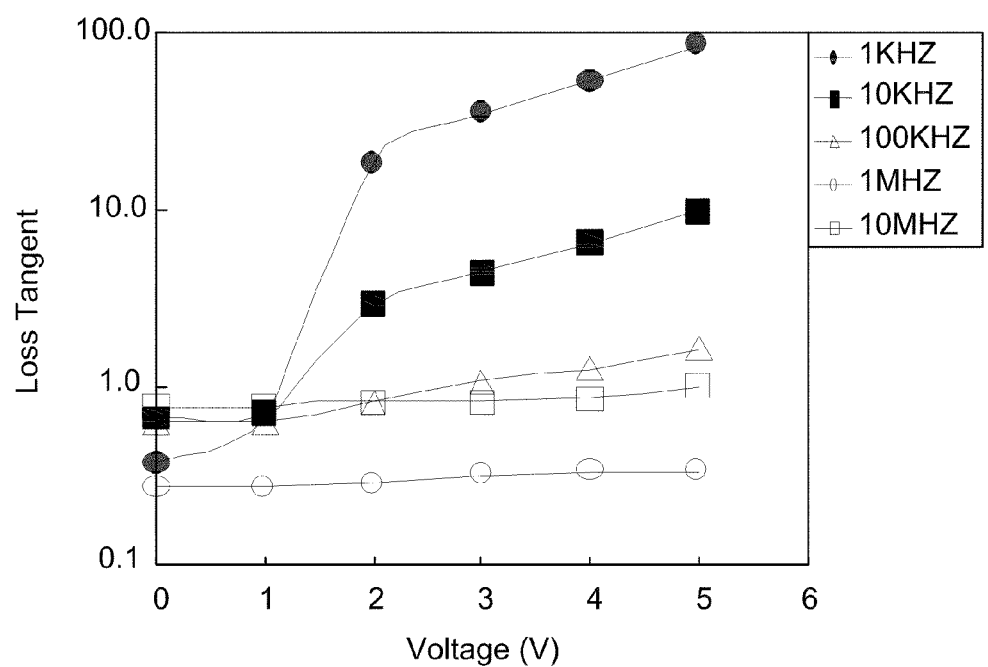

FIG. 45 depicts the variation of loss tangent of $Ba_{0.3}Sr_{0.7}Cr_{0.01}Ti_{0.99}O_3$ doped with 1 mole % $Bi_2O_3.3TiO_2$, with respect to voltage.

Figure 46:
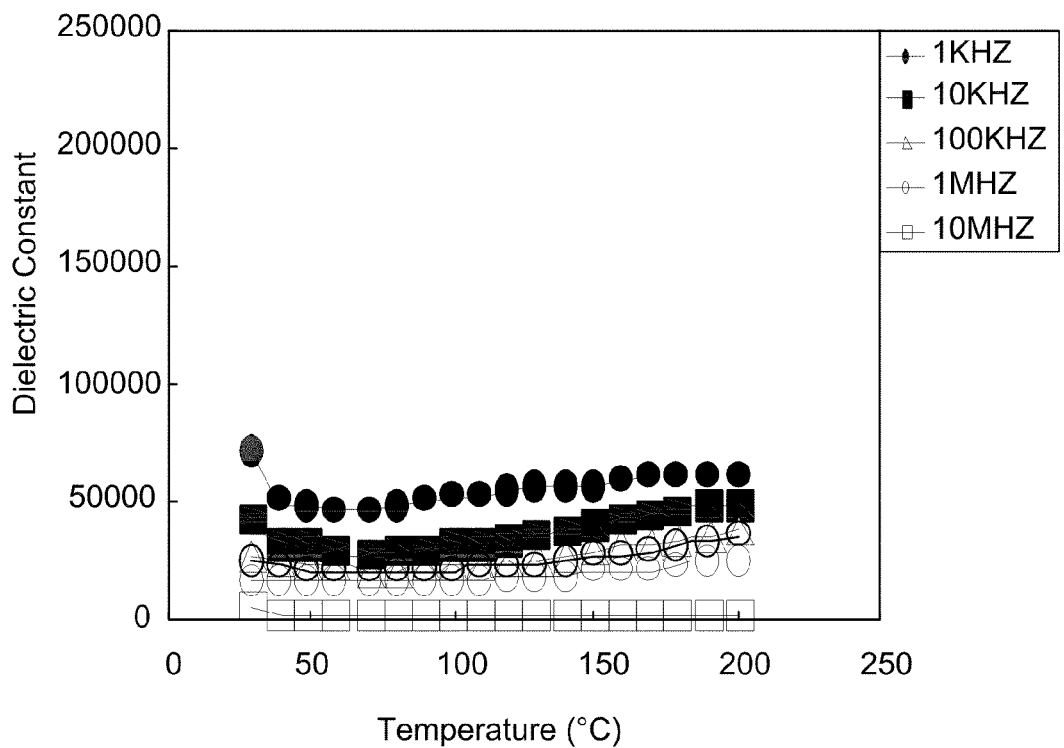

FIG. 46 depicts the variation of dielectric constant of $Ba_{0.3}Sr_{0.7}Cr_{0.005}Ti_{0.995}O_3$ doped with 1 mole % $Bi_2O_3.3TiO_2$, with respect to temperature.

Figure 47:
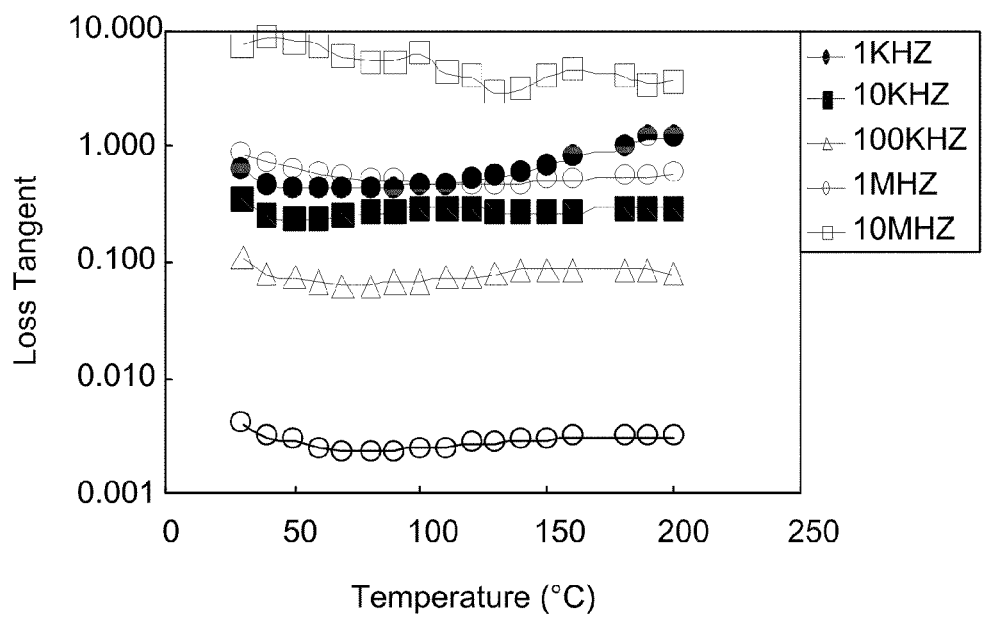

FIG. 47 depicts the variation of loss tangent of $Ba_{0.3}Sr_{0.7}Cr_{0.005}Ti_{0.995}O_3$ doped with 1 mole % $Bi_2O_3.3TiO_2$, with respect to temperature.

Figure 48:
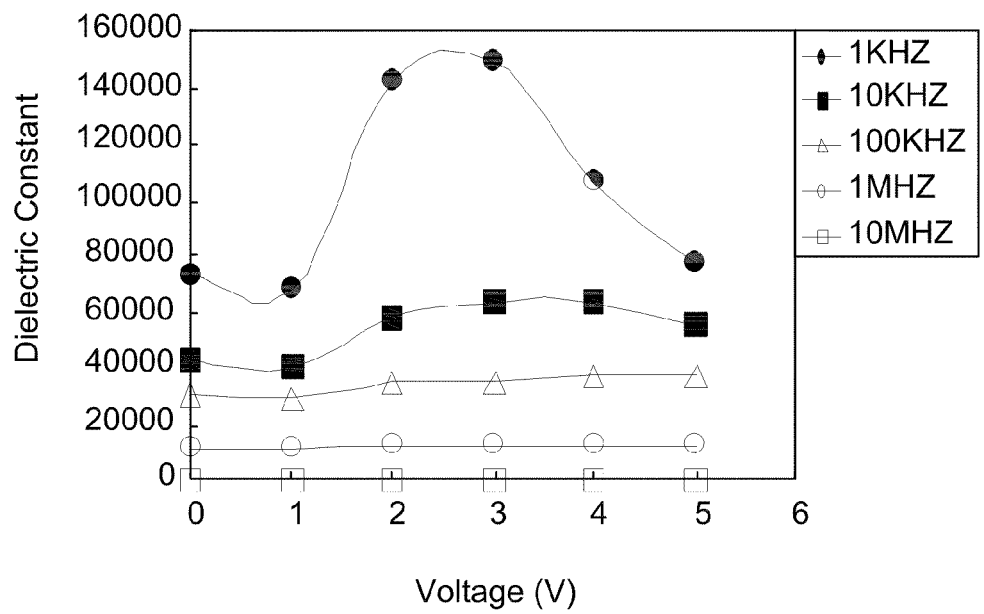

FIG. 48 depicts the variation of dielectric constant of $Ba_{0.3}Sr_{0.7}Cr_{0.005}Ti_{0.995}O_3$ doped with 1 mole % $Bi_2O_3.3TiO_2$, with respect to voltage.

Figure 49:
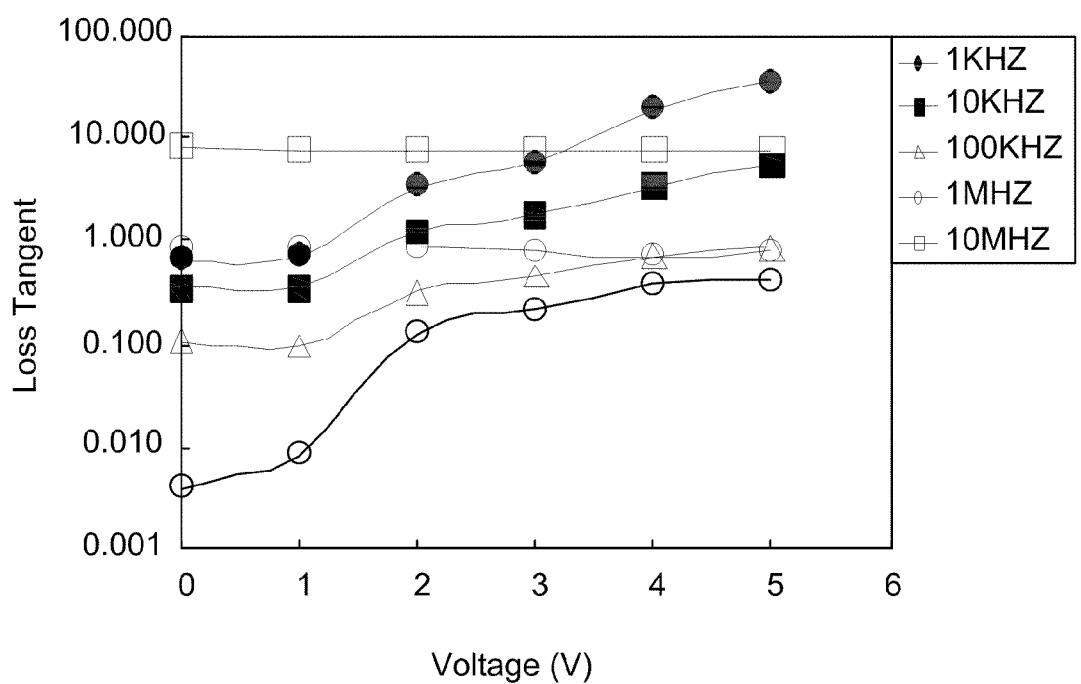

FIG. 49 depicts the variation of loss tangent of $Ba_{0.3}Sr_{0.7}Cr_{0.005}Ti_{0.995}O_3$ doped with 1 mole % $Bi_2O_3.3TiO_2$, with respect to voltage.

Figure 50:
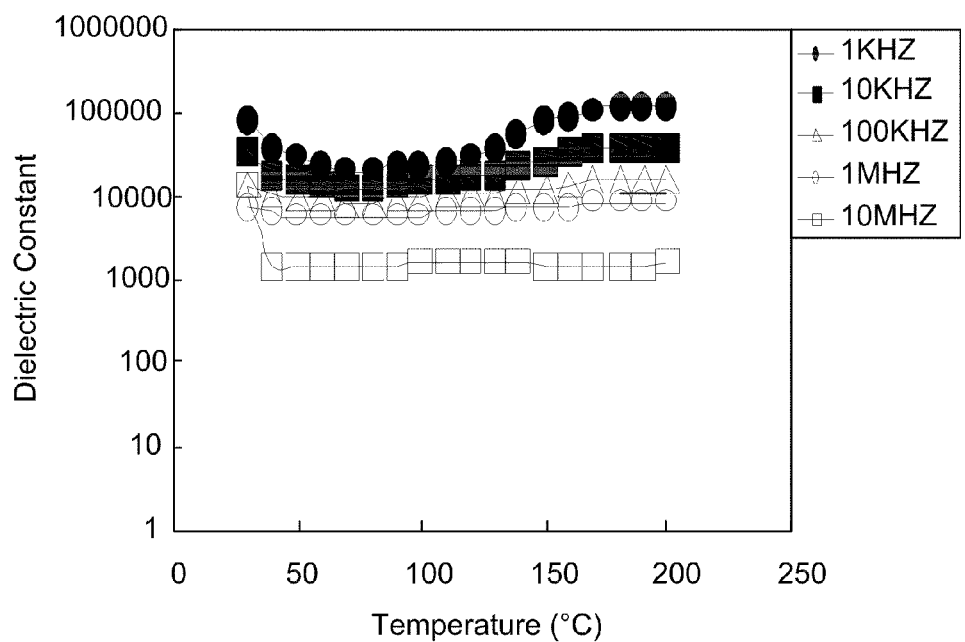

FIG. 50 depicts the variation of dielectric constant with respect to temperature of $Ba_{0.3}Sr_{0.7}Cr_{0.002}Ti_{0.998}O_3$ doped with 1 mole % $Bi_2O_3.3TiO_2$ prepared by sintering in 5% hydrogen and 95% nitrogen atmosphere at 1200° C.

Figure 51:
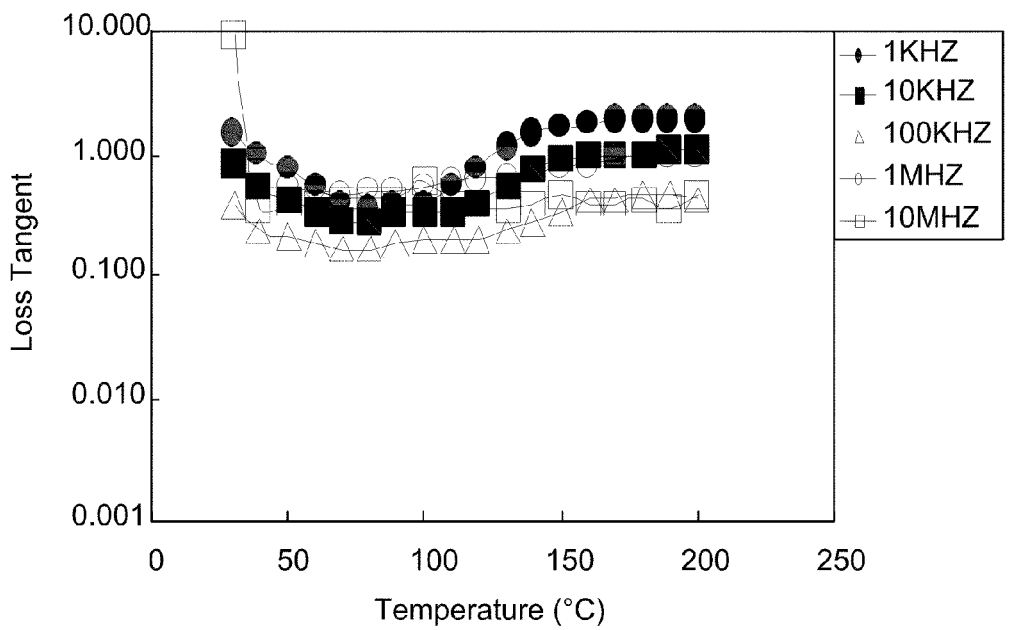

FIG. 51 depicts the variation of loss tangent with respect to temperature of $Ba_{0.3}Sr_{0.7}Cr_{0.002}Ti_{0.998}O_3$ doped with 1 mole % $Bi_2O_3.3TiO_2$ prepared by sintering in 5% hydrogen and 95% nitrogen atmosphere at 1200° C.

Figure 52:
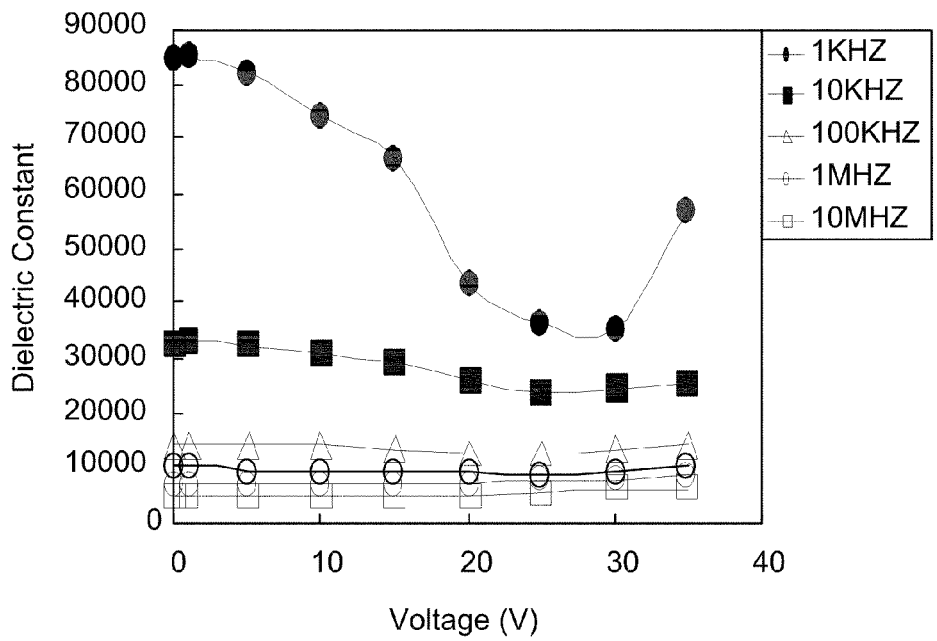

FIG. 52 depicts the variation of dielectric constant with respect to voltage of $Ba_{0.3}Sr_{0.7}Cr_{0.002}Ti_{0.998}O_3$ doped with 1 mole % $Bi_2O_3.3TiO_2$ prepared by sintering in 5% hydrogen and 95% nitrogen atmosphere at 1200° C.

Figure 53:
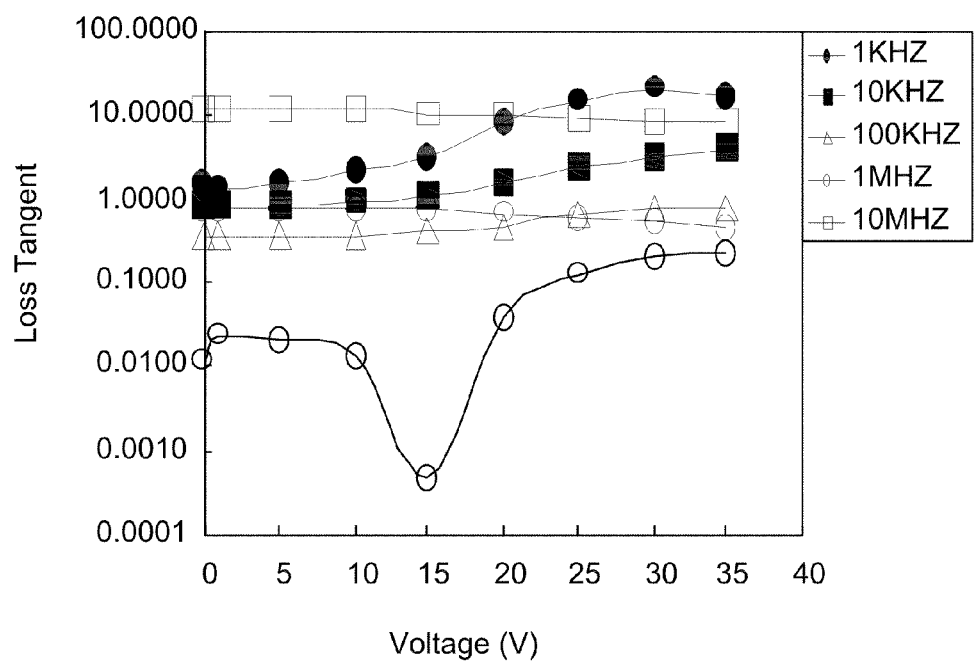

FIG. 53 depicts the variation of loss tangent with respect to voltage of $Ba_{0.3}Sr_{0.7}Cr_{0.002}Ti_{0.998}O_3$ doped with 1 mole % $Bi_2O_3.3TiO_2$ prepared by sintering in 5% hydrogen and 95% nitrogen atmosphere at 1200° C.

Figure 54:
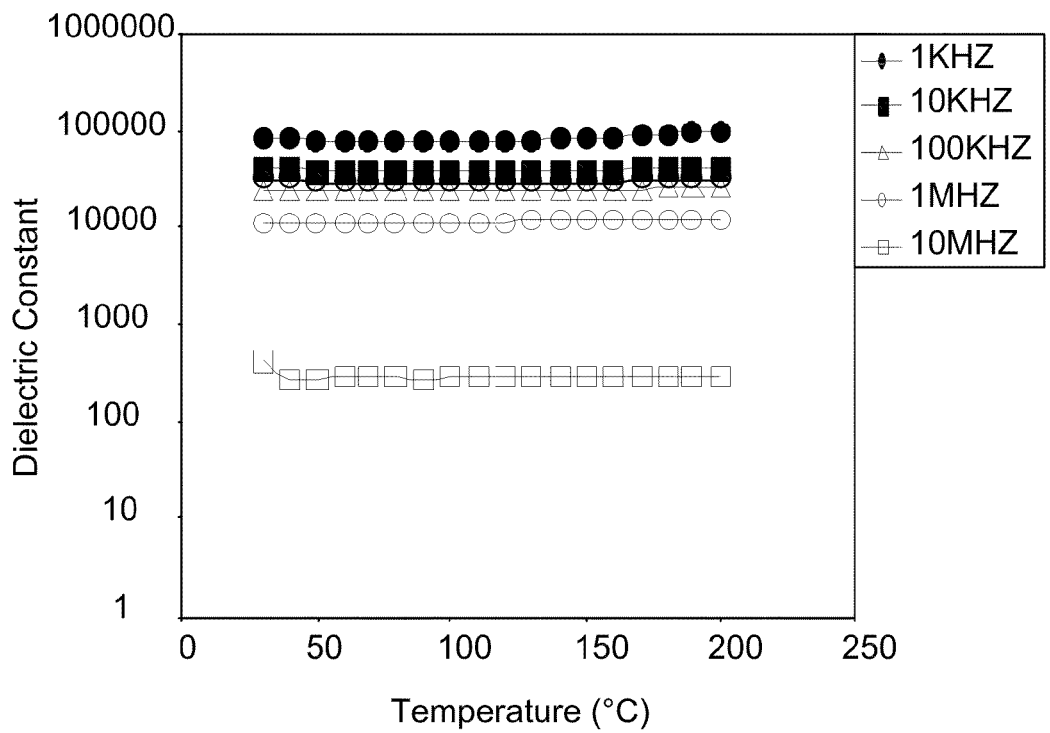

FIG. 54 depicts the variation of dielectric constant of $Ba_{0.4}Sr_{0.6}TiO_{2.8}N_{0.2}$ doped with 1 mol % $Bi_2O_3.3TiO_2$, with respect to temperature.

Figure 55:
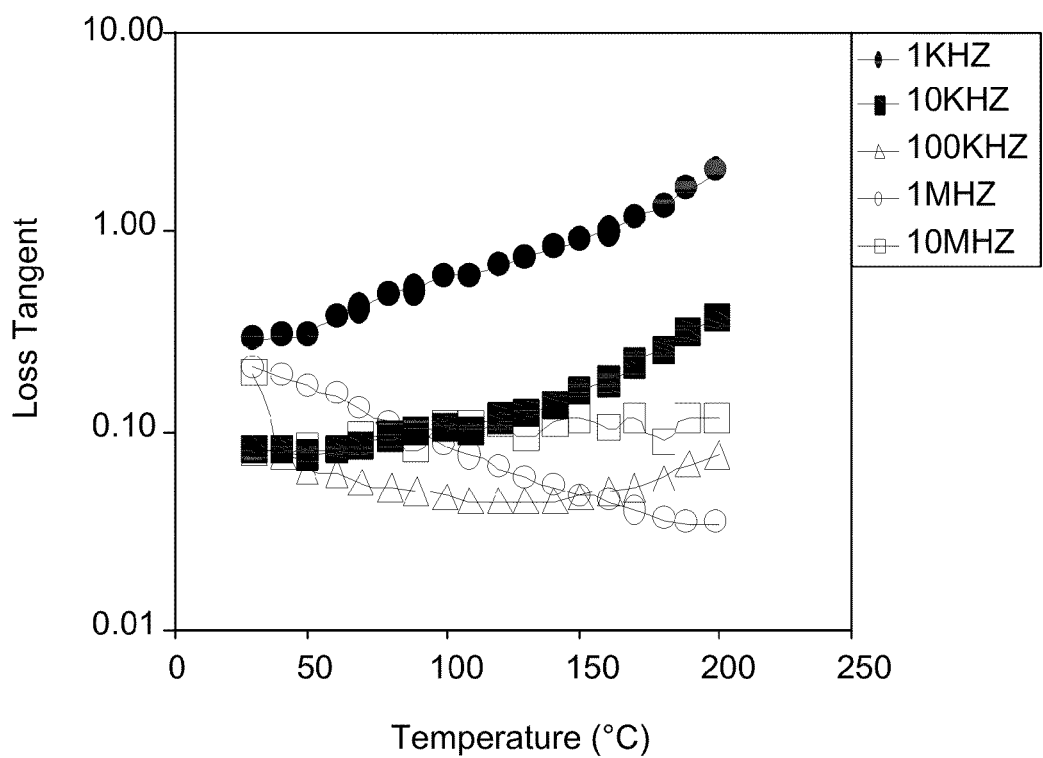

FIG. 55 depicts the variation of loss tangent of $Ba_{0.4}Sr_{0.6}TiO_{2.8}N_{0.2}$ doped with 1 mol % $Bi_2O_3.3TiO_2$, with respect to temperature.

Figure 56:
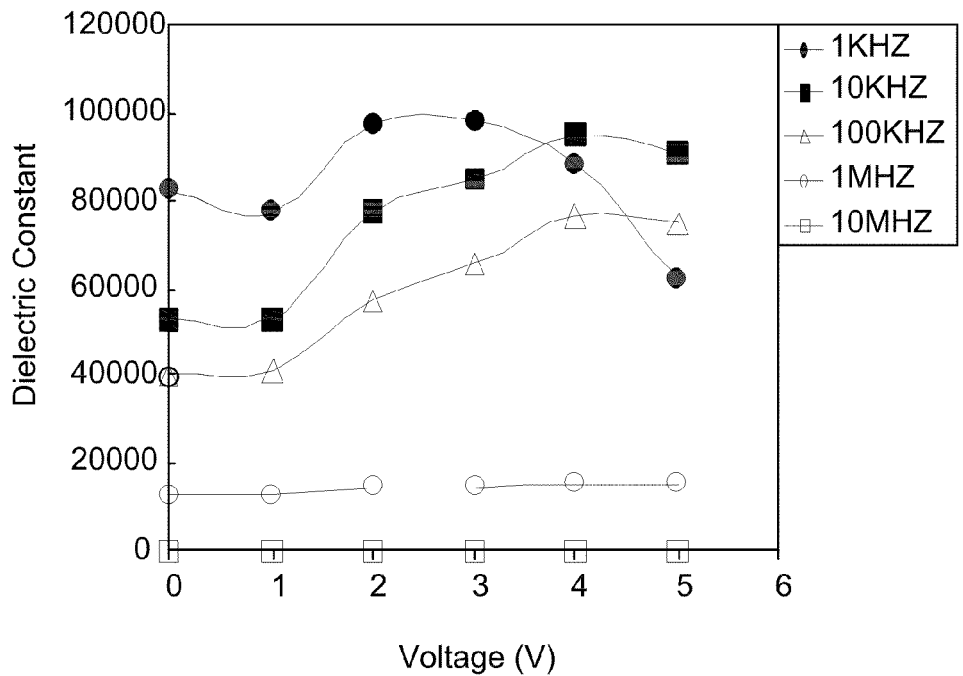

FIG. 56 depicts the variation of dielectric constant of $Ba_{0.4}Sr_{0.6}TiO_{2.8}N_{0.2}$ doped with 1 mol % $Bi_2O_3.3TiO_2$, with respect to voltage.

Figure 57:
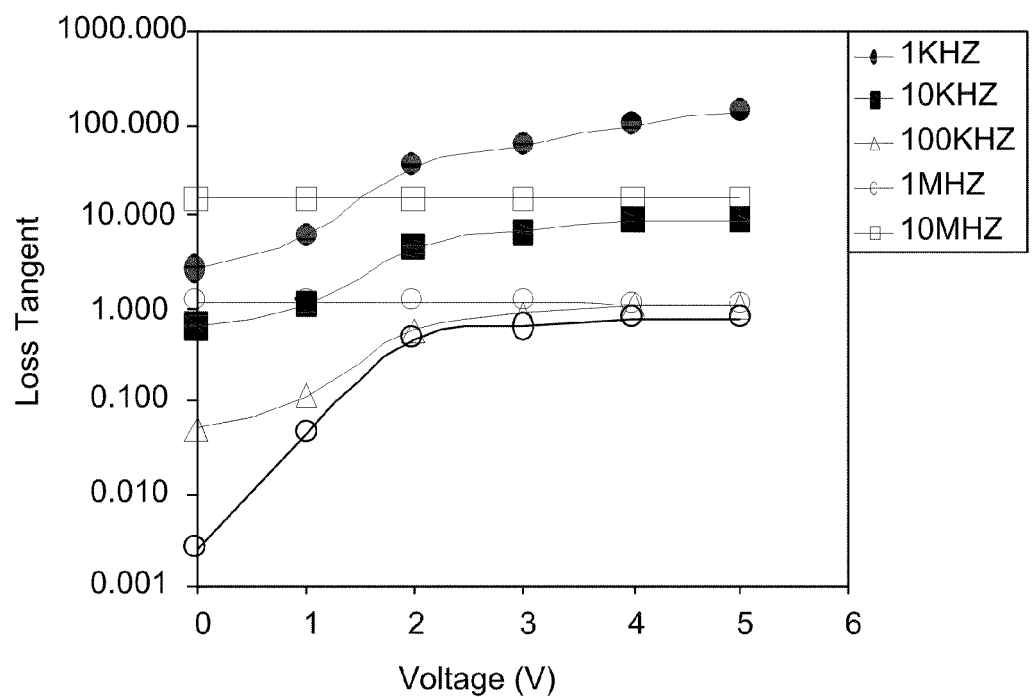

FIG. 57 depicts the variation of loss tangent of $Ba_{0.4}Sr_{0.6}TiO_{2.8}N_{0.2}$ doped with 1 mol % $Bi_2O_3.3TiO_2$, with respect to voltage.

Figure 58:
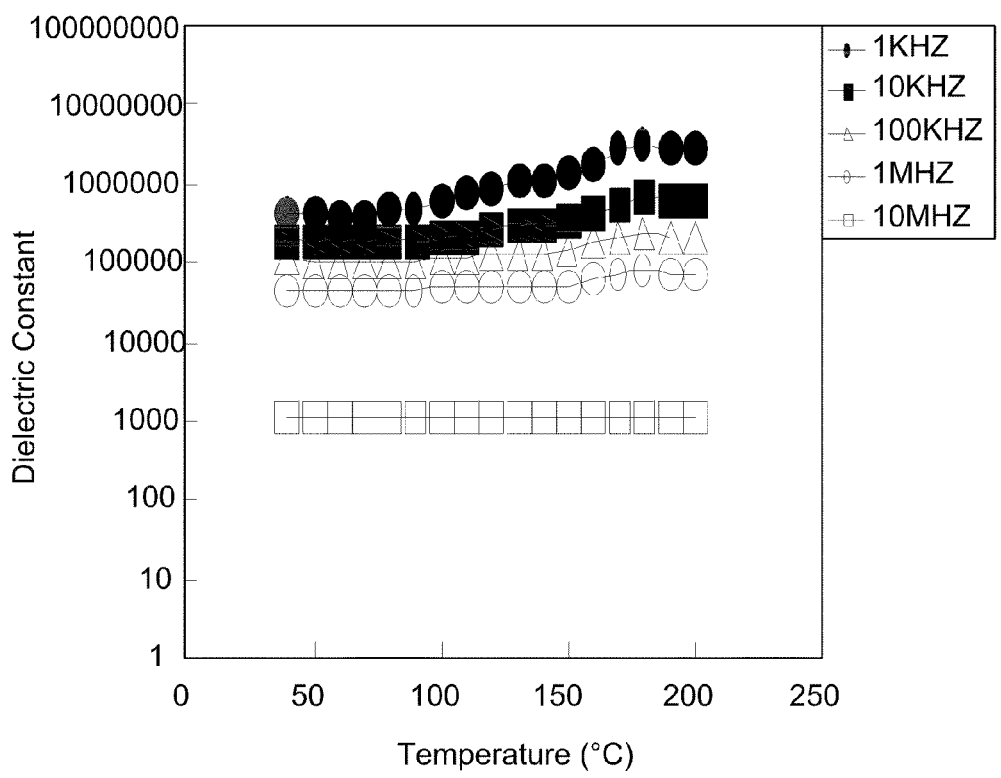

FIG. 58 depicts the variation of dielectric constant of $Ba_{0.4}Sr_{0.6}Cr_{0.005}Ti_{0.995}O_3$ doped with 1 mol % $Bi_2O_3.3TiO_2$, with respect to temperature.

Figure 59:
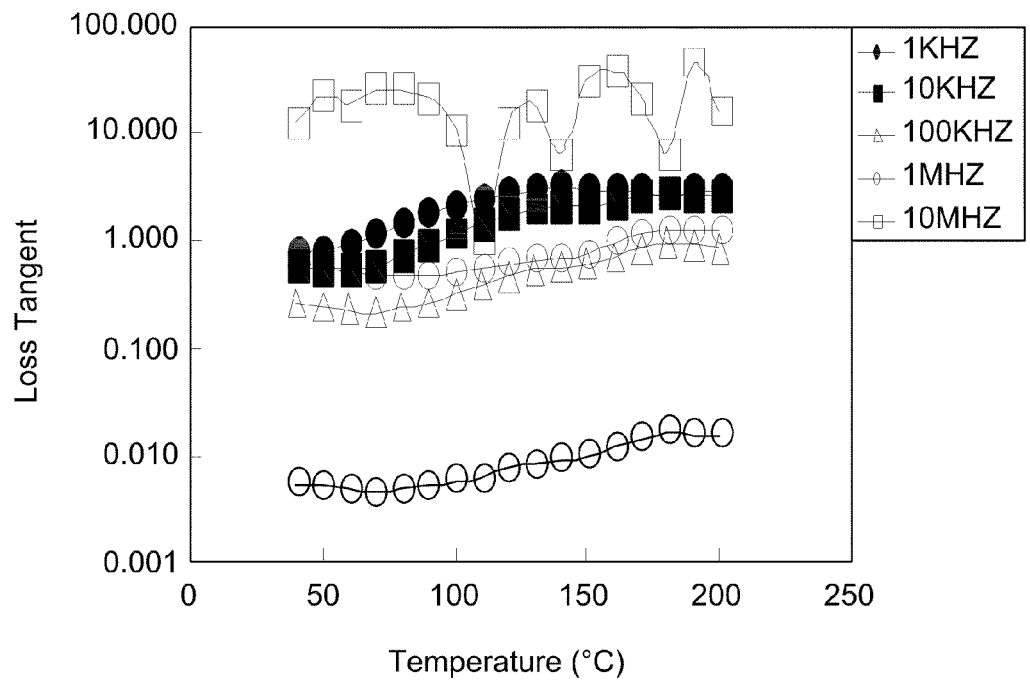

FIG. 59 depicts the variation of loss tangent of $Ba_{0.4}Sr_{0.6}Cr_{0.005}Ti_{0.995}O_3$ doped with 1 mol % $Bi_2O_3.3TiO_2$, with respect to temperature.

Figure 60:
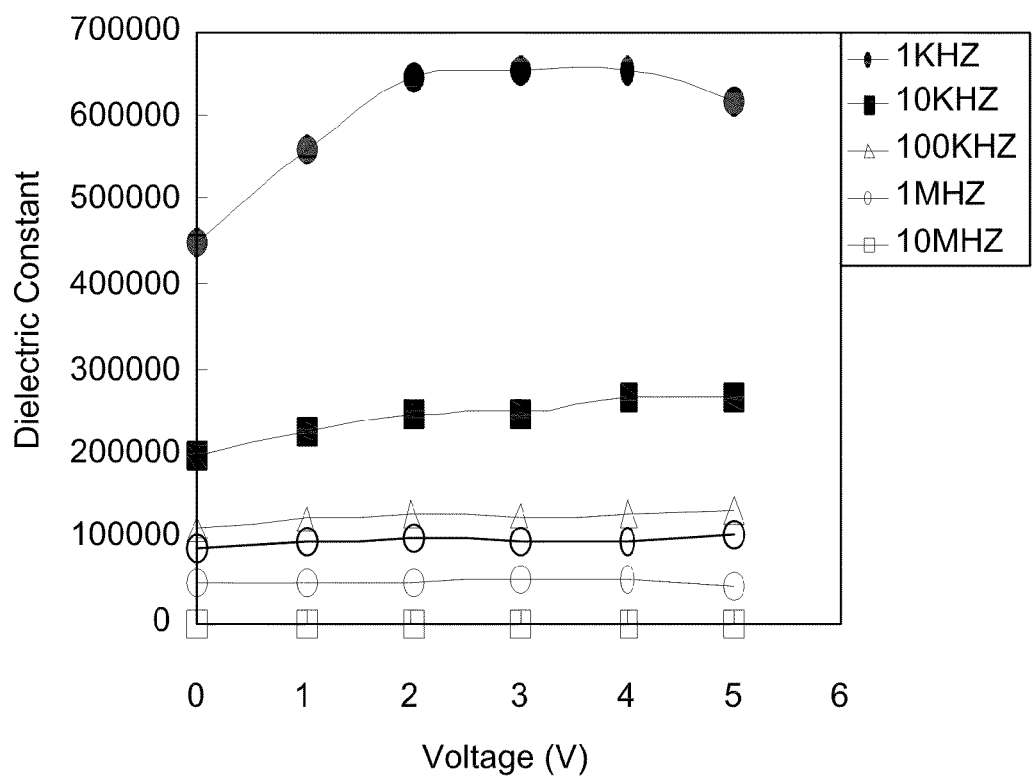

FIG. 60 depicts the variation of dielectric constant of $Ba_{0.4}Sr_{0.6}Cr_{0.005}Ti_{0.995}O_3$ doped with 1 mol % $Bi_2O_3.3TiO_2$, with respect to voltage.

Figure 61:
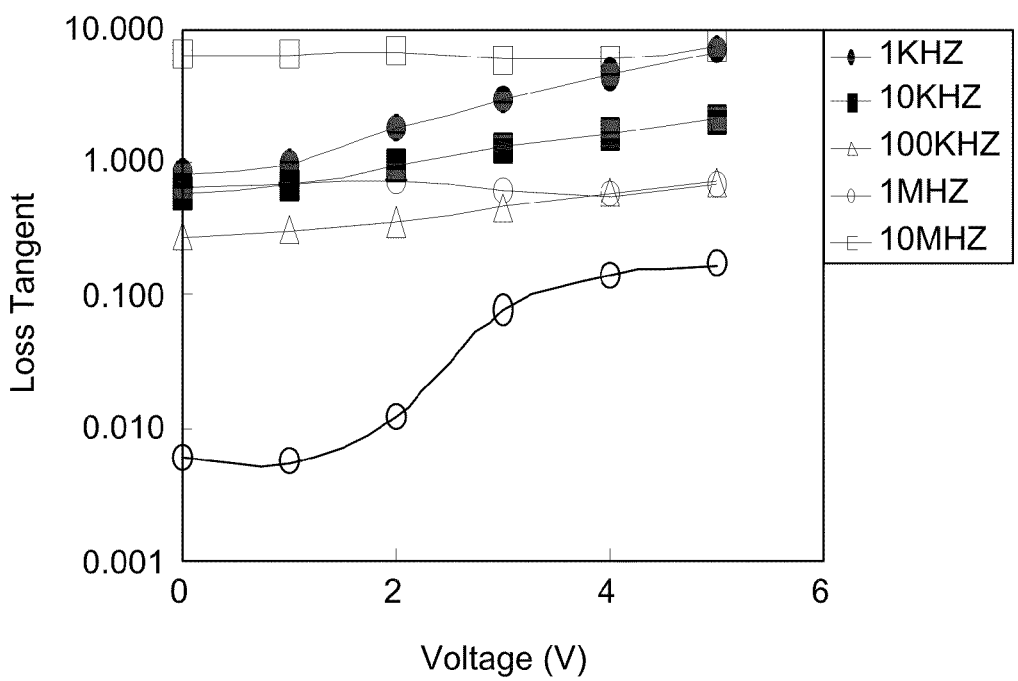

FIG. 61 depicts the variation of loss tangent of $Ba_{0.4}Sr_{0.6}Cr_{0.005}Ti_{0.995}O_3$ doped with 1 mol % $Bi_2O_3.3TiO_2$, with respect to voltage.

Figure 62:
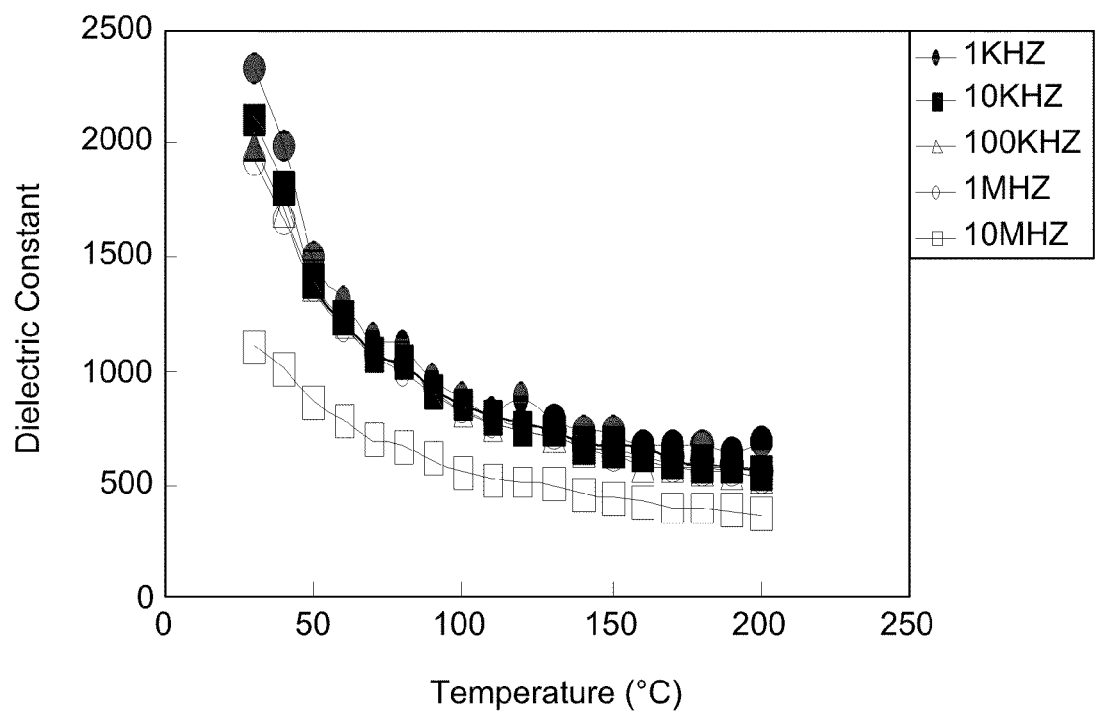

FIG. 62 depicts the variation of dielectric constant of $Ba_{0.55}Sr_{0.4}Ca_{0.05}Cr_{0.01}Ti_{0.99}O_3$ with respect to temperature.

Figure 63:
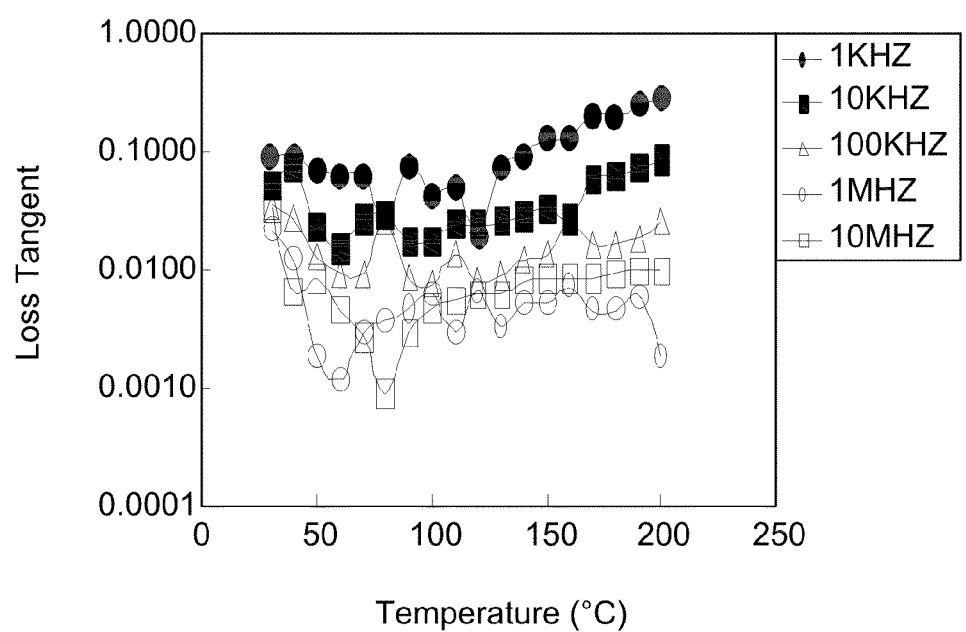

FIG. 63 depicts the variation of loss tangent of $Ba_{0.55}Sr_{0.4}Ca_{0.05}Cr_{0.01}Ti_{0.99}O_3$ with respect to temperature.

Figure 64:
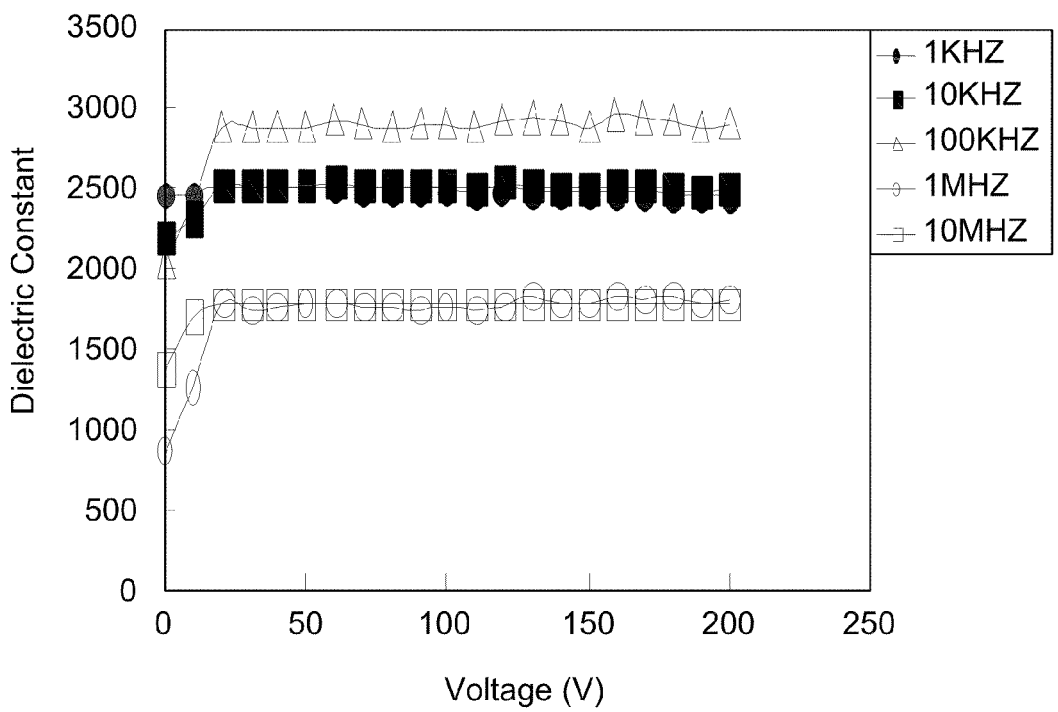

FIG. 64 depicts the variation of dielectric constant of $Ba_{0.55}Sr_{0.4}Ca_{0.05}Cr_{0.01}Ti_{0.99}O_3$ with respect to voltage.

Figure 65:
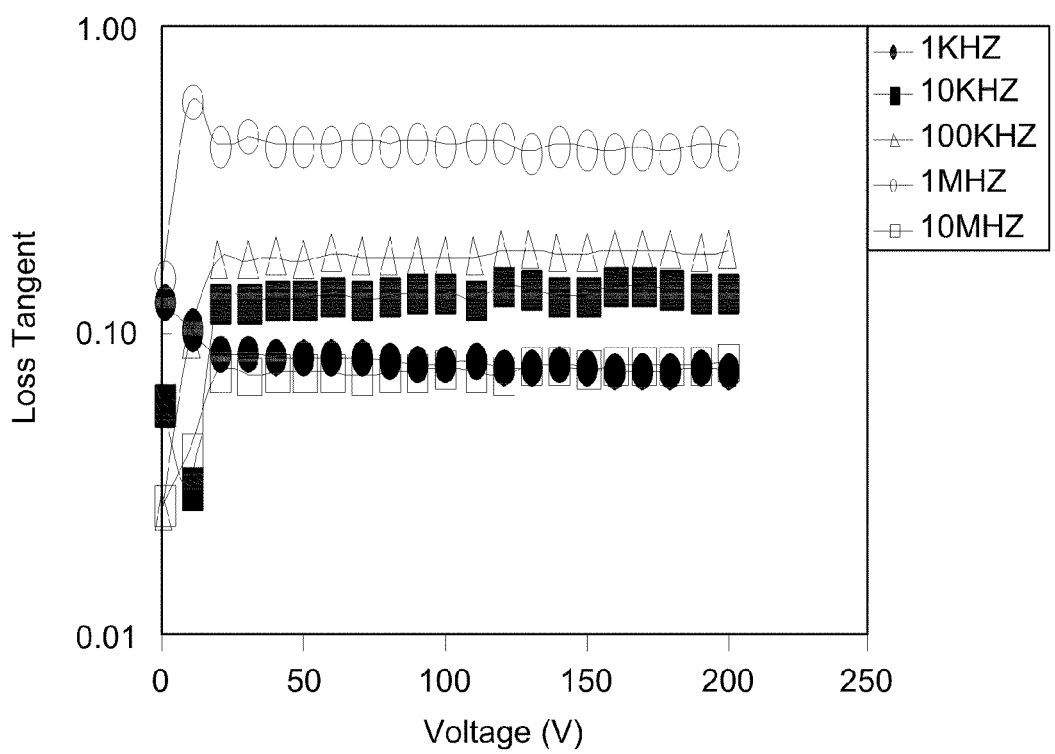

FIG. 65 depicts the variation of loss tangent of $Ba_{0.55}Sr_{0.4}Ca_{0.05}Cr_{0.01}Ti_{0.99}O_3$ with respect to voltage.

Figure 66:
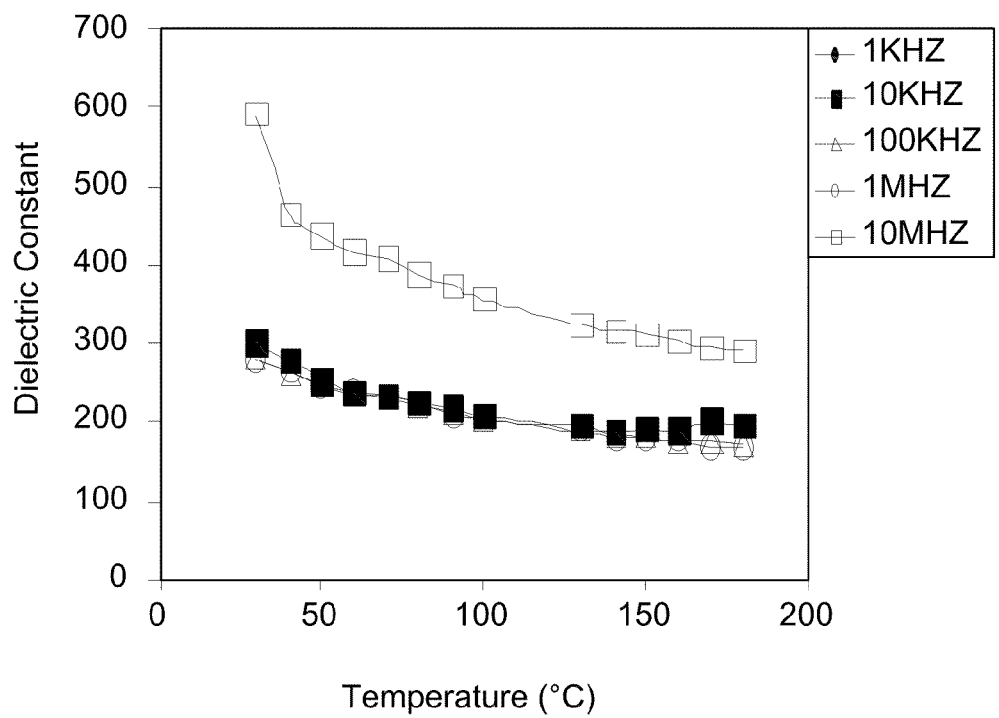

FIG. 66 depicts the variation of dielectric constant of $Ba_{0.4}Sr_{0.6}Cr_{0.01}Ti_{0.99}O_3$ with respect to temperature.

Figure 67:
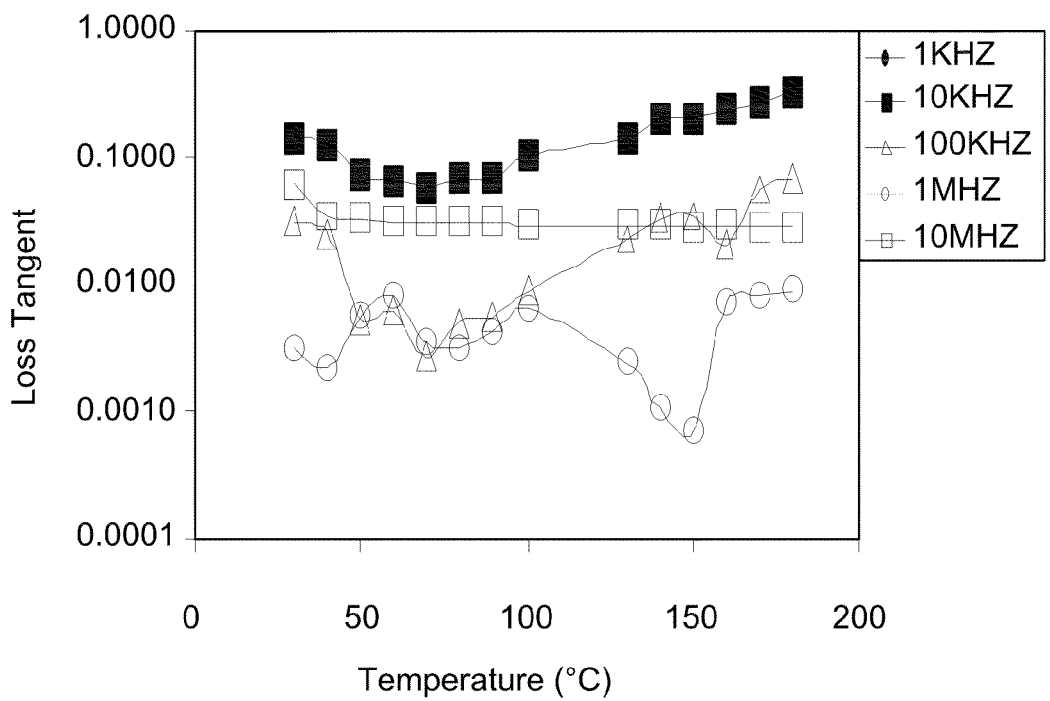

FIG. 67 depicts the variation of loss tangent of $Ba_{0.4}Sr_{0.6}Cr_{0.01}Ti_{0.99}O_3$ with respect to temperature.

Figure 68:
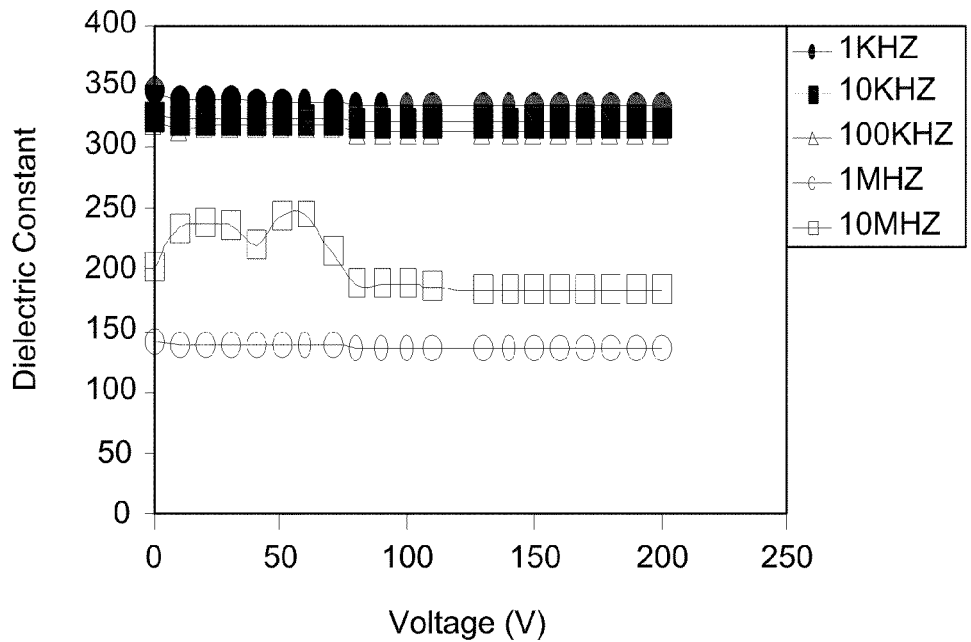

FIG. 68 depicts the variation of dielectric constant of $Ba_{0.4}Sr_{0.6}Cr_{0.01}Ti_{0.99}O_3$ with respect to voltage.

Figure 69:
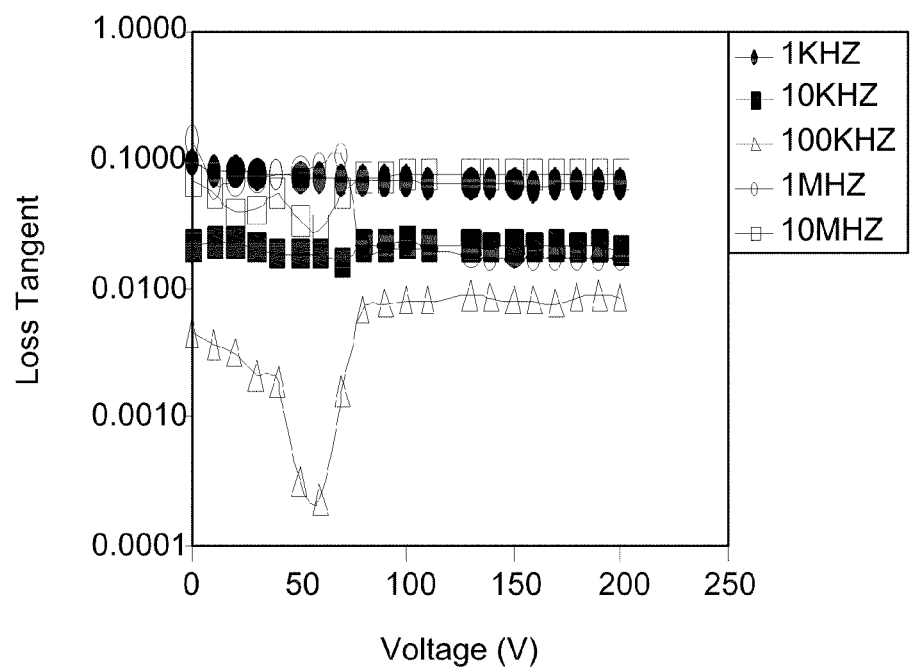

FIG. 69 depicts the variation of loss tangent of $Ba_{0.4}Sr_{0.6}Cr_{0.01}Ti_{0.99}O_3$ with respect to voltage.

Figure 70:
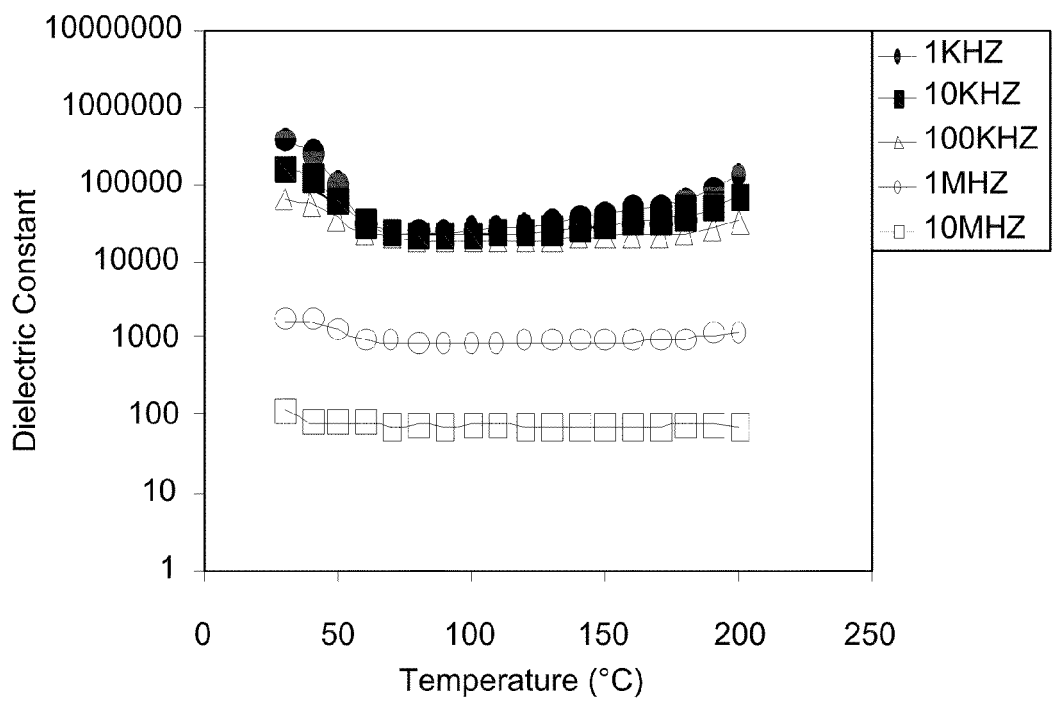

FIG. 70 depicts the variation of dielectric constant of $Ba_{0.4}Sr_{0.6}Cr_{0.01}Ti_{0.99}O_3$ doped with 1 mol % $Bi_2O_3.3TiO_2$, with respect to temperature.

Figure 71:
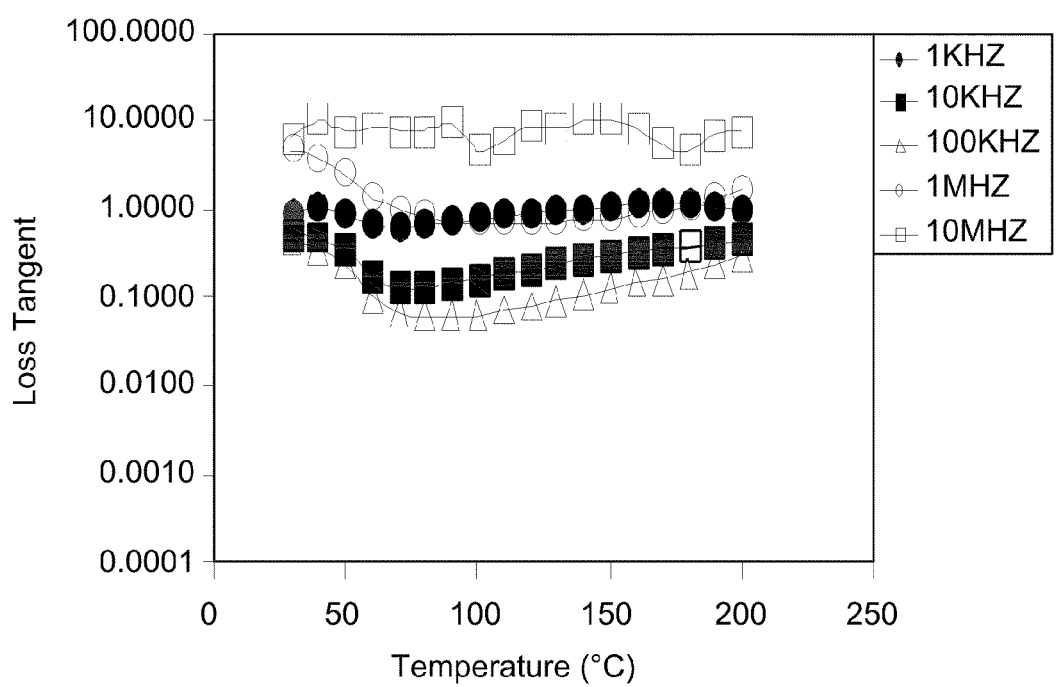

FIG. 71 depicts the variation of loss tangent of $Ba_{0.4}Sr_{0.6}Cr_{0.01}Ti_{0.99}O_3$ doped with 1 mol % $Bi_2O_3.3TiO_2$, with respect to temperature.

Figure 72:
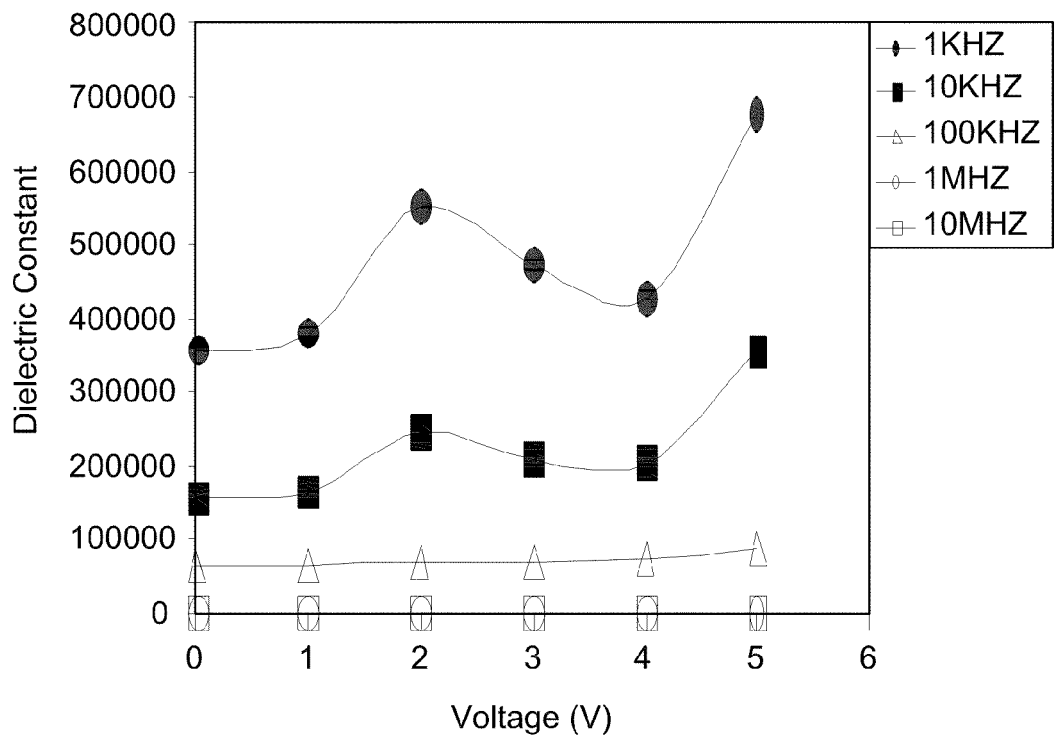

FIG. 72 depicts the variation of dielectric constant of $Ba_{0.4}Sr_{0.6}Cr_{0.01}Ti_{0.99}O_3$ doped with 1 mol % $Bi_2O_3.3TiO_2$, with respect to voltage.

Figure 73:
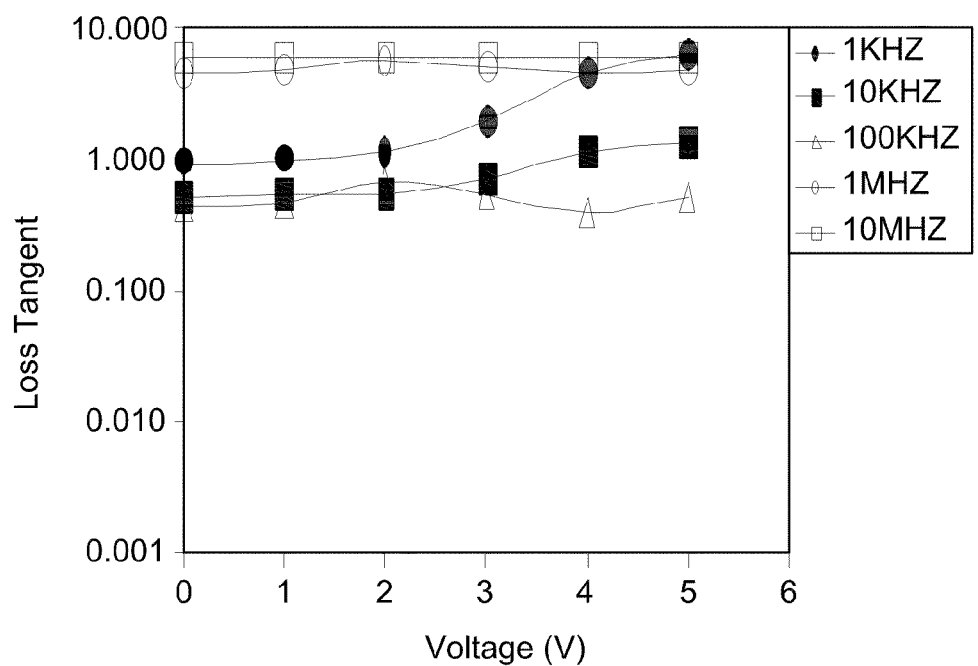

FIG. 73 depicts the variation of loss tangent of $Ba_{0.4}Sr_{0.6}Cr_{0.01}Ti_{0.99}O_3$ doped with 1 mol % $Bi_2O_3.3TiO_2$, with respect to voltage.

Figure 74:
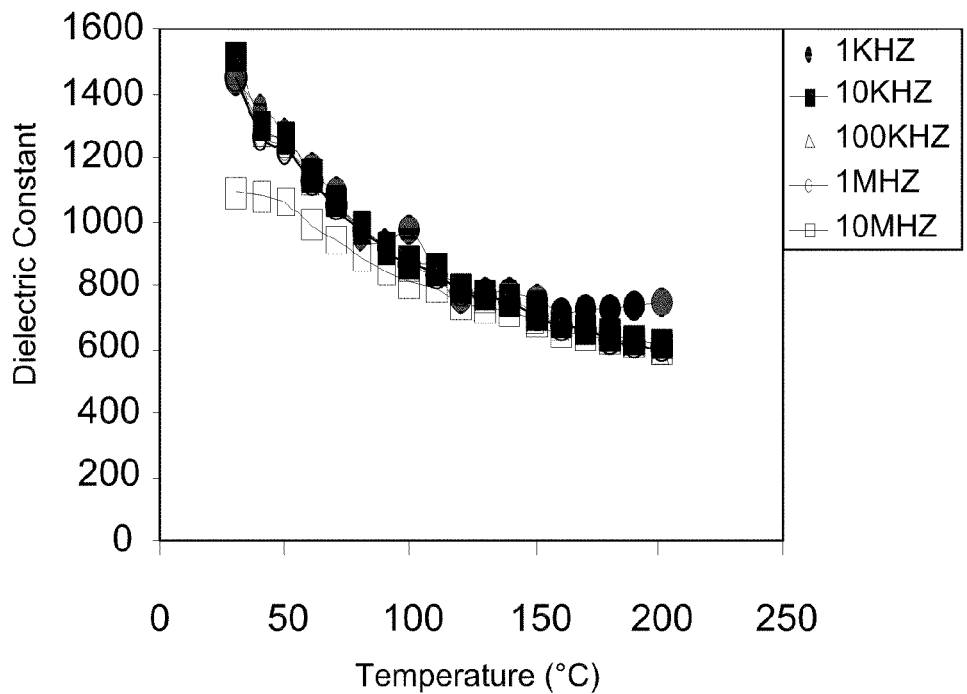

FIG. 74 depicts the variation of dielectric constant of $Ba_{0.4}Sr_{0.6}Cr_{0.005}Ti_{0.995}O_3$ with respect to temperature.

Figure 75:
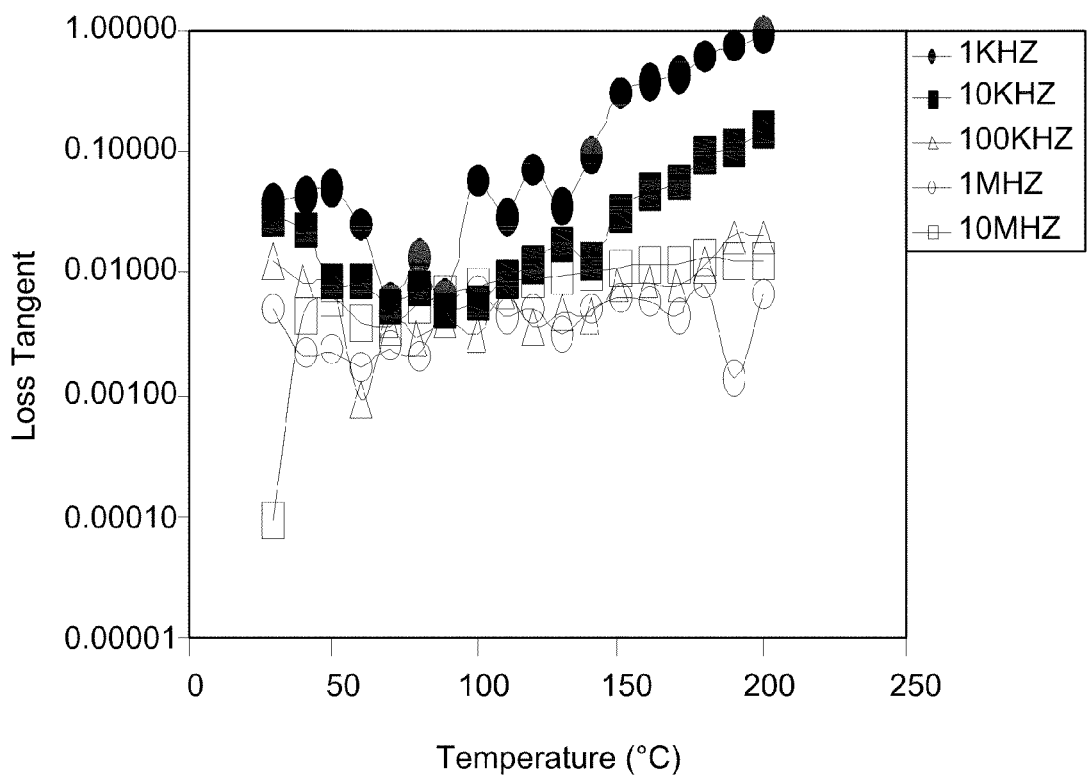

FIG. 75 depicts the variation of loss tangent of $Ba_{0.4}Sr_{0.6}Cr_{0.005}Ti_{0.995}O_3$ with respect to temperature.

Figure 76:
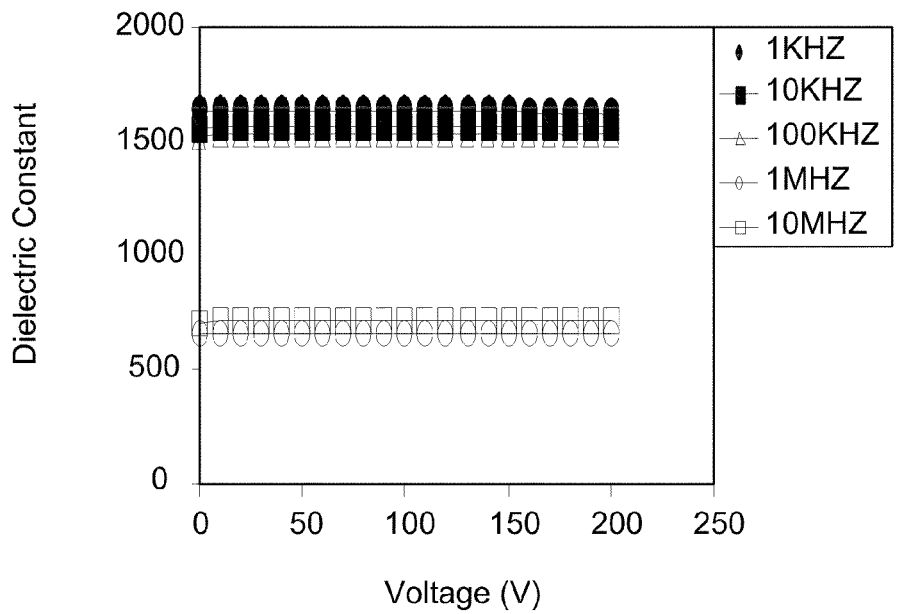

FIG. 76 depicts the variation of dielectric constant of $Ba_{0.4}Sr_{0.6}Cr_{0.005}Ti_{0.995}O_3$ with respect to voltage.

Figure 77:
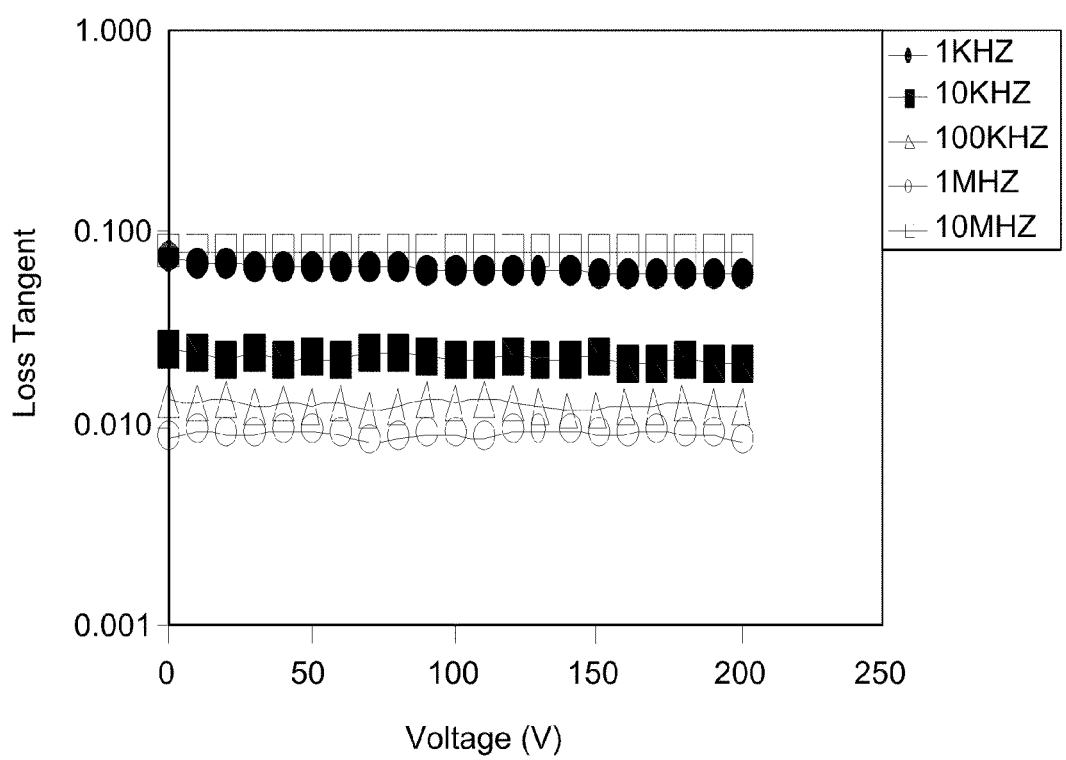

FIG. 77 depicts the variation of loss tangent of $Ba_{0.4}Sr_{0.6}Cr_{0.005}Ti_{0.995}O_3$ with respect to voltage.

Figure 78:
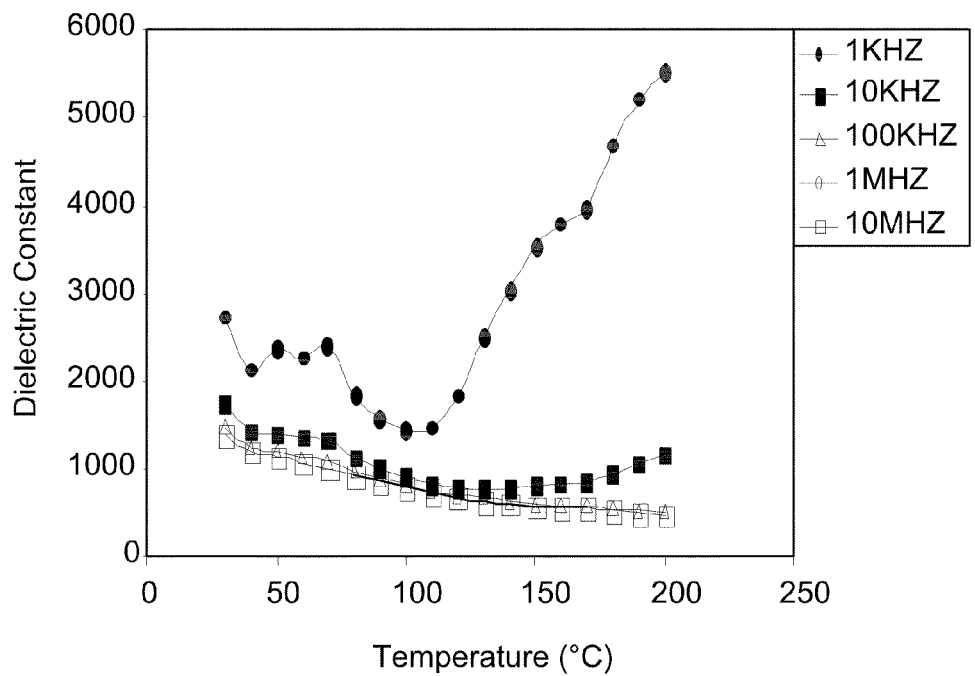

FIG. 78 depicts the variation of dielectric constant of $Ba_{0.4}Sr_{0.6}Cr_{0.002}Ti_{0.998}O_3$ with respect to temperature.

Figure 79:
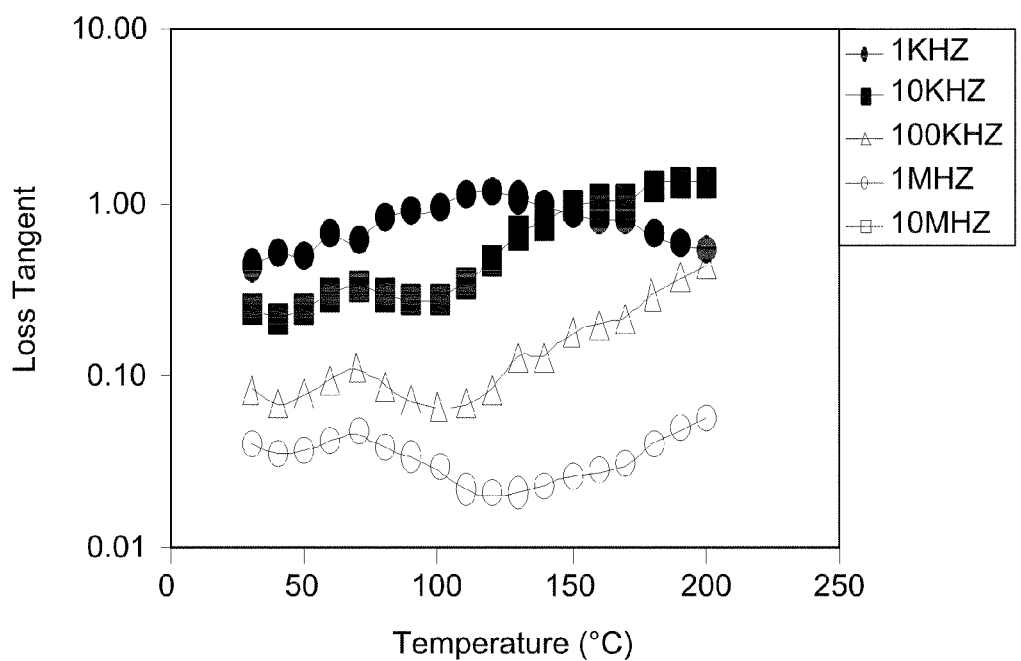

FIG. 79 depicts the variation of loss tangent of $Ba_{0.4}Sr_{0.6}Cr_{0.002}Ti_{0.998}O_3$ with respect to temperature.

Figure 80:
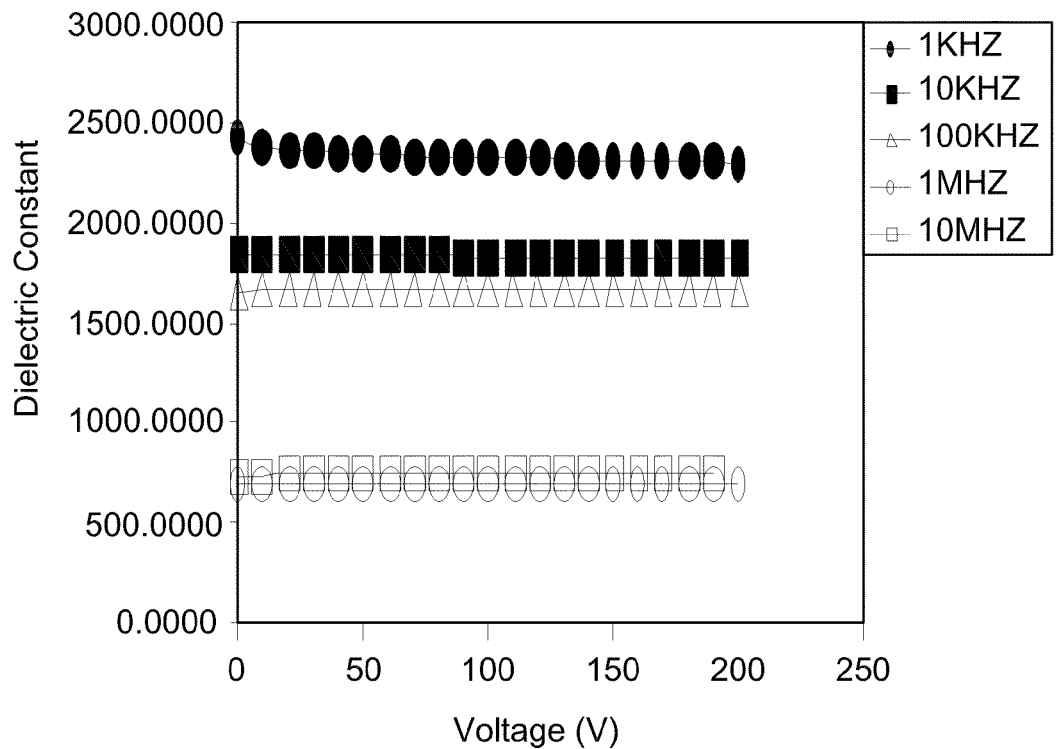

FIG. 80 depicts the variation of dielectric constant of $Ba_{0.4}Sr_{0.6}Cr_{0.002}Ti_{0.998}O_3$ with respect to voltage.

Figure 81:
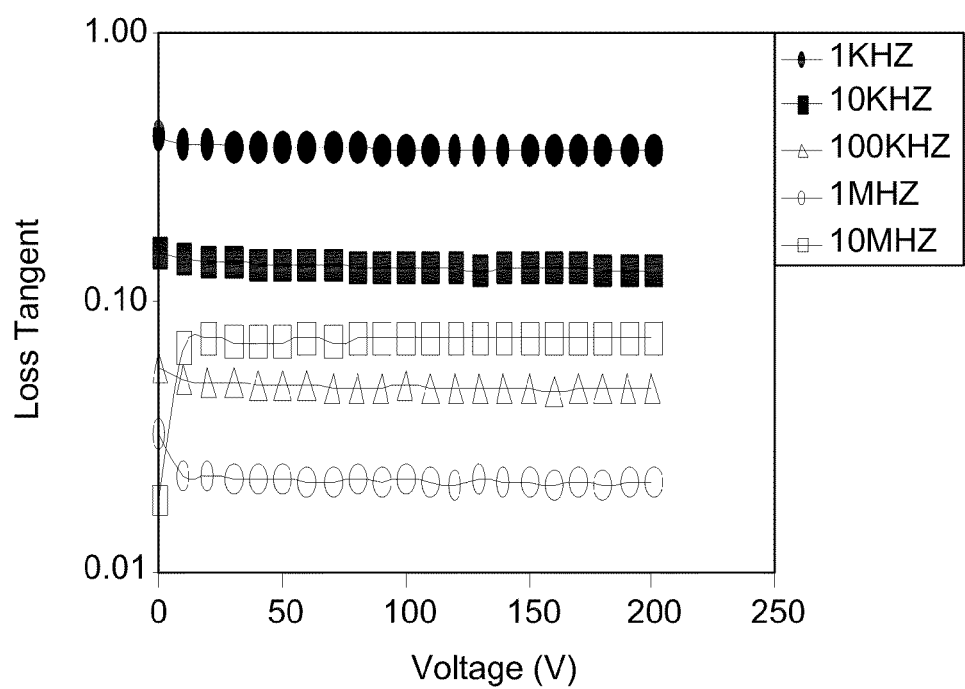

FIG. 81 depicts the variation of loss tangent of $Ba_{0.4}Sr_{0.6}Cr_{0.002}Ti_{0.998}O_3$ with respect to voltage.

Figure 82:
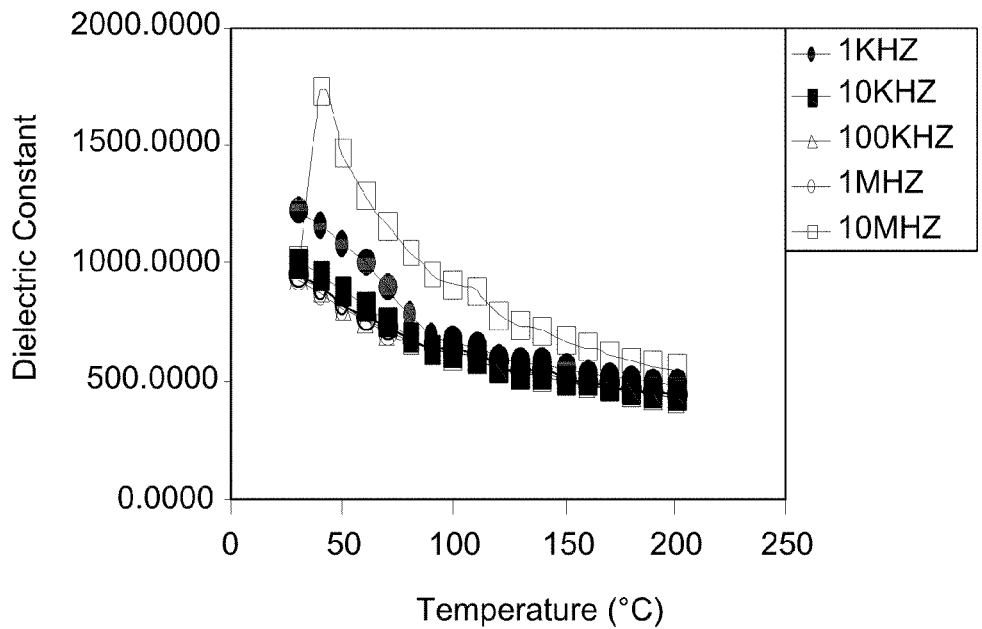

FIG. 82 depicts the variation of dielectric constant of $Ba_{0.3}Sr_{0.7}Cr_{0.005}Ti_{0.995}O_{2.8}N_{0.2}$ with respect to temperature.

Figure 83:
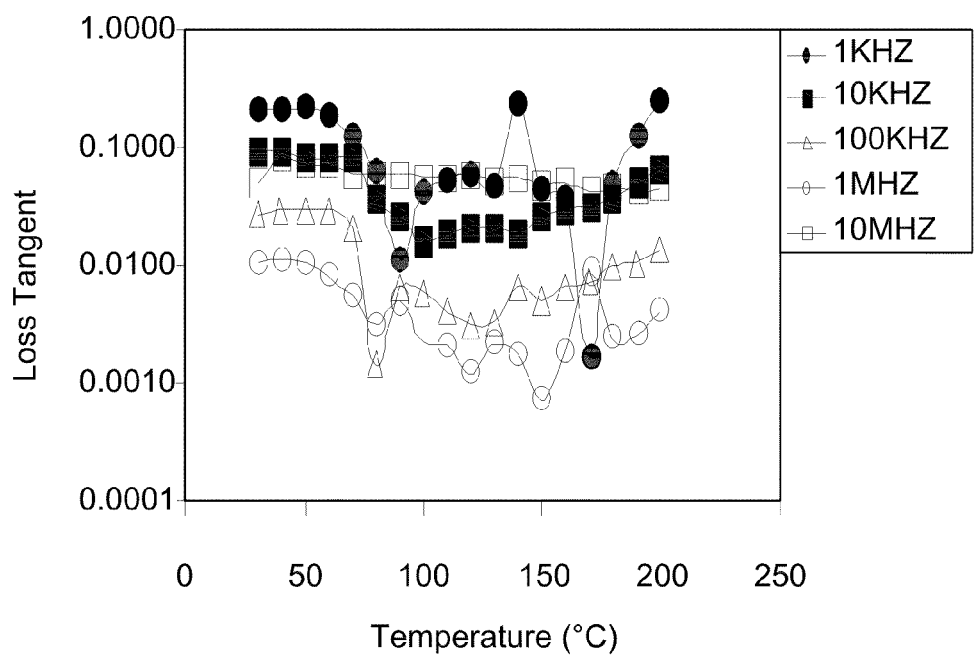

FIG. 83 depicts the variation of loss tangent of $Ba_{0.3}Sr_{0.7}Cr_{0.005}Ti_{0.995}O_{2.8}N_{0.2}$ with respect to temperature.

Figure 84:
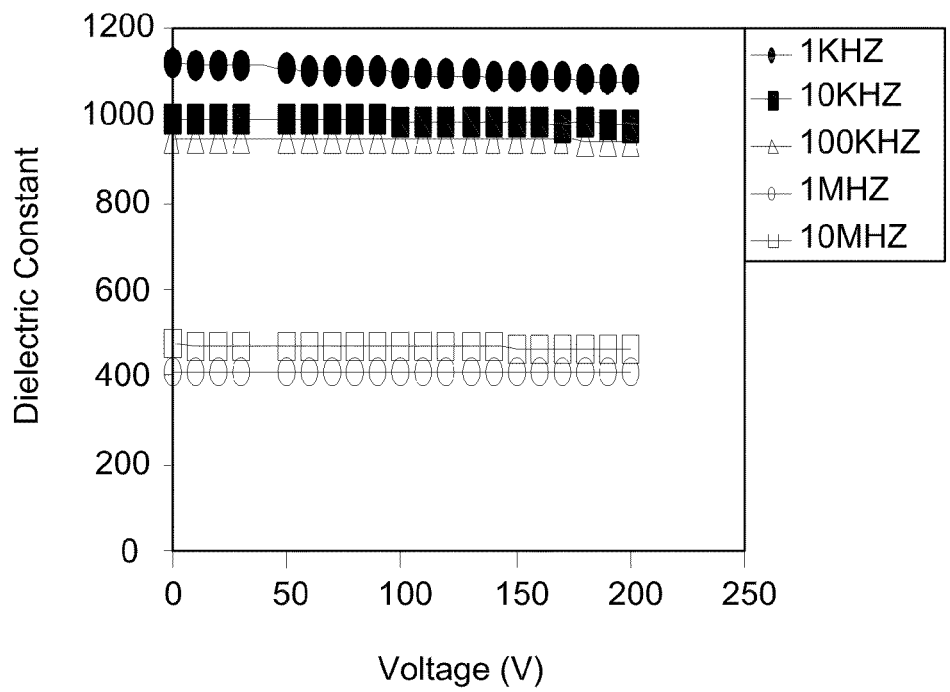

FIG. 84 depicts the variation of dielectric constant of $Ba_{0.3}Sr_{0.7}Cr_{0.005}Ti_{0.995}O_{2.8}N_{0.2}$ with respect to voltage.

Figure 85:
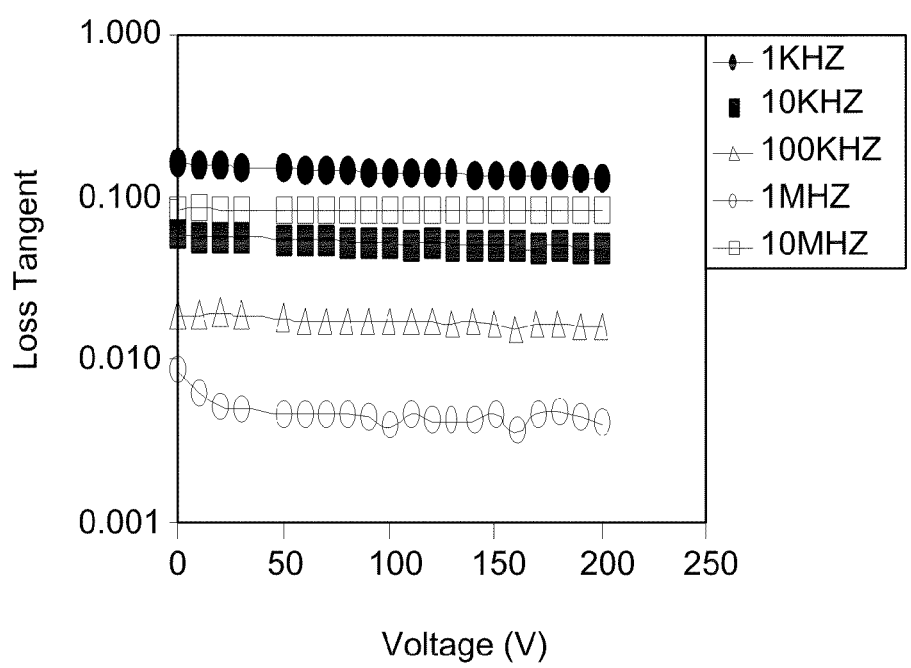

FIG. 85 depicts the variation of loss tangent of $Ba_{0.3}Sr_{0.7}Cr_{0.005}Ti_{0.995}O_{2.8}N_{0.2}$ with respect to voltage.

Figure 86:
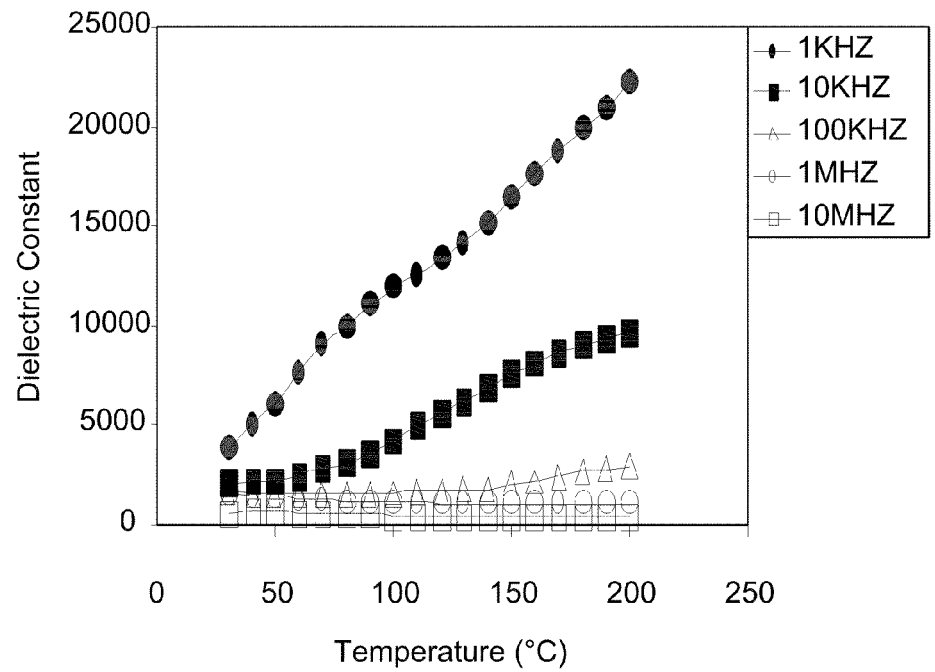

FIG. 86 depicts the variation of dielectric constant of $Ba_{0.4}Sr_{0.6}Cr_{0.005}Ti_{0.995}O_{2.8}N_{0.2}$ with respect to temperature.

Figure 87:
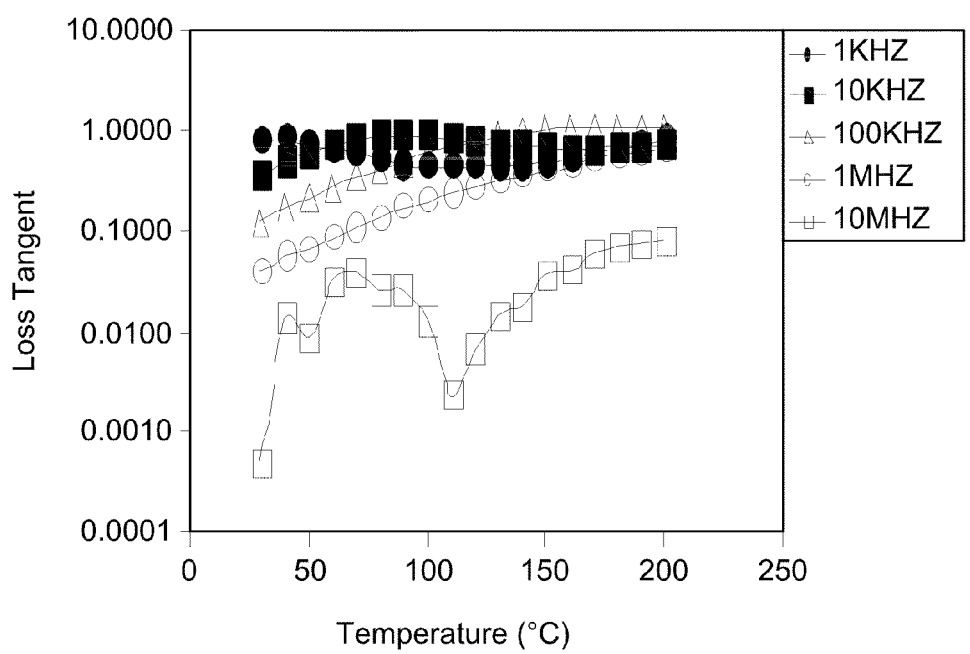

FIG. 87 depicts the variation of loss tangent of $Ba_{0.4}Sr_{0.6}Cr_{0.005}Ti_{0.995}O_{2.8}N_{0.2}$ with respect to temperature.

Figure 88:
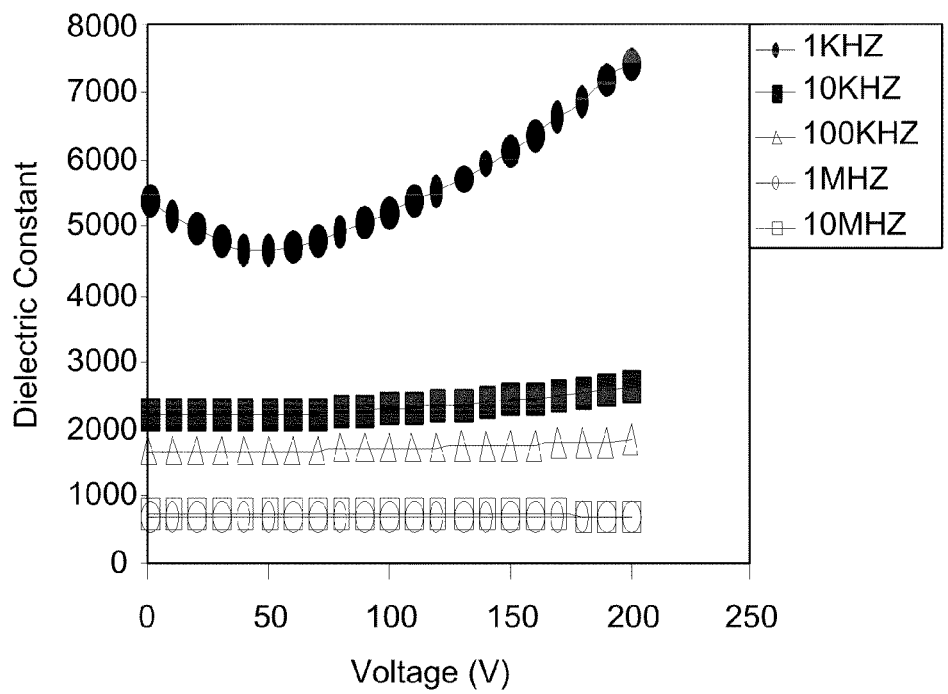

FIG. 88 depicts the variation of dielectric constant of $Ba_{0.4}Sr_{0.6}Cr_{0.005}Ti_{0.995}O_{2.8}N_{0.2}$ with respect to voltage.

Figure 89:
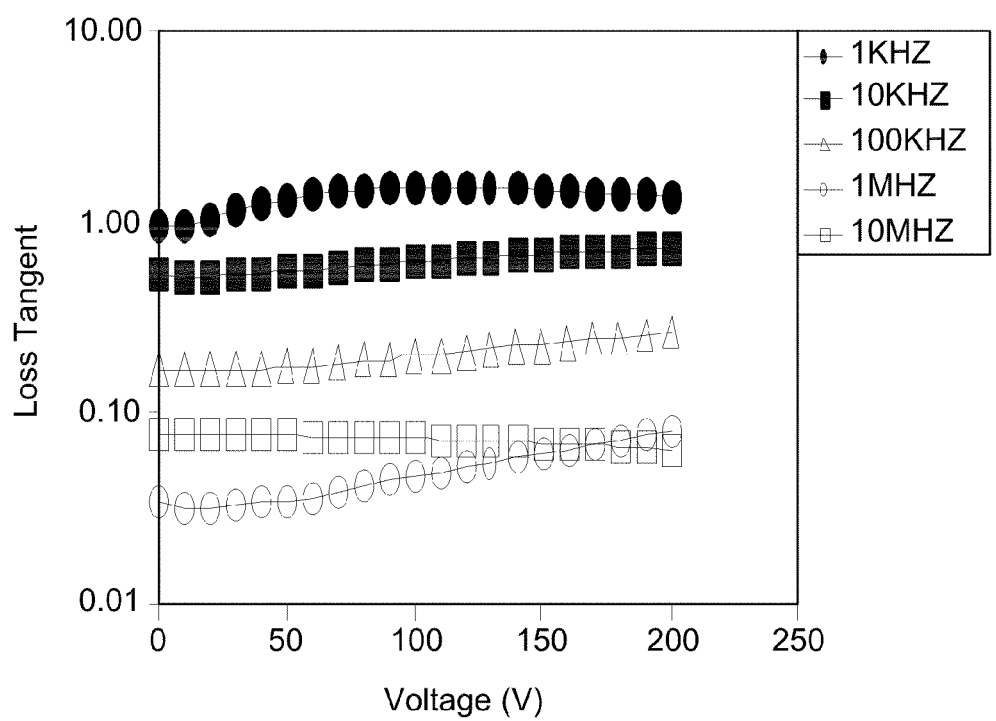

FIG. 89 depicts the variation of loss tangent of $Ba_{0.4}Sr_{0.6}Cr_{0.005}Ti_{0.995}O_{2.8}N_{0.2}$ with respect to voltage.

Figure 90:
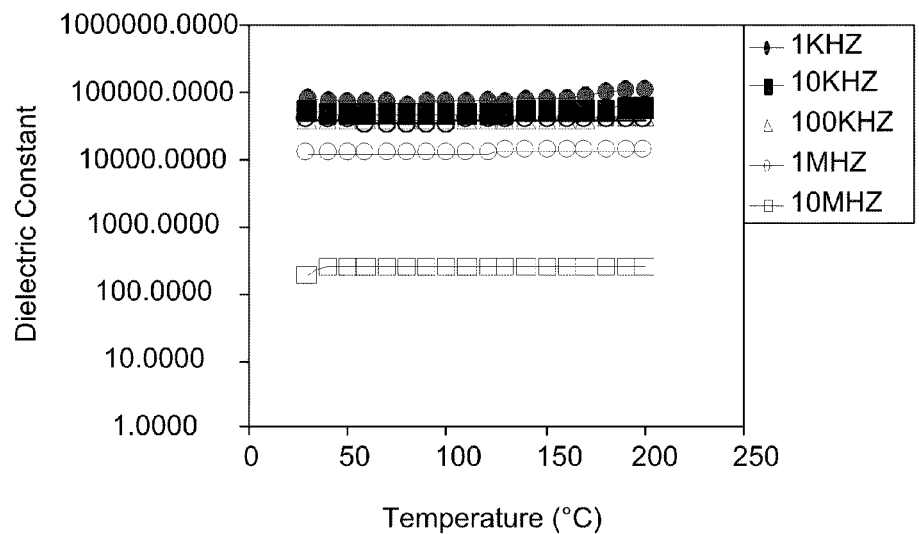

FIG. 90 depicts the variation of dielectric constant of $Ba_{0.3}Sr_{0.7}Cr_{0.005}Ti_{0.995}O_{2.8}N_{0.2}$ doped with 1 mol % $Bi_2O_3.3TiO_2$, with respect to temperature.

Figure 91:
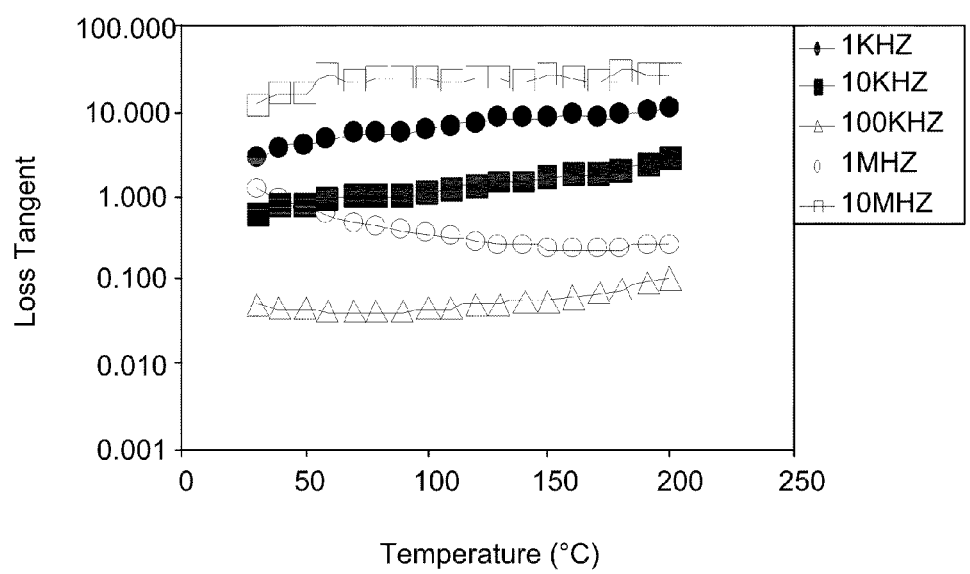

FIG. 91 depicts the variation of loss tangent of $Ba_{0.3}Sr_{0.7}Cr_{0.005}Ti_{0.995}O_{2.8}N_{0.2}$ doped with 1 mol % $Bi_2O_3.3TiO_2$, with respect to temperature.

Figure 92:
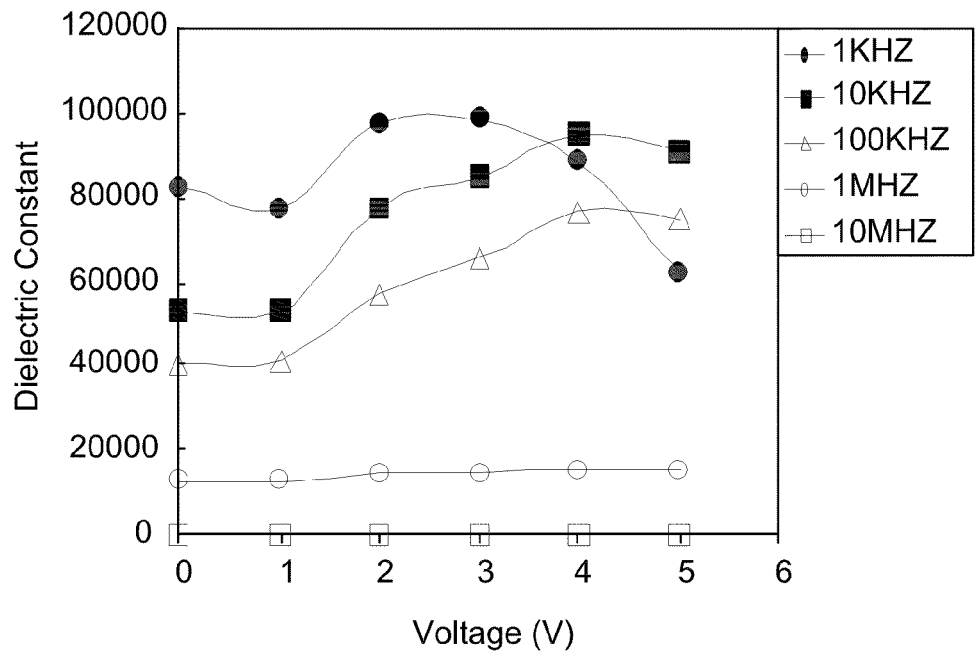

FIG. 92 depicts the variation of dielectric constant of $Ba_{0.3}Sr_{0.7}Cr_{0.005}Ti_{0.995}O_{2.8}N_{0.2}$ doped with 1 mol % $Bi_2O_3.3TiO_2$, with respect to voltage.

Figure 93:
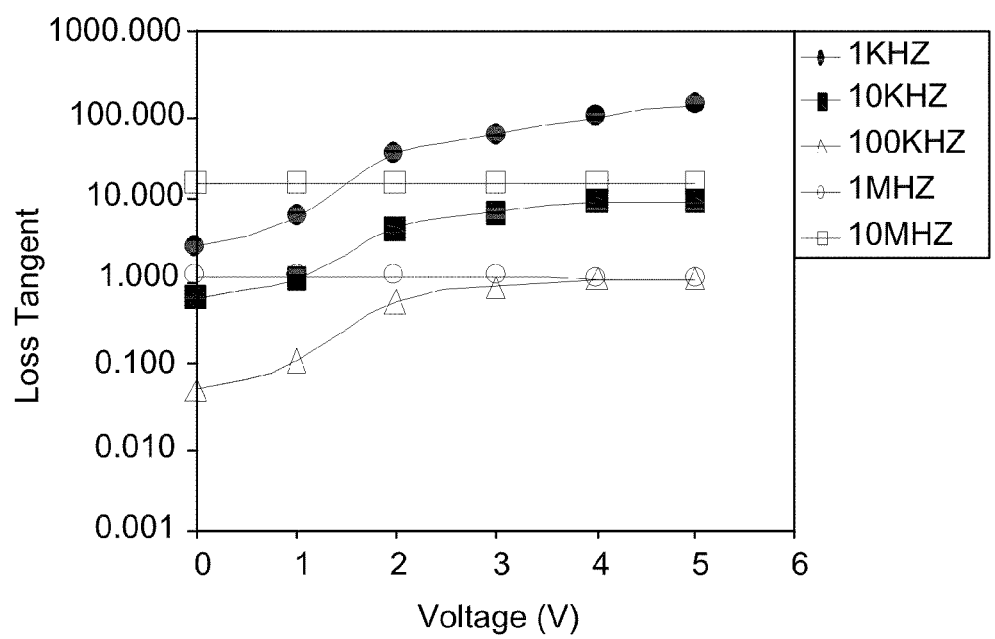

FIG. 93 depicts the variation of loss tangent of $Ba_{0.3}Sr_{0.7}Cr_{0.005}Ti_{0.995}O_{2.8}N_{0.2}$ doped with 1 mol % $Bi_2O_3.3TiO_2$, with respect to voltage.

Figure 94:
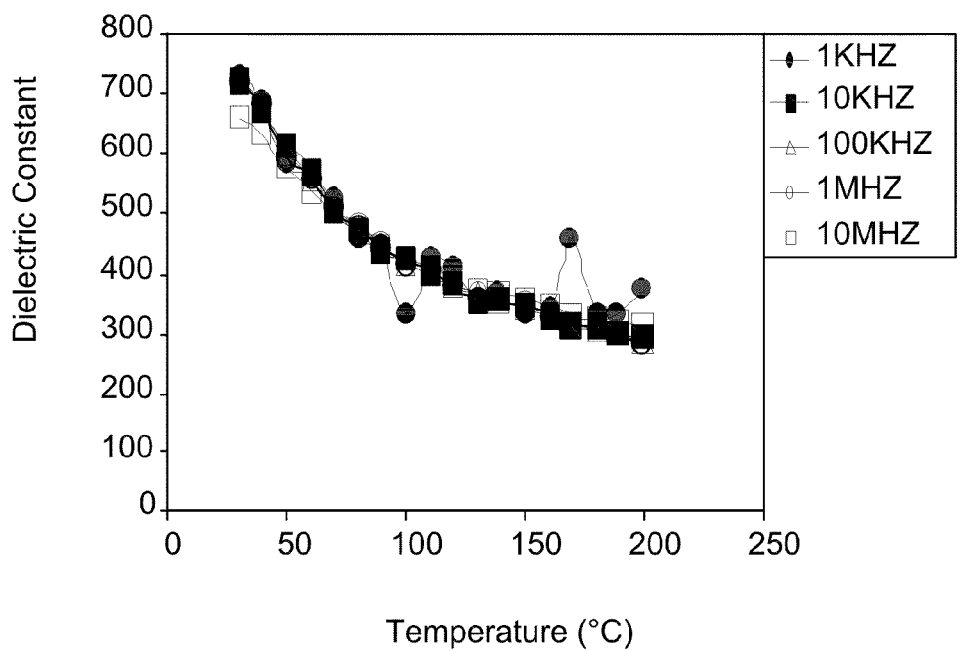

FIG. 94 depicts the variation of dielectric constant with respect to temperature of $Ba_{0.4}Sr_{0.6}TiO_3$ prepared by using $BaF_2$ and $SrF_2$.

Figure 95:
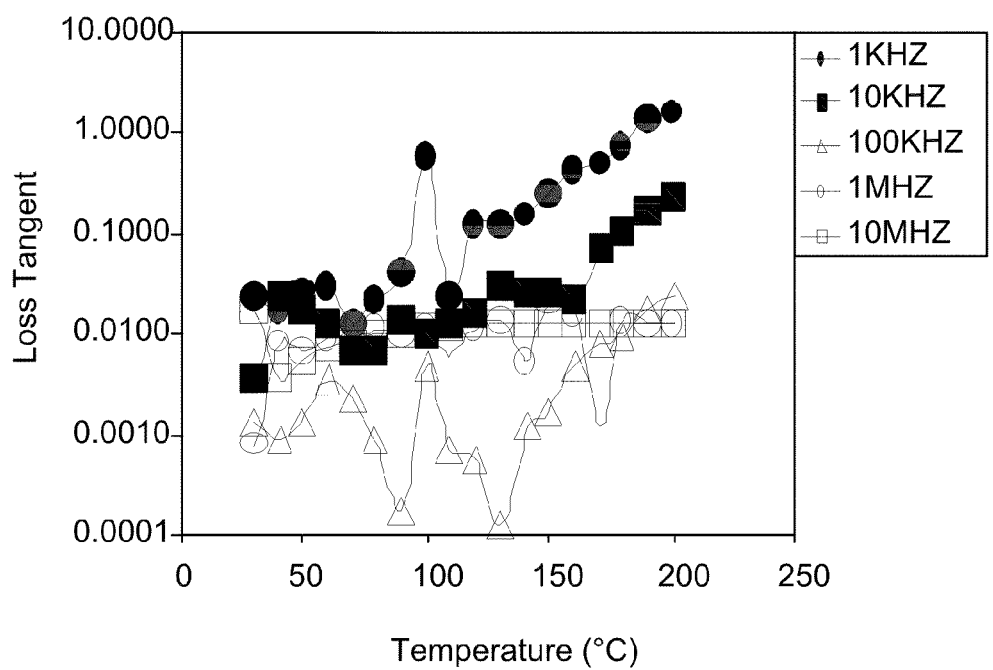

FIG. 95 depicts the variation of loss tangent with respect to temperature of $Ba_{0.4}Sr_{0.6}TiO_3$ prepared by using $BaF_2$ and $SrF_2$.

Figure 96:
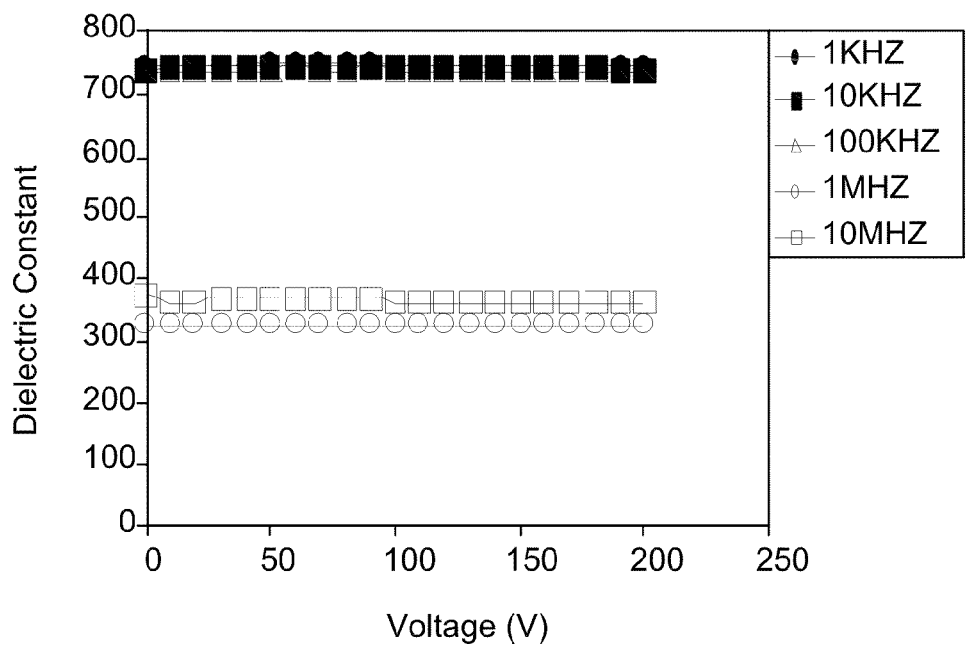

FIG. 96 depicts the variation of dielectric constant with respect to voltage of $Ba_{0.4}Sr_{0.6}TiO_3$ prepared by using $BaF_2$ and $SrF_2$.

Figure 97:
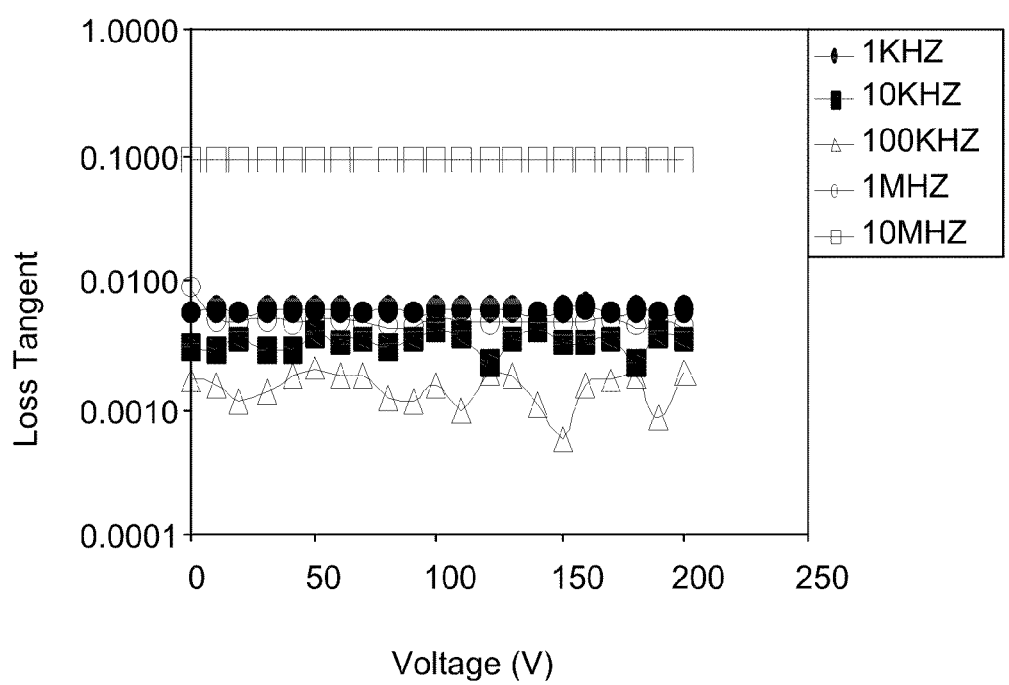

FIG. 97 depicts the variation of loss tangent with respect to voltage of $Ba_{0.4}Sr_{0.6}TiO_3$ prepared by using $BaF_2$ and $SrF_2$.

Figure 98:
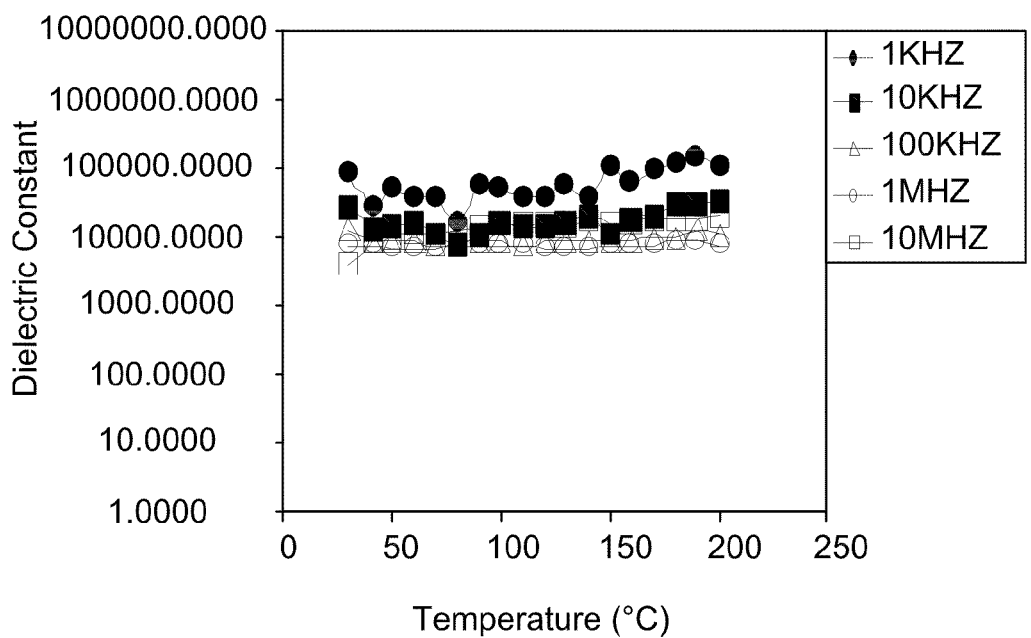

FIG. 98 depicts the variation of dielectric constant with respect to temperature of $Ba_{0.4}Sr_{0.6}TiO_3$ prepared by using $BaF_2$ and $SrF_2$ and doped with 1 mol % $Bi_2O_3.3TiO_2$.

Figure 99:
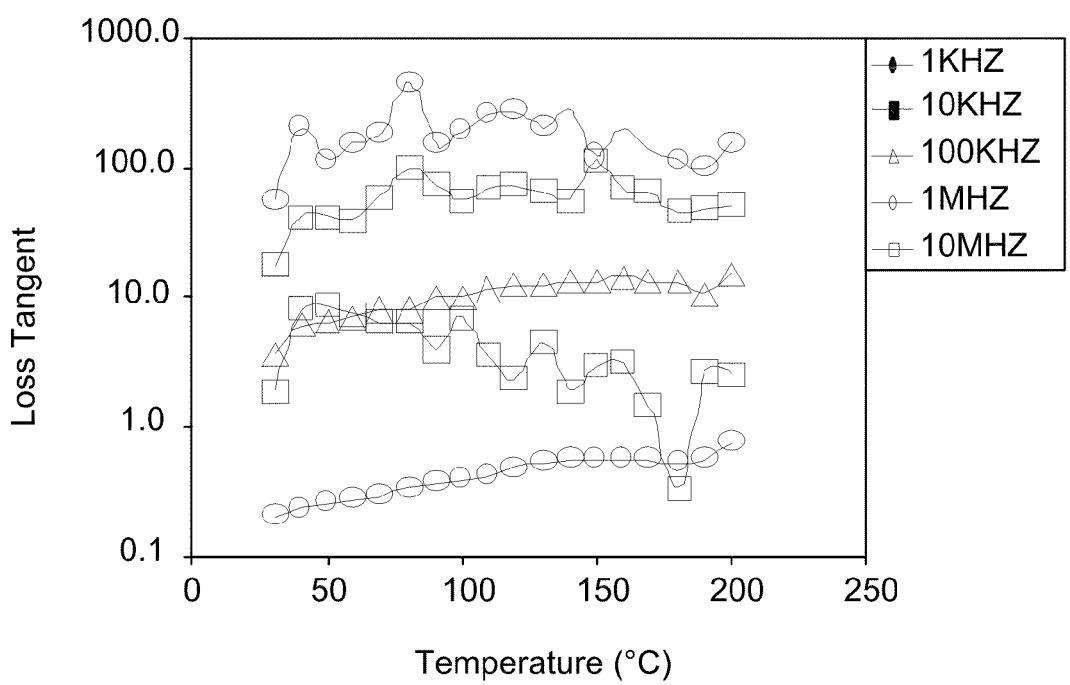

FIG. 99 depicts the variation of loss tangent with respect to temperature of $Ba_{0.4}Sr_{0.6}TiO_3$ prepared by using $BaF_2$ and $SrF_2$ and doped with 1 mol % $Bi_2O_3.3TiO_2$.

Figure 100:
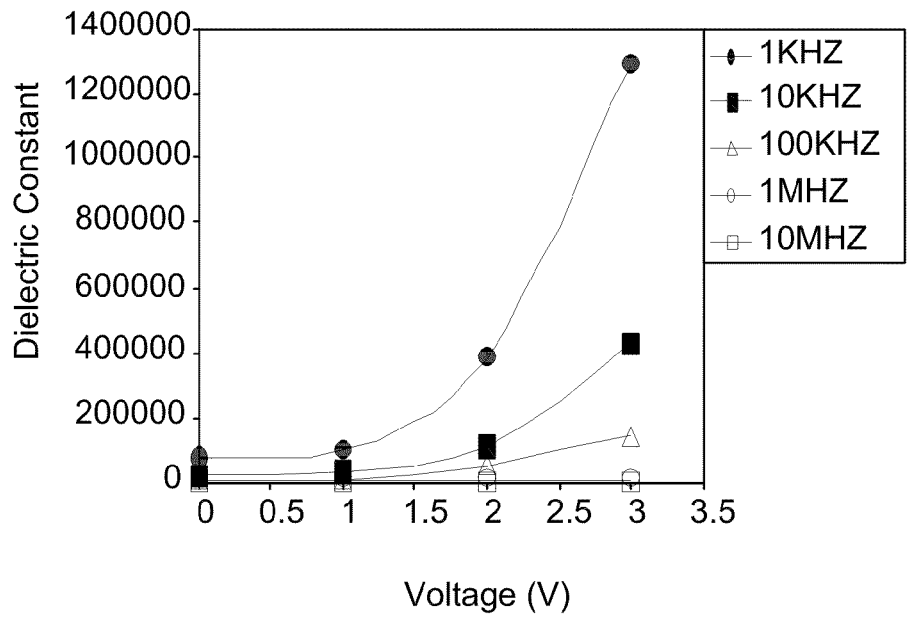

FIG. 100 depicts the variation of dielectric constant with respect to voltage of $Ba_{0.4}Sr_{0.6}TiO_3$ prepared by using $BaF_2$ and $SrF_2$ and doped with 1 mol % $Bi_2O_3.3TiO_2$.

Figure 101:
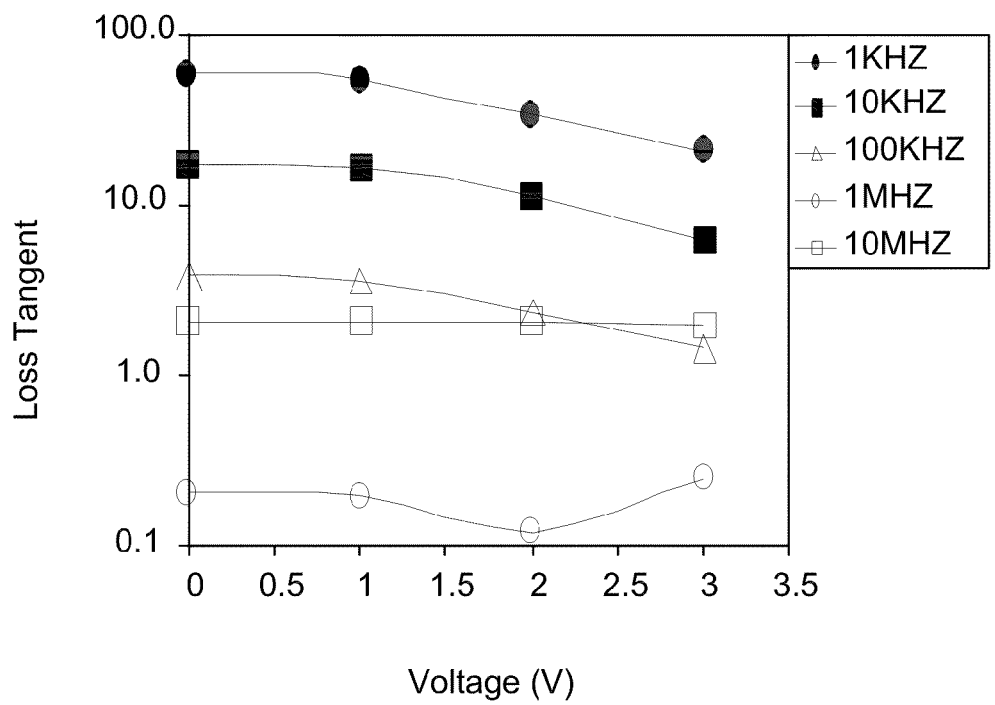

FIG. 101 depicts the variation of loss tangent with respect to voltage of $Ba_{0.4}Sr_{0.6}TiO_3$ prepared by using $BaF_2$ and $SrF_2$ and doped with 1 mol % $Bi_2O_3.3TiO_2$.

Figure 102:
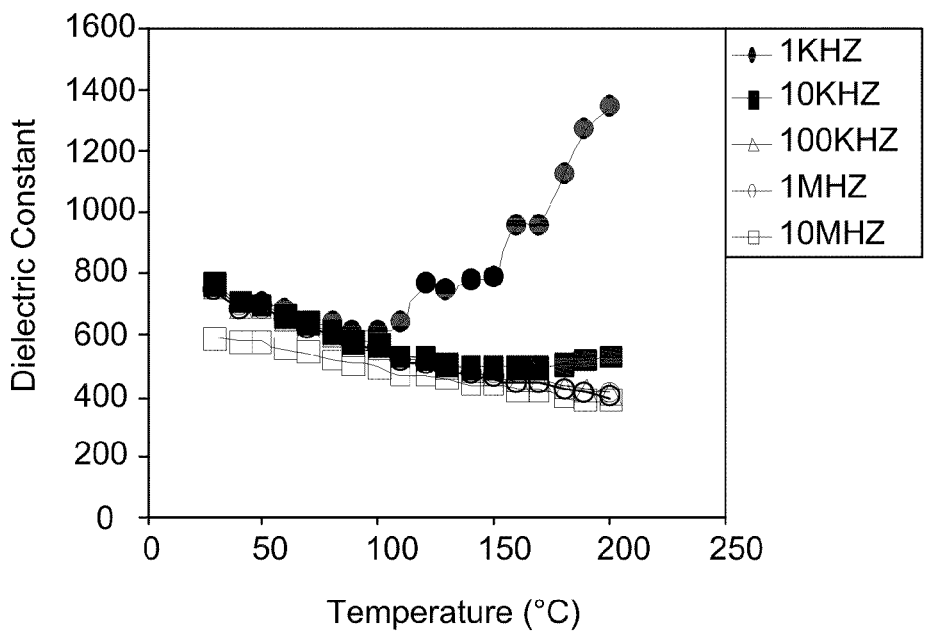

FIG. 102 depicts the variation of dielectric constant of $Ba_{0.3}Sr_{0.7}TiO_{2.8}N_{0.2}$ with respect to temperature.

Figure 103:
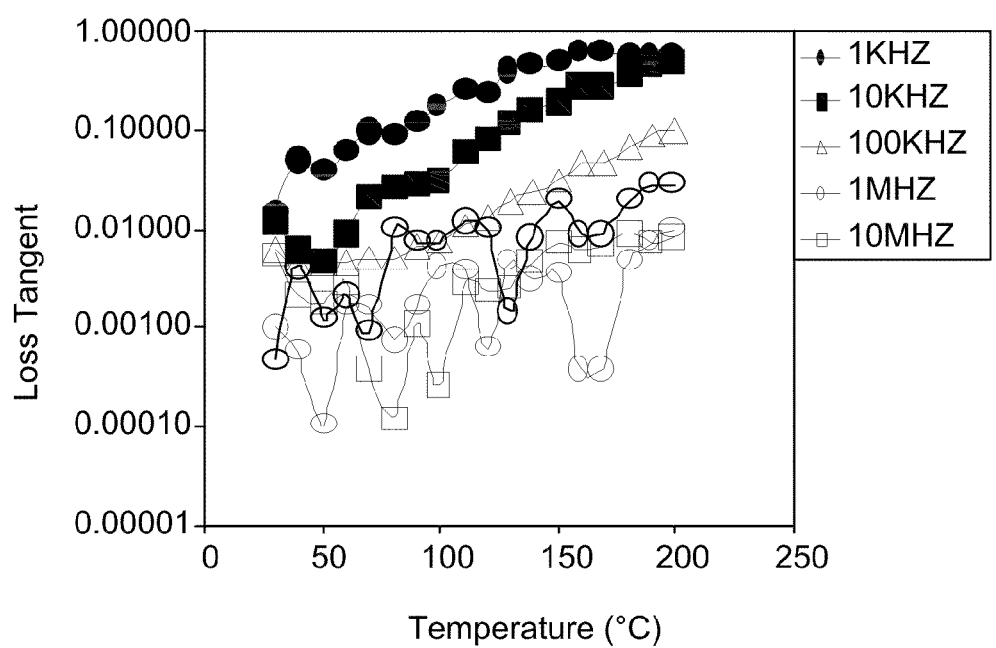

FIG. 103 depicts the variation of loss tangent of $Ba_{0.3}Sr_{0.7}TiO_{2.8}N_{0.2}$ with respect to temperature.

Figure 104:
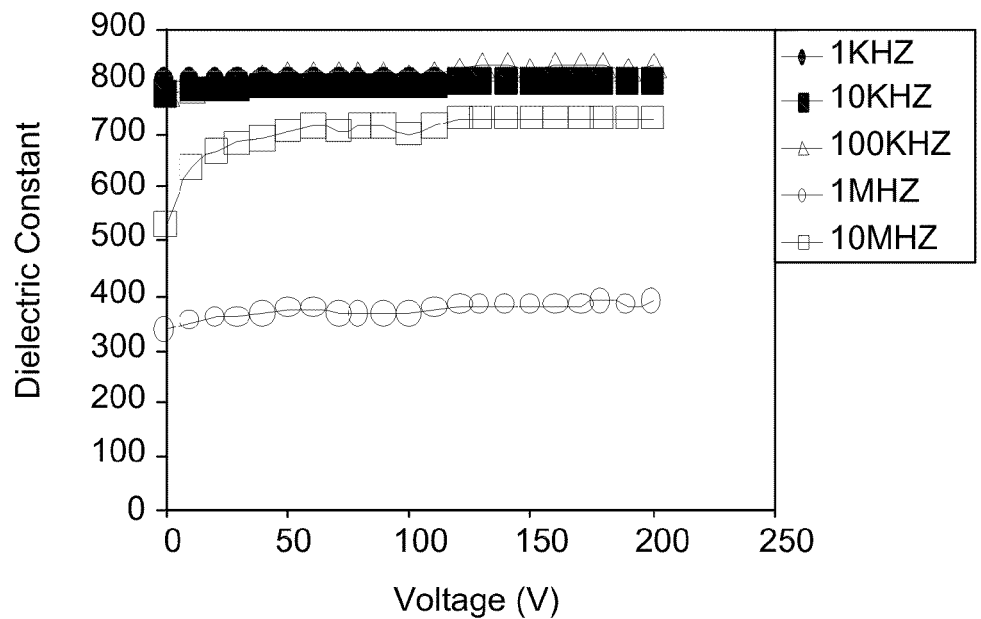

FIG. 104 depicts the variation of dielectric constant of $Ba_{0.3}Sr_{0.7}TiO_{2.8}N_{0.2}$ with respect to voltage.

Figure 105:
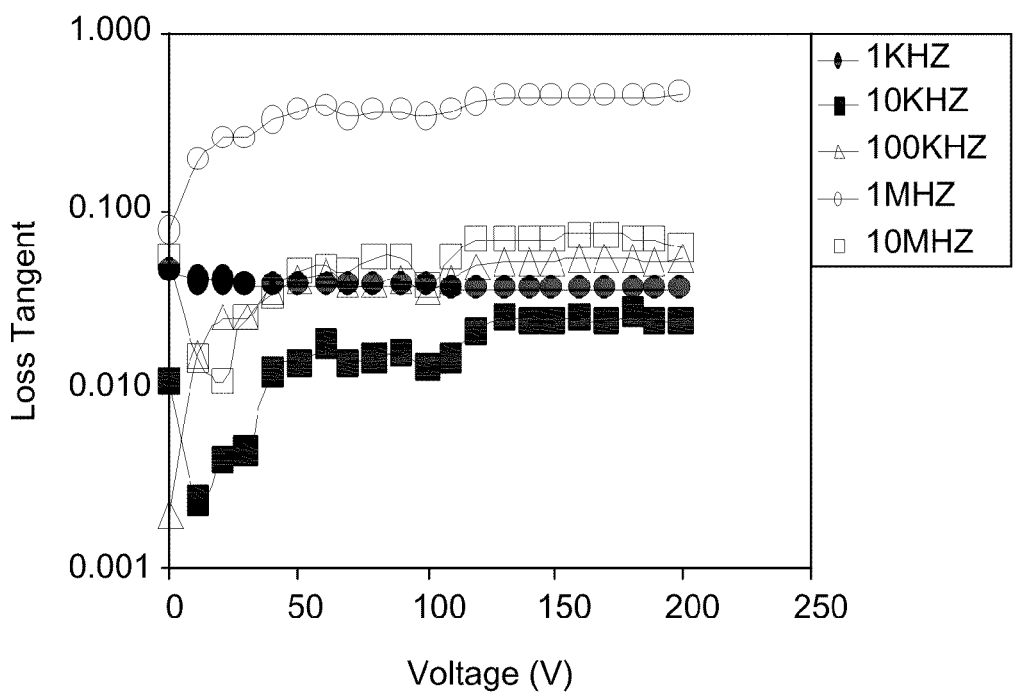

FIG. 105 depicts the variation of loss tangent of $Ba_{0.3}Sr_{0.7}TiO_{2.8}N_{0.2}$ with respect to voltage.

Figure 106:
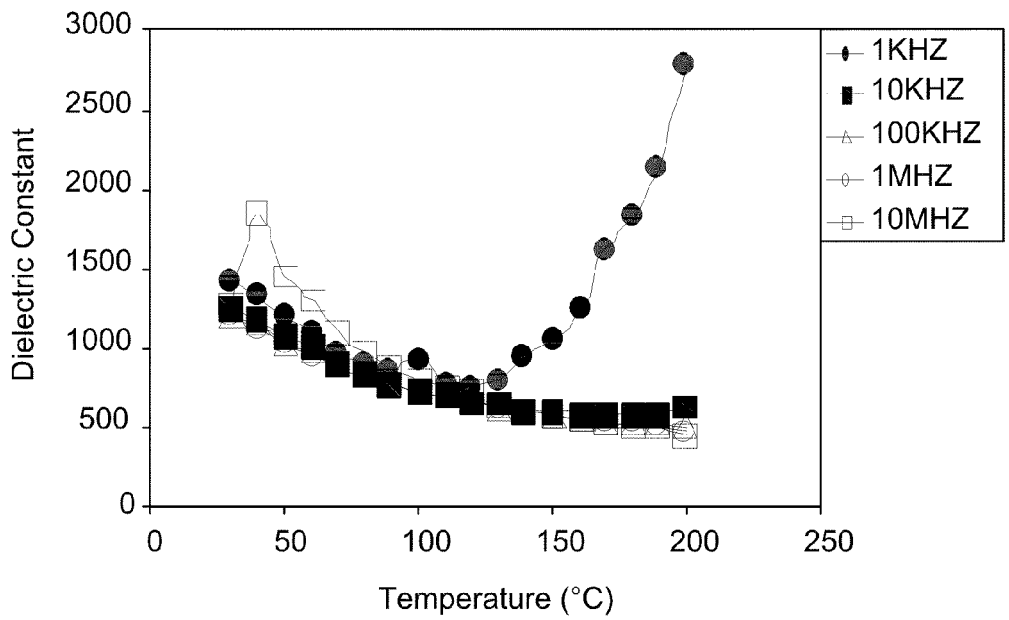

FIG. 106 depicts the variation of dielectric constant of $Ba_{0.4}Sr_{0.6}TiO_{2.8}N_{0.2}$ with respect to temperature.

Figure 107:
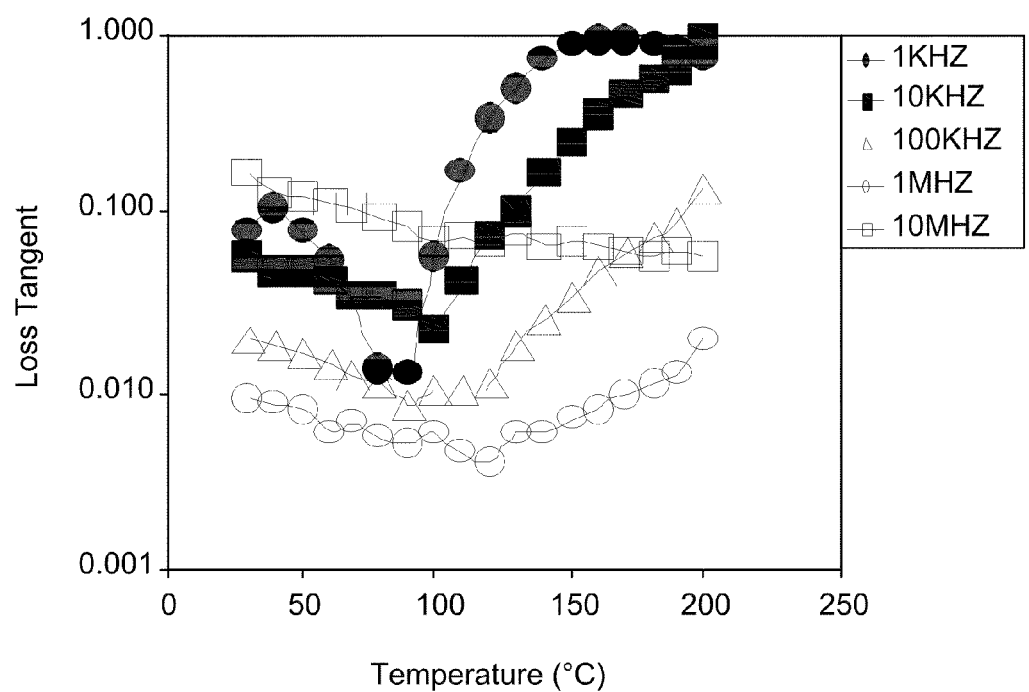

FIG. 107 depicts the variation of loss tangent of $Ba_{0.4}Sr_{0.6}TiO_{2.8}N_{0.2}$ with respect to temperature.

Figure 108:
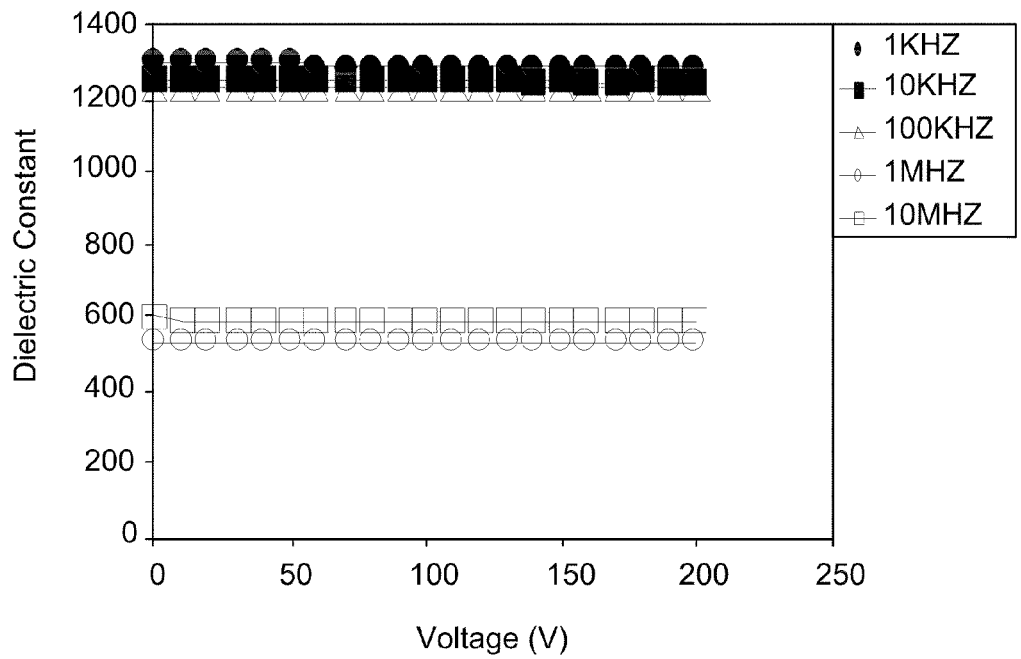

FIG. 108 depicts the variation of dielectric constant of $Ba_{0.4}Sr_{0.6}TiO_{2.8}N_{0.2}$ with respect to voltage.

Figure 109:
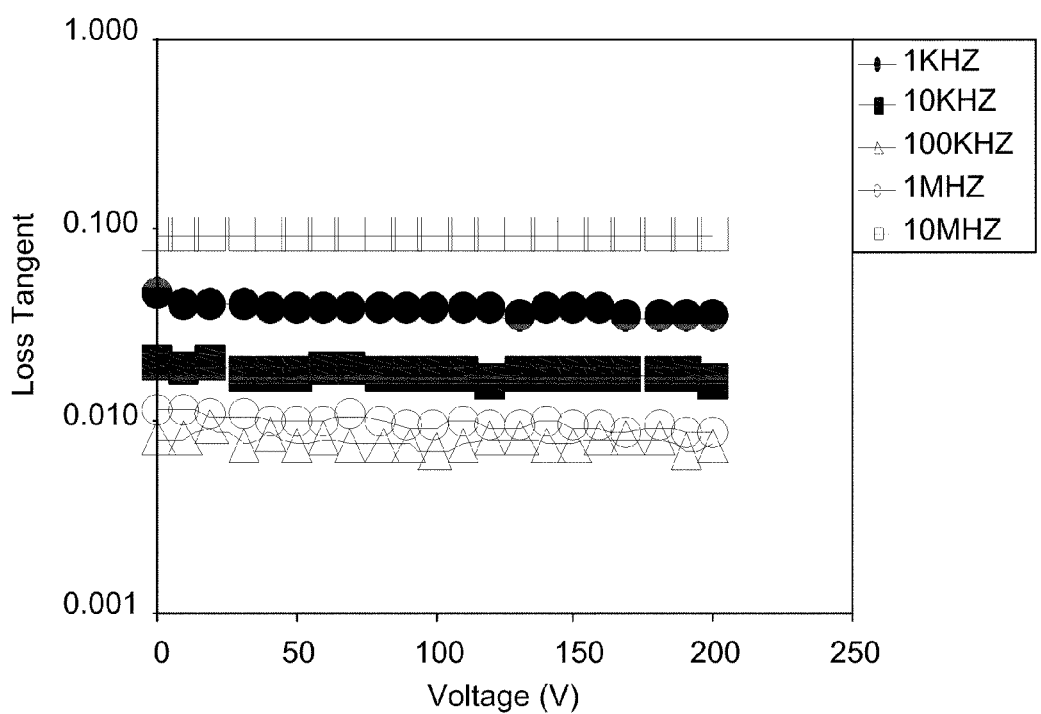

FIG. 109 depicts the variation of loss tangent of $Ba_{0.4}Sr_{0.6}TiO_{2.8}N_{0.2}$ with respect to voltage.

Figure 110:
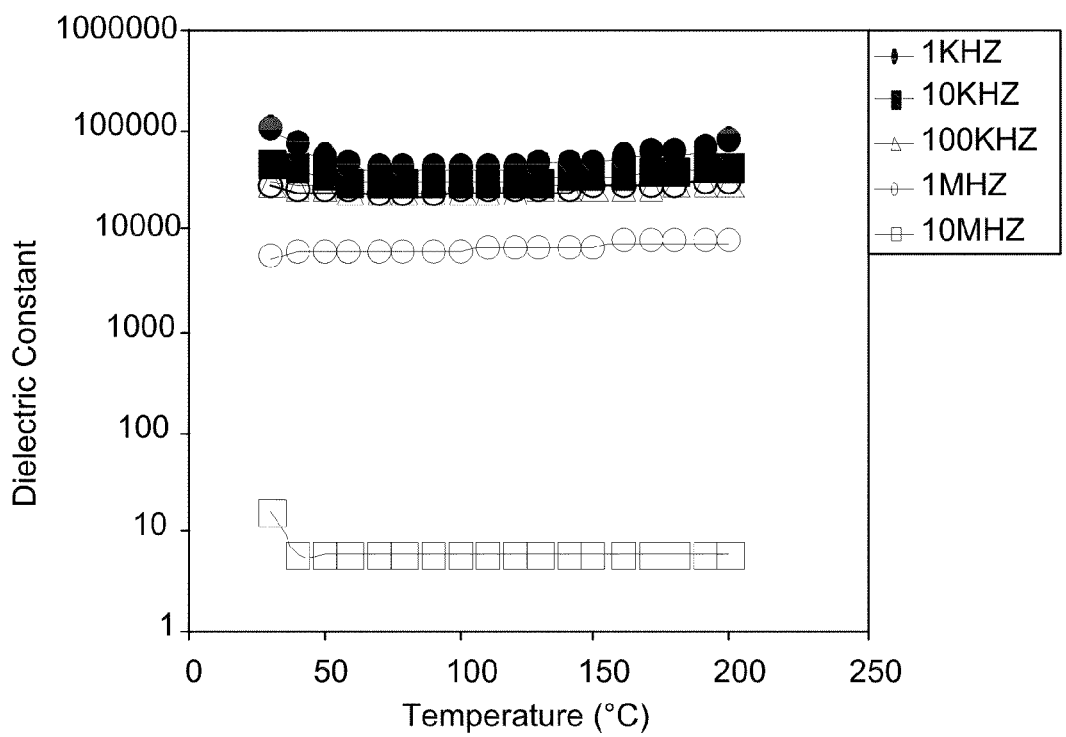

FIG. 110 depicts the variation of dielectric constant of $Ba_{0.3}Sr_{0.7}TiO_{2.8}N_{0.2}$ doped with 1 mol % $Bi_2O_3.3TiO_2$, with respect to temperature.

Figure 111:
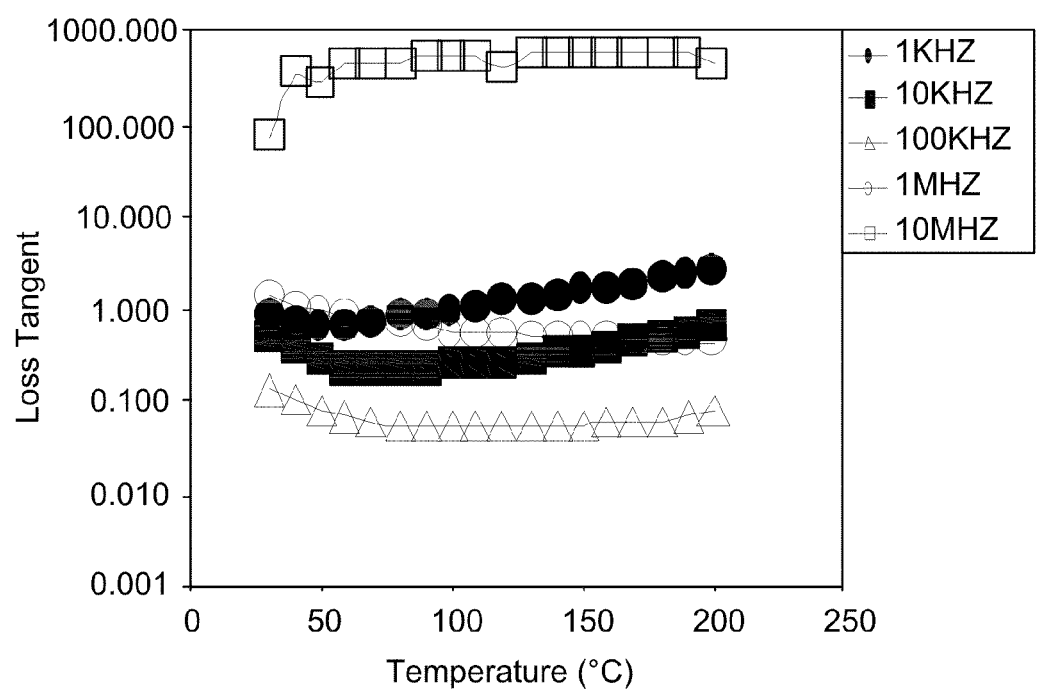

FIG. 111 depicts the variation of loss tangent of $Ba_{0.3}Sr_{0.7}TiO_{2.8}N_{0.2}$ doped with 1 mol % $Bi_2O_3.3TiO_2$, with respect to temperature.

Figure 112:
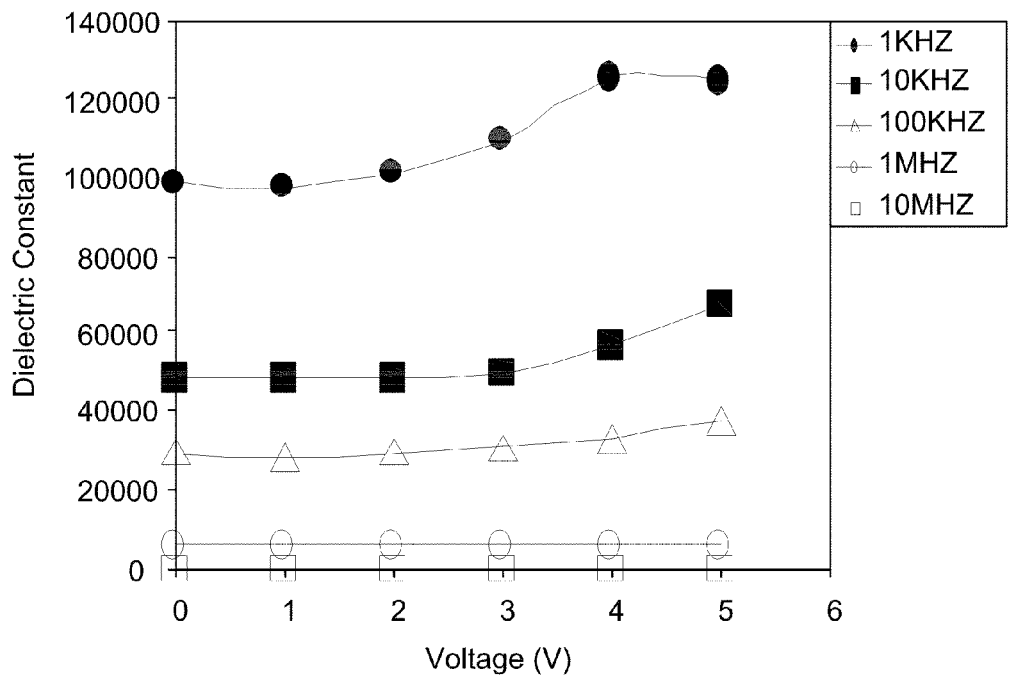

FIG. 112 depicts the variation of dielectric constant of $Ba_{0.3}Sr_{0.7}TiO_{2.8}N_{0.2}$ doped with 1 mol % $Bi_2O_3.3TiO_2$, with respect to voltage.

Figure 113:
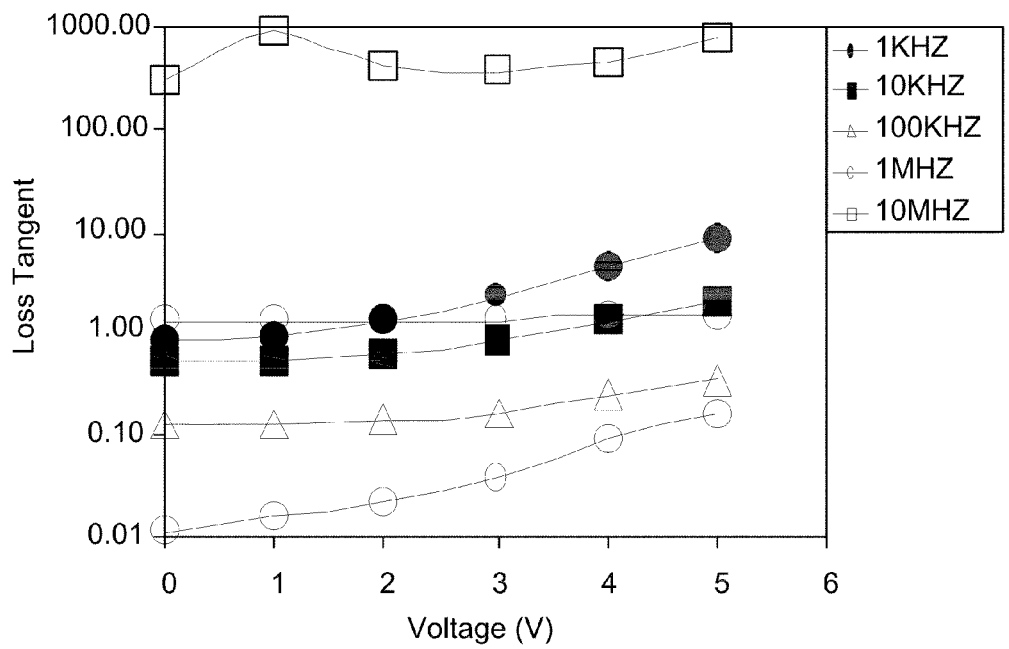

FIG. 113 depicts the variation of loss tangent of $Ba_{0.3}Sr_{0.7}TiO_{2.8}N_{0.2}$ doped with 1 mol % $Bi_2O_3.3TiO_2$, with respect to voltage.

Figure 114:
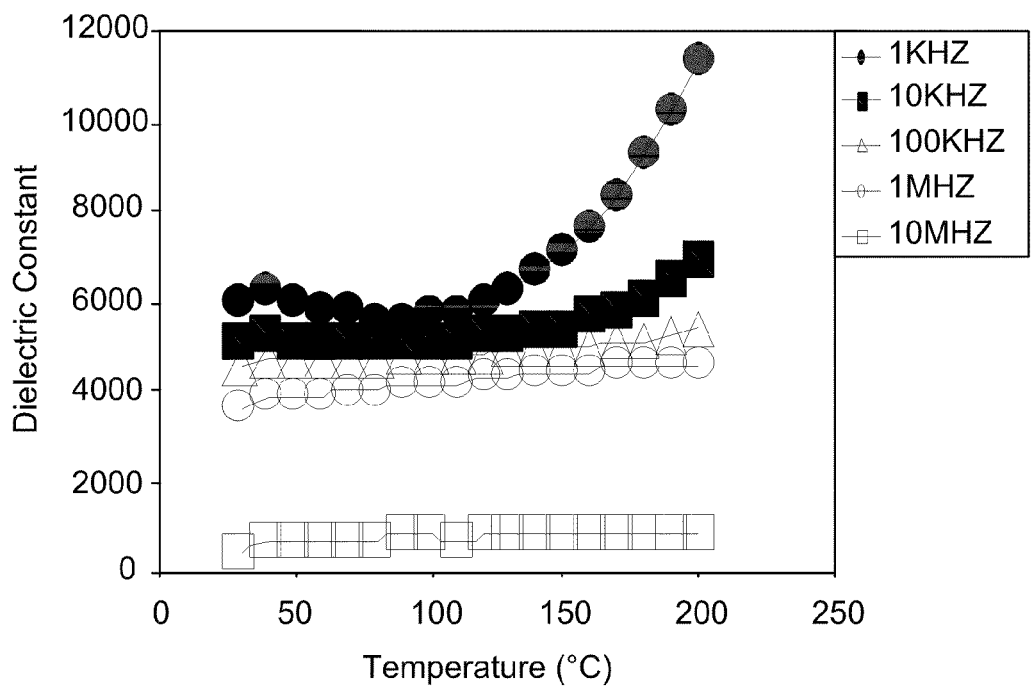

FIG. 114 depicts the variation of dielectric constant of $Ba_{0.01}Sr_{0.2}Ca_{0.79}Cu_3Ti_4O_{12}$ with respect to temperature.

Figure 115:
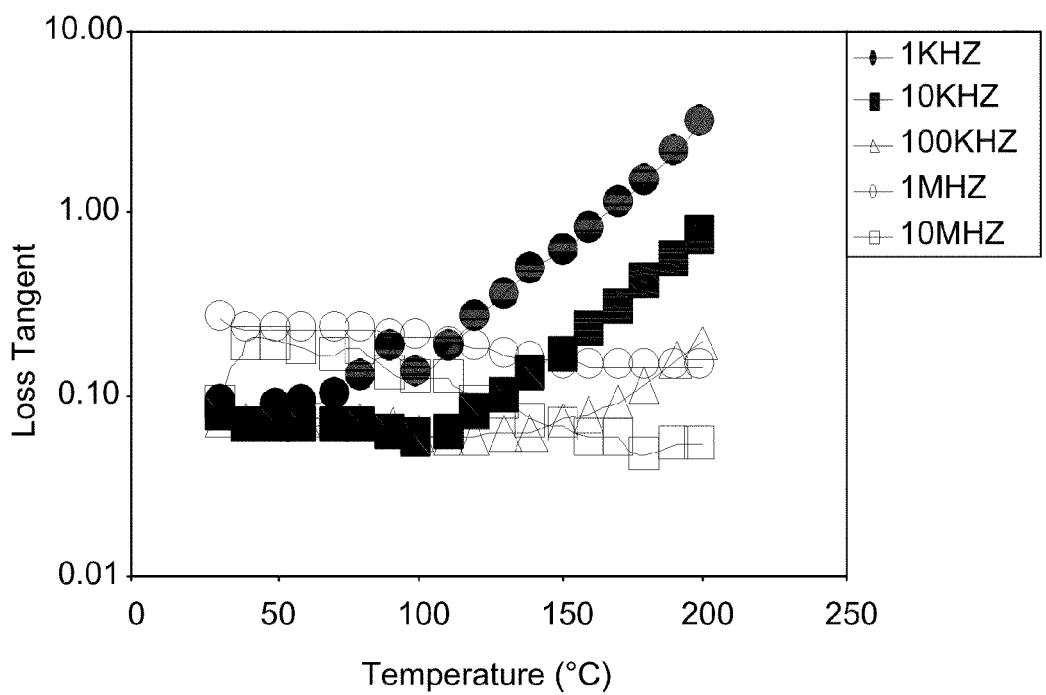

FIG. 115 depicts the variation of loss tangent of $Ba_{0.01}Sr_{0.2}Ca_{0.79}Cu_3Ti_4O_{12}$ with respect to temperature.

Figure 116:
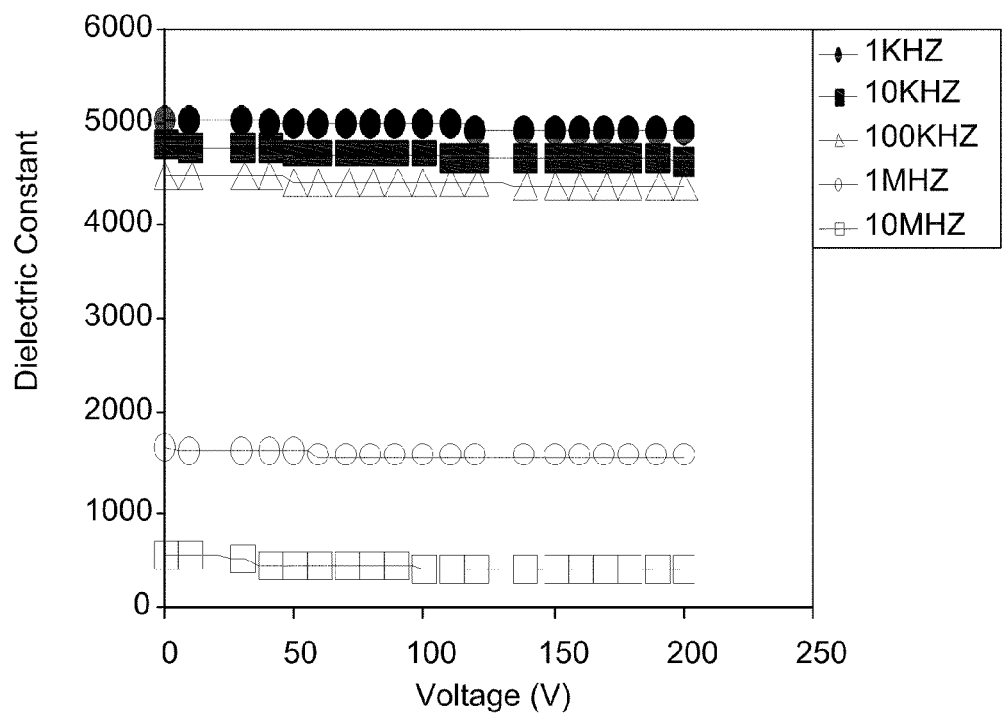

FIG. 116 depicts the variation of dielectric constant of $Ba_{0.01}Sr_{0.2}Ca_{0.79}Cu_3Ti_4O_{12}$ with respect to voltage.

Figure 117:
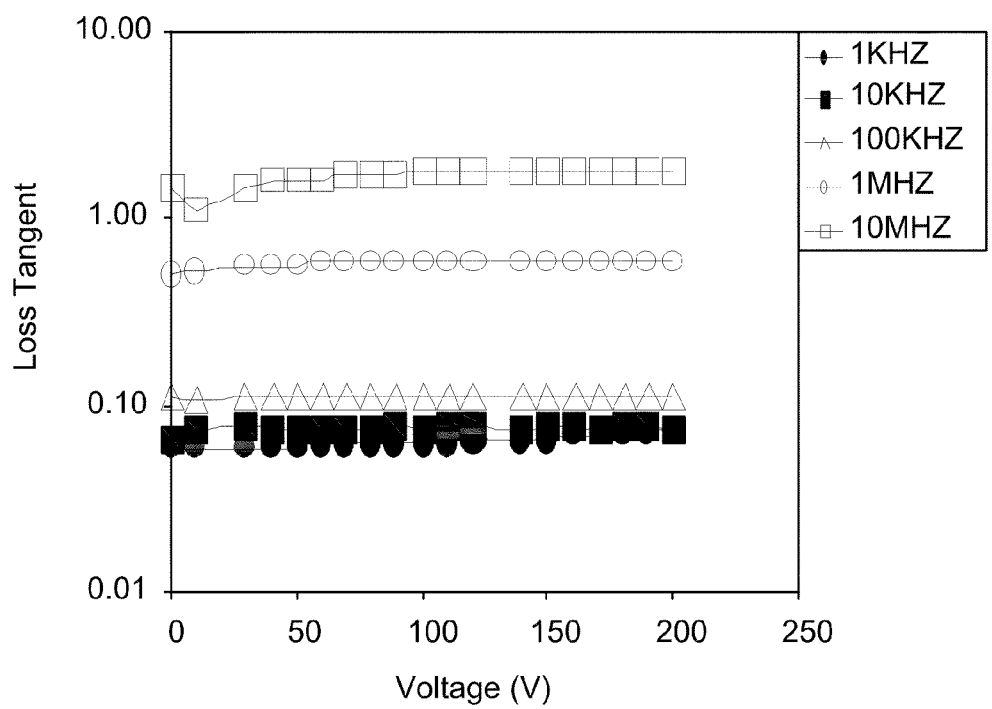

FIG. 117 depicts the variation of loss tangent of $Ba_{0.01}Sr_{0.2}Ca_{0.79}Cu_3Ti_4O_{12}$ with respect to voltage.

Figure 118:
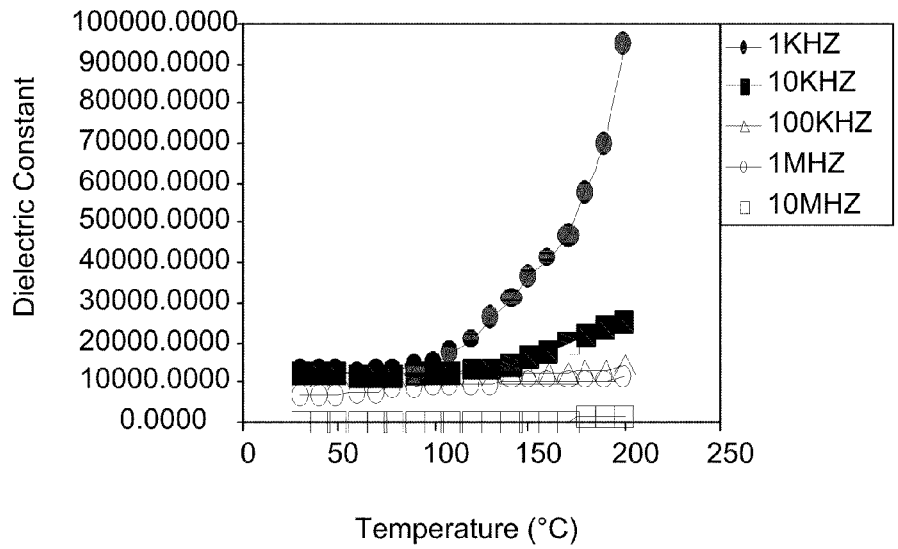

FIG. 118 depicts the variation of dielectric constant of $CaCu_3Ti_{3.99}Zr_{0.01}O_{11.995}$ with respect to temperature.

Figure 119:
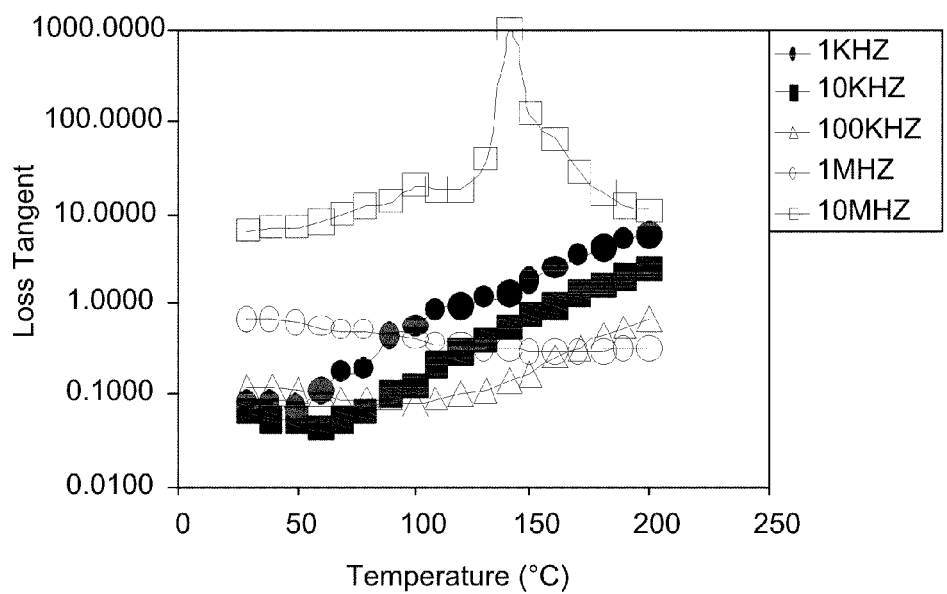

FIG. 119 depicts the variation of loss tangent of $CaCu_3Ti_{3.99}Zr_{0.01}O_{11.995}$ with respect to temperature.

Figure 120:
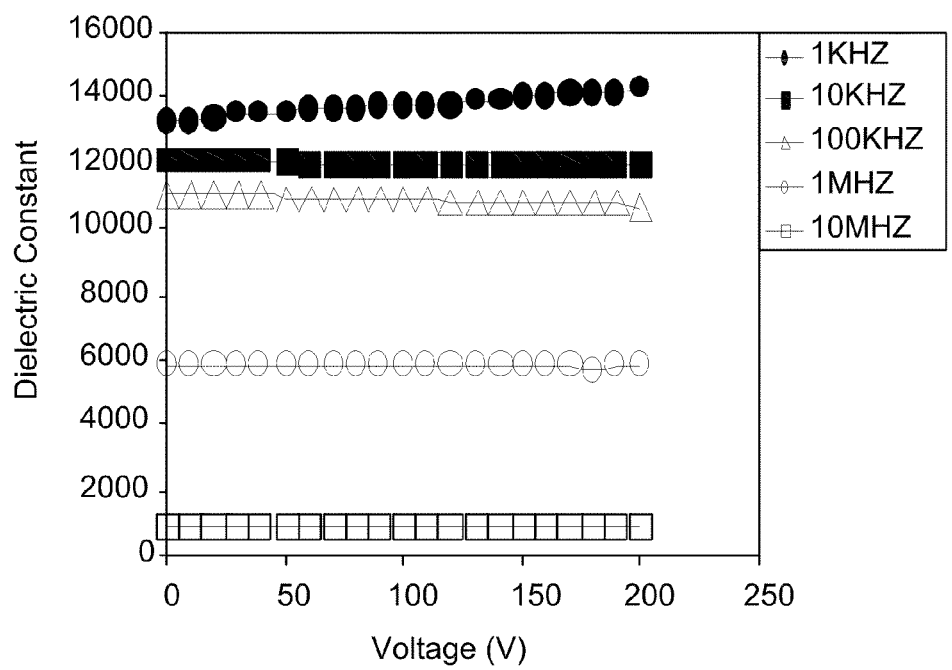

FIG. 120 depicts the variation of dielectric constant of $CaCu_3Ti_{3.99}Zr_{0.01}O_{11.995}$ with respect to voltage.

FIG. 121 depicts the variation of loss tangent of $CaCu_3Ti_{3.99}Zr_{0.01}O_{11.995}$ with respect to voltage.

While the exceptions may not be ruled out, general observations about the temperature and voltage dependency of the above mentioned materials are as described below. In general, materials based on CCT material system encompassing FIG. 1-41 and FIG. 118-121 show uniform changes with respect to increasing temperature. It is observed that the loss tangent of the material increases with increasing temperature and the dielectric constant generally increases with a very low coefficient of temperature. This material system shows voltage tunability of dielectric constant with high levels of voltage up to about 200 V, while loss tangent, as depicted, is nearly constant with increasing voltage at all the frequencies.

In general, BST with metallic bismuth precipitate in the grain boundary encompassing FIGS. 41-61, 71-74, 90-94, 98-101, and 110-113 show uniform dielectric properties with increasing temperature up to about 200° C. The dielectric constant of this material increases with temperature with a very low coefficient of temperature. Further, BST with metallic bismuth precipitate in the grain boundary shows sharp voltage tunability with low levels of voltage, such as for example, up to about 5 V for some materials and up to about 40 V for some other materials.

In general, the $Ba_{0.55}Sr_{0.4}Ca_{0.05}Cr_{0.01}Ti_{0.99}O_3$ system has a phase transition below room temperature and, therefore, the dielectric constant shows a decreasing trend from room temperature to 200° C. with increasing temperature as can be seen from FIG. 62. The dielectric constant of this material is constant with voltage levels up to 200 V as shown in FIG. 64. Similarly, from the FIGS. 66-69, 74-89, 94-97, and 102-109, it can be seen that the dielectric constant of BST material system shows a decreasing trend from room temperature to 200° C. and shows voltage tunability with high levels of voltage, for example, up to about 200 V. The loss tangent of this system is nearly constant with increasing voltage at almost all the frequencies.

FIG. 114-117 shows up the temperature and voltage dependency of $(Ba,Sr,Ca)Cu_3Ti_4O_{12}$ system. The dielectric constant of this material increases with a very low coefficient of temperature. The loss tangent shows a similar trend with a very minute change the magnitude with increasing temperature. The dielectric constant of this system shows some voltage tunability with high levels of voltage up to about 200 V. The loss tangent, as depicted, is nearly constant with increasing voltage at almost all frequencies.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A material comprising:
$\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof, and
$0 \le x \le 0.1$, $0 \le y \le 1$, $0 \le z \le 1$, $0 \le p \le 0.1$, $0 \le q \le 0.1$, $0 \le \delta \le 0.05$, $0 \le r \le 1$, and $0.5 \le \alpha \le 1$,
with a proviso that
when $z=\alpha=1$, and $p=q=0$, $x>0$ and $y>0$;
when $x=y=0$ and $z=\alpha=1$, p and q are greater than zero; and
when $x=y=z=0$, p and q are not simultaneously zero.

2. The material of claim 1, comprising $CaCu_{2.9}La_{0.067}Ti_{3.94}Al_{0.06}O_{12-\delta}$.

3. The material of claim 1, comprising $CaCU_{2.9}La_{0.067}Ti_{3.99}Zr_{0.01}O_{12-\delta}$.

4. The material of claim 1, comprising $CaCu_{2.9}La_{0.067}Ti_{3.98}Cr_{0.02}O_{12-\delta}$.

5. The material of claim 1, comprising $CaCu_3Ti_{3.92}Cr_{0.02}Al_{0.06}O_{12-\delta}$.

6. The material of claim 1, comprising $Ca_2Cu_2Ti_{3.94}Al_{0.06}O_{12-\delta}$.

7. The material of claim 1, comprising $Ca_2Cu_2Ti_{3.98}Cr_{0.02}O_{12-\delta}$.

8. The material of claim 1, comprising $Ca_2Cu_{1.9}La_{0.067}Ti_4O_{12}$.

9. The material of claim 1, comprising $Ca_2Cu_2Ti_{3.99}Zr_{0.01}O_{12}$.

10. The material of claim 1, comprising $Ba_{0.01}Sr_{0.1}Ca_{0.89}Cu_3Ti_4O_{12}$.

11. The material of claim 1, comprising 0.6 $[CaCu_3Ti_{3.94}Al_{0.06}O_{12-\delta}]+0.4[SrTiO_3]$.

12. The material of claim 1, comprising 0.6 $[CaCu_3Ti_{3.98}Cr_{0.02}O_{12-\delta}]+0.4[SrTiO_3]$.

13. A dielectric component comprising:
a material comprising
$\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof, and
$0 \le x \le 0.1$, $0 \le y \le 1$, $0 \le z \le 1$, $0 \le p \le 0.1$, $0 \le q \le 0.1$, $0 \le \delta \le 0.05$, $0 \le r \le 1$, and $0.5 \le \alpha \le 1$,
with a proviso that
when $z=\alpha=1$, and $p=q=0$, $x>0$ and $y>0$;
when $x=y=0$ and $z=\alpha=1$, p and q are greater than zero; and
when $x=y=z=0$, p and q are not simultaneously zero.

14. A system comprising:
a dielectric component comprising a material comprising
$\alpha[Ca_{1-x-y}Ba_xSr_y(Ca_{1-z}Cu_z)Cu_{2-p}La_{2p/3}Ti_{4-q}M_qO_{12-\delta}]+(1-\alpha)[Ba_rSr_{1-r}TiO_3]$, wherein M is aluminum, chromium, zirconium, or combinations thereof, and
$0 \le x \le 0.1$, $0 \le y \le 1$, $0 \le z \le 1$, $0 \le p \le 0.1$, $0 \le q \le 0.1$, $0 \le \delta \le 0.05$, $0 \le r \le 1$, and $0.5 \le \alpha \le 1$,
with a proviso that
when $z=\alpha=1$, and $p=q=0$, $x>0$ and $y>0$;
when $x=y=0$ and $z=\alpha=1$, p and q are greater than zero; and
when $x=y=z=0$, p and q are not simultaneously zero.

* * * * *

UNITED STATES PATENT AND TRADEMARK OFFICE
CERTIFICATE OF CORRECTION

PATENT NO. : 8,586,495 B2  
APPLICATION NO. : 13/075997  
DATED : November 19, 2013  
INVENTOR(S) : Krishna et al.

It is certified that error appears in the above-identified patent and that said Letters Patent is hereby corrected as shown below:

In the Specification

In Column 2, Line 22, delete "$0 \leq y = 1$," and insert -- $0 \leq y \leq 1$, --, therefor.

In Column 3, Line 59, delete "1 mm" and insert -- 1 mm. --, therefor.

In Column 4, Line 44, delete "$0 \leq p \leq 0.1$," and insert -- $0 \leq p \leq 0.1$, $0 \leq q \leq 0.1$, --, therefor.

In Column 5, Line 54, delete "$Ba_{0.55}Sr_{0.4}Ca_{0.5}Cr_{0.002}Ti_{0.908}O_3$." and insert -- $Ba_{0.55}Sr_{0.4}Ca_{0.5}Cr_{0.002}Ti_{0.998}O_3$. --, therefor.

Signed and Sealed this  
Second Day of December, 2014

Michelle K. Lee  
*Deputy Director of the United States Patent and Trademark Office*